(12) United States Patent  (10) Patent No.: US 8,799,005 B2
Pantaliano et al.  (45) Date of Patent: Aug. 5, 2014

(54) SYSTEMS AND METHODS FOR CAPTURING EVENT FEEDBACK

(75) Inventors: Robert Pantaliano, Voorhees, NJ (US); James Dockter, Madison, WI (US)

(73) Assignee: Votini, LLC, Madison, WI (US)

( * ) Notice: Subject to any disclaimer, the term of this patent is extended or adjusted under 35 U.S.C. 154(b) by 134 days.

(21) Appl. No.: 13/428,978

(22) Filed: Mar. 23, 2012

(65) Prior Publication Data

US 2013/0080348 A1 Mar. 28, 2013

Related U.S. Application Data

(60) Provisional application No. 61/470,804, filed on Apr. 1, 2011, provisional application No. 61/548,383, filed on Oct. 18, 2011, provisional application No. 61/549,472, filed on Oct. 20, 2011.

(51) Int. Cl.
*G06Q 30/02* (2012.01)
*G06Q 10/10* (2012.01)
*G06Q 10/06* (2012.01)
*G06Q 30/06* (2012.01)
*G06Q 10/08* (2012.01)

(52) U.S. Cl.
USPC .......................................................... 705/1.1

(58) Field of Classification Search
USPC ................................................. 705/1.1–912
See application file for complete search history.

(56) References Cited

U.S. PATENT DOCUMENTS

| | | | |
|---|---|---|---|
| 2005/0001903 A1* | 1/2005 | Endler et al. ............... | 348/207.1 |
| 2008/0098417 A1* | 4/2008 | Hatamian et al. ............... | 725/24 |
| 2009/0089294 A1* | 4/2009 | Davis et al. ..................... | 707/10 |
| 2012/0323685 A1* | 12/2012 | Ullah ........................ | 705/14.53 |

FOREIGN PATENT DOCUMENTS

WO  WO 2009/152576 A1  12/2009

OTHER PUBLICATIONS

MSD-Media "RTRMobile", iTunes Preview, http://itunes.apple.com/us/app/rtrmobile/id378065683?mt=8 first printed in Aug. 2011, reprinted on May 30, 2012.
Screenshot of Dr. Andreas Fahr Profile at http://www.andreas-fahr.de/ first printed in Aug. 2011, reprinted on May 30, 2012.
http://translate.google.com/translate?hl=en&sl=de&u=http://www.andreas-fahr.dehomecfm3Fnavid3D6&ei=XQgfTuTdLaTu0gGz3mgAw&sa=X&oi=translate&ct=result&resnum=3&sqi=2&ved=0CC0Q7gEwAg&prev=/search%3Fq%3D%2522dominik%2Bleiner%25  22%2Brtr%26hl%3Den%26biw%3D1680%26bih%3D862%26prmd%3Divnso) first printed in Aug. 2011, reprinted on May 30, 2012.

(Continued)

*Primary Examiner* — Jonathan Ouellette
(74) *Attorney, Agent, or Firm* — Miller, Matthias & Hull LLP

(57) ABSTRACT

Methods, systems and computer readable media are described herein for capturing event feedback and providing a representation of feedback results generated using the feedback indicia. The representation of feedback results involves configuring a transmission module of the computing device to synchronize to an event record representing an event; receiving feedback indicia associated with an event at the computing device; operating a data processor of the computing device to assemble a feedback indicia array using the feedback indicia; and providing the event feedback to a remote data processing module. The capturing of event feedback involves storing a plurality of different event records for a plurality of different events; for each event record, receiving a plurality of feedback indicia arrays; and for each event record determining an aggregate feedback result array from the plurality of feedback indicia arrays.

64 Claims, 49 Drawing Sheets

(56) References Cited

OTHER PUBLICATIONS

Fahr Forschung & Analyse, internet page at http://translate.googleusercontent.com/translate_c?hl=en&prev=/search%3Fq%3D%2522dominik%2Bleiner%2522%2Brtr%26hl%3Den%26biw%3D1680%26bih%3D862%26prmd%3Divnso&rurl=translate.google.com&sl=de&twu=1&u=http://www.forschung-analyse.de/&usg=ALkJrhgYgxPtT5axbRII0xTXIrUKHZsbag. First Printed in Aug. 2011, reprinted May 30, 2012.

Fahr Forschung & Analyse, Real-time measurement system with Instant Response Media Monitor, located at http://translate.googleusercontent.com/translate_c?hl=en&prev=/search%3Fq%3D%2522dominik%2Bleiner%2522%2Brtr%26hl%3Den%26biw%3D1680%26bih%3D862%26prmd%3Divnso&rurl=translate.google.com&sl=de&twu=1&u=http://www.forschung-analyse.de/rtr/irmm2.htm&usg=ALkJrhi6sTSoRaACNukDjZ-Dy8sPbKyajA First printed in Aug. 2011, reprinted May 30, 2012.

Dr. Andreas Fahr at http://www.andreas-fahr.de/home.cfm?navid=6; first printed in Jul. 2011;.reprinted May 30, 2012.

Google Translate—http://translate.google.com/translate?hl=en&sl=de&u=http://www.andreas-fahr.de/home.cfm%3Fnavid%3D6&ei=XQgfTuTdLaTu0gGz3-mgAw&sa=X&oi=translate&ct=result&resnum=3&sql=2&ved=0CC0Q7gEwAg&prev=/search%3Fq%3D%2522dominik%2Bleiner%2522%2Brtr%26hl%3Den%26biw%3D1680%26bih%3D862%26prmd%3Divnso first printed in Jul. 2011; reprinted May 30, 2012.

Screenshot of RTRmobile, first printed in Jul. 2011; reprinted May 30, 2012.

iPowowl Offer Document; pp. 1-66; This is a small scale offer pursuant to section 708 of the Corporations Act 2001 to issue securities in the form of shares in iPowow! LTD trading as iPowow; ACN: 128 764 929; Opening Date: Mar. 23, 2011.

iPowow Live TV: Interactive storytelling; pp. 1 -19; Apr. 2011.

* cited by examiner

SYSTEMS AND METHODS FOR CAPTURING EVENT FEEDBACK

FIELD

The described embodiments relate to systems and methods for capturing event feedback and, in particular, to systems and methods for capturing event feedback from event observers using devices.

BACKGROUND

Events, such as for example artistic performances, political debates, competitions, and movies, may attract an audience of event observers. Event performers may have an active role in the event and event observers may have a passive role in the event. Event observers may want to provide their opinion of the event in the form of feedback. Feedback, in the form of applause or jeers, may only be received during live events and may be disruptive and sometimes unwelcome. When event feedback is received from event performers, event organizers, and event observers it may be difficult to accurately associate received feedback to specific portions of the event that the feedback pertains to.

Neilson ratings assess whether a television show was watched or not, but may not discern between high points and low points in a television show. Some polling methods require observers to be located at one location, such as for example a studio environment, to score an event. Often in such cases, the number of observers will be limited. Some polling methods require observers to wait until the end of the event to understand how other observers liked or disliked the entire event. A numerical scale may be used to rate an event but such numerical feedback is typically received at the end of the event and a scalar number representing the average value is recorded for the event as a whole. Some event observers may have biases that make it difficult to get an accurate assessment of an event based on isolated or anecdotal observations. Polling methods may not determine the interstitial reactions during an event.

There exists a need for improved systems and methods for capturing event feedback, or at least alternatives.

SUMMARY

In a first aspect, some embodiments provide
A method for capturing event feedback comprising:
  a) on a computer-readable storage module, storing a plurality of different event records for a plurality of different events such that the plurality of different event records comprises a corresponding event record for each event in the plurality of different events;
  b) for each event record in the plurality of different event records, receiving a plurality of feedback indicia arrays at a communication module, the communication module being electronically linked to the computer-readable storage module for communication therewith, wherein each feedback indicia array in the plurality of feedback indicia arrays stores a plurality of different times and a plurality of feedback indicia, such that for each time in the plurality of different times, the plurality of feedback indicia comprises an associated feedback indicium; and
  c) for each event record in the plurality of different event records, operating a data processing module, linked to the computer-readable storage module for communication therewith, to determine an aggregate feedback result array from the plurality of feedback indicia arrays received for that event record, wherein the aggregate feedback result array defines an associated aggregate feedback timeline, and for a plurality of different times in that timeline, a plurality of aggregate feedback results, such that for each time in the plurality of different times in that timeline, the plurality of aggregate feedback results comprises an associated aggregate feedback result, the plurality of aggregate feedback results being determined by aggregating the plurality of feedback indicia for each feedback indicia array in the plurality of feedback indicia arrays based on the plurality of different times for each feedback indicia array in the plurality of feedback indicia arrays. Feedback indicia may be data that indicates user feedback, feedback data points, feedback data values, and so on. Feedback indicium may refer to a singular instance of feedback indicia—for example, without limitation, a single human rating at a particular instance in time, a single biometric feedback indicium indicating a single biometric characteristic of the user at a particular instance in time (i.e. a pulse rate), and a single environmental feedback indicating an environmental condition around the user at a particular instance in time.

Receiving the plurality of feedback indicia arrays at the communication module comprises receiving the plurality of feedback indicia arrays from a plurality of mobile devices for at least one event record in the plurality of event records.

Receiving the plurality of feedback indicia arrays from the plurality of mobile devices may comprise receiving the plurality of feedback indicia arrays from the plurality of mobile devices in real time by, for each feedback indicia array transmitted from a mobile device, receiving the plurality of feedback indicia as an ordered sequence over time at the communication module based on the timeline for that feedback indicia array such that some feedback indicia in the plurality of feedback indicia are received by the communication module before other feedback indicia in the plurality of feedback indicia are transmitted to the communication module by the mobile device.

The method may further comprise, on receiving the request to register the new event from a requester at the communication module,
operating the data processing module to further define the new event record by receiving from the requester at the communication module and storing at the computer-readable storage module at least one feedback source acceptance attribute, wherein the at least one feedback source acceptance attribute identifies a possible characteristic of a mobile device in the plurality of mobile devices, or a user of the mobile device; and receiving an unfiltered plurality of feedback indicia arrays at the communication module, and then operating the data processing module to filter out from the unfiltered plurality of feedback indicia arrays any feedback indicia arrays in the unfiltered plurality of feedback indicia arrays not satisfying the at least one feedback source acceptance attribute in determining the aggregate feedback result array, such that the aggregate feedback result array is determined without considering any feedback indicia arrays filtered out from the unfiltered plurality of feedback indicia arrays.

At least one feedback source acceptance attribute may be selectable by the requester from a plurality of characteristics comprising location, age, gender, nationality, mobile device type and mobile device model.

The feedback source acceptance attributes may comprise a plurality of feedback indicia array sources, wherein each feedback indicia array source identifies a user or a mobile device in the plurality of mobile devices, and wherein each feedback indicia array in the plurality of feedback indicia arrays received at the communication module is received from an associated feedback indicia array source in the plurality of feedback indicia array sources and wherein the aggregated feedback result array is determined without considering feedback from a source other than the plurality of feedback indicia array sources.

The method may further comprise, on receiving the request to register the new event from the requester at the communication module,
operating the data processing module to further define the new event record by receiving from the requester at the communication module and storing at the computer-readable storage module at least one authorized feedback indicium kind selected from a plurality of feedback indicia kinds wherein the at least one authorized feedback indicium kind is selected from a group consisting of human feedback indicating a rating provided by a user, biometric feedback indicating a biometric characteristic of the user, and environmental feedback indicating an environmental condition around the user; and
receiving an unfiltered plurality of feedback indicia arrays at the communication module, and then operating the data processing module to filter out any feedback indicia arrays in the unfiltered plurality of feedback indicia arrays defining feedback kinds other than the at least one authorized feedback indicium kind in determining the aggregate feedback result array, such that the aggregate feedback result array is determined without considering any feedback indicia arrays filtered out from the unfiltered plurality of feedback indicia arrays.

At least one authorized feedback indicium kind may comprise the human feedback and at least one of environmental feedback and biometric feedback; and, the plurality of feedback indicia arrays received for the new event record may be configured to store, for each time in the plurality of different times, an associated human feedback rating and at least one of an environmental feedback entry and a biometric feedback entry.

The human feedback may comprise electro-mechanical feedback.

The method may further comprise
operating the data processing module to analyze each feedback indicia array in the plurality of feedback indicia arrays received at the communication module to determine a plurality of tentative milepost times in the plurality of different times for that feedback indicia array such that the feedback indicium corresponding to each tentative milepost time in the plurality of milepost times differs from the feedback indicium corresponding to a time in the plurality of different times immediately before this milepost time by more than a threshold amount; and
operating the data processing module to compare the plurality of tentative milepost times for each feedback indicia array in the plurality of feedback indicia arrays with the plurality of tentative milepost times for other feedback indicia arrays in the plurality of feedback indicia arrays to determine a plurality of confirmed milepost times in the associated aggregate feedback timeline, wherein the aggregate feedback result corresponding to each confirmed milepost time in the plurality of confirmed milepost times differs from the aggregate feedback result corresponding to a time in the plurality of different times for the associated aggregate feedback timeline immediately before this confirmed milepost time by more than an aggregate threshold amount.

The method may further comprise, for each event record in the plurality of different event records, operating the data processing module to determine the aggregate feedback result array from the plurality of feedback indicia arrays received for that event record comprises determining the associated aggregate feedback timeline by converting the plurality of different times for each feedback indicia array in the plurality of feedback indicia arrays to a common timescale along the associated aggregate feedback timeline based on the plurality of tentative milepost times determined for each feedback indicia array.

The method may further comprise operating the data processing module to change the threshold amount when determining the aggregate feedback timeline.

The method may further comprise
for each feedback indicia array in at least two feedback indicia arrays in the plurality of feedback indicia arrays, receiving at least one input tag from a user at the communication module;
for each feedback indicia array in the at least two feedback indicia arrays, operating the data processing module, to determine a user selected timeline segment, a start time tag and an end time tag based on the at least one input tag, wherein the user selected timeline segment corresponds to a duration of time of a segment within an event timeline, the start time tag corresponds to a start time of the user selected timeline segment and the end time tag corresponds to an end time of the user selected timeline segment, and wherein the at least two feedback indicia arrays are selected such that the user selected timeline segment of one feedback indicia array in the at least two feedback indicia arrays differs in length from a different feedback indicia array in the at least two feedback indicia arrays; and
operating the data processing module to determine the aggregate feedback result array by defining an associated aggregate feedback timeline by comparing at least two user selected timeline segments for the at least two feedback indicia arrays to determine at least one time scale adjustment and adjusting the relative timing of at least some of the plurality of the feedback indicia arrays based on the at least one time scale adjustment before aggregating the plurality of feedback indicia arrays.

The data processing module may be operated in real time to determine an updateable version of the aggregate feedback result array based, in part, on a part of a feedback indicia array in the plurality of feedback indicia arrays received from one mobile device before a remainder of that feedback indicia array is received at the communication module; and the communication module may progressively transmit updated versions of the updateable version of the aggregate feedback result array to the one mobile device before all of that feedback indicia array from the one mobile device is received at the communication module.

Storing the plurality of different event records for the plurality of different events may comprise storing two or more event records for the same event.

The method may further comprise, for the at least one event record in the plurality of event records,
operating the communication module to receive and the computer-readable storage module to store a plurality of feedback indicia array sources wherein each feedback indicia array source in the plurality of feedback indicia array sources identifies at least one of a mobile device in the plurality of mobile devices, a user of the mobile device and a location of the mobile device;
receiving identification information from a mobile device in the plurality of mobile devices at the communication module, the identification information comprising mobile device name, mobile device model, mobile device operating system, mobile device identifier, mobile device GPS location, user identifier and user password, the identification information identifying at least one of a mobile device, a user of the mobile device and a location of the mobile device;

at the data processing module, comparing information identified by each of the feedback indicia array source in the plurality of feedback indicia array sources corresponding to each event record in the plurality of event records stored at the computer-readable storage module to corresponding information identified in the identification information received from the mobile device; and generating a list of event records from the plurality of event records stored at the computer-readable storage medium based on the comparison such that for each event record in the list of event records, at least one feedback indicia array source in the plurality of feedback indicia array sources identifies all that information also identified in the identification information received from the mobile device.

In another aspect, some embodiments provide a method for capturing and communicating event feedback using a computing device, comprising:
  a) configuring a transmission module of the computing device to synchronize to an event record stored on a remote computer-readable storage module, wherein the event record represents an event of interest such that the transmission of the event feedback is configured to link the event feedback to the event record;
  b) at a plurality of different times during an event timeline, receiving the event feedback as feedback indicia associated with an event of interest at the computing device;
  c) operating a data processor of the computing device to assemble a feedback indicia array using the feedback indicia, wherein the feedback indicia array stores the plurality of different times and an associated plurality of feedback indicia, such that for each time in the plurality of different times, the feedback indicia array comprises a time indicium pair comprising that time and an associated feedback indicium in the associated plurality of feedback indicia, wherein the event timeline defines a period of time for the event for that computing device; and
  d) providing the event feedback by, during the event timeline, periodically operating a transmission module of the computing device to transmit each time indicium pair in the feedback indicia array to a remote data processing module until all of the feedback indicia array is transmitted to the remote data processing module, wherein the transmission of each time indicium pair in the feedback indicia array is configured to link the time indicium pair to the event record.

Configuring the transmission module of the computing device to synchronize to the event record stored on the remote computer-readable storage module to link the feedback indicia array to the event record may comprise operating the transmission module to transmit an event identifier identifying the event record to the remote data processing module.

Operating the transmission module to transmit an event identifier identifying the event record to the remote data processing module may comprise transmitting the event identifier with each time indicium pair in the feedback indicia array.

Configuring the transmission module of the computing device to synchronize to the event record stored on the remote computer-readable storage module to link the feedback indicia array to the event record may comprise operating the transmission module to transmit each time indicium pair in the feedback indicia array to a location, wherein the location identifies the event record.

The feedback indicia for the event of interest received at the computing device may comprise human feedback, and the associated plurality of feedback indicia stored in the feedback indicia array may comprise a plurality of human feedback ratings, where each human feedback rating is provided by a user of the computing device, such that for each time in the plurality of different times, the feedback indicia array may comprise a time human indicium pair comprising that time and an associated human feedback rating in the associated plurality of human feedback ratings.

The method may further comprise during a delayed time interval overlapping with the event timeline, receiving at the transmission module an aggregate feedback array determined by the remote data processing module, wherein the aggregate feedback array is determined by aggregating the time indicium pairs transmitted to the remote data processing module with other feedback indicia associated with the event received from other users.

For each time in the plurality of different times, the aggregate feedback array may comprise a runtime value and an aggregate result pair, where the runtime value is associated with a point in time within the event timeline and the aggregate result is determined from the associated feedback indicium in the time indicium pair for that runtime value; and receiving the aggregate feedback array at the transmission module may comprise periodically receiving for each time in the plurality of different times, the runtime value and aggregate result pair.

Some of the runtime value and aggregate result pairs may be received at the transmission module during the event timeline, and before some associated feedback indicia in the associated plurality of feedback indicia are transmitted by the transmission module to the remote data processing module.

The computing device may be configured for wireless communication with the remote data processing module and the remote computer-readable storage module, and the feedback indicia array may be wirelessly transmitted to the remote data processing module, and the aggregate feedback array may be received by wireless transmission from the remote data processing module.

The method may further comprise operating a display of the computing device to display progressively more of the time indicium pairs and the runtime value and aggregate result pairs during the event timeline.

The computing device may be coupled to at least one sensor device selected from the group consisting of a heart rate sensor, a pulse rate sensor, a temperature sensor, a sound level sensor, a light level sensor, a GPS location sensor, an image sensor and an olfactory sensor, and the sensor device may be operable to measure a sensor feedback value selected from the group consisting of biometric feedback indicating a biometric characteristic of a user and environmental feedback indicating an environmental condition around the user.

The method may further comprise
at each time in a plurality of different sensor measurement times during the event timeline, measuring at the at least one sensor device the sensor feedback value to provide a plurality of sensor feedback values;
receiving at the computing device the at least one sensor feedback value measured at the sensor device and a corresponding sensor measurement time in the plurality of sensor feedback values and assembling a sensor feedback indicia array therefrom, wherein the sensor feedback indicia array stores a plurality of different sensor measurement times and an associated plurality of sensor feedback values, such that for each time in the plurality of different sensor measurement times, the sensor feedback value comprises a sensor measurement time sensor feedback value pair comprising that time and an associated sensor feedback value in the associated plurality of sensor feedback values; and during the event timeline, periodically operating the transmission module of the computing device to transmit each sensor measurement time sensor feedback value pair in the sensor feedback indicia array along with each time human indicium pair in the human feedback indicia array to a remote data processing module until all of the sensor feedback indicia array and the human feedback indicia array is transmitted to the remote data processing module.

The method may further comprise
operating a metaphor generator at the computing device, the metaphor generator being operable to configure a plurality of metaphors such that each metaphor in the plurality of metaphors is providable at the computing device and usable by the observer to input a variable human feedback rating;
receiving from the user a request for a metaphor in the plurality of metaphors configured by the metaphor generator;
providing at the computing device the metaphor requested by the user;
at a plurality of different times during the event timeline, receiving human feedback using the metaphor provided at the computing device; and
converting the human feedback received using the metaphor into the human feedback indicia array, wherein each human feedback indicia array in the associated plurality of human feedback indicia arrays comprises a mapping of the human feedback received using the metaphor into a numerical value and each time corresponding to the human feedback in the plurality of different times comprising the time at which the human feedback was received, wherein the mapping of the human feedback into a numerical value is based on mapping information provided by the event record representing the event of interest.

The method may further comprise transmitting at the transmission module an indication of the metaphor provided at the computing device to receive human feedback from the user to the remote data processing module; and receiving at the transmission module the aggregate feedback array determined by the remote data processing module, wherein the aggregate feedback array is determined based on the indication of the metaphor transmitted.

The method may further comprise operating the data processor at the computing device to reconfigure the metaphor generator to restrict the plurality of metaphors to a subset of metaphors comprising at least one metaphor, wherein the subset of metaphors to be provided at the computing device for the observer to input the human feedback rating is specified by the event record; and wherein receiving from the user a request for a metaphor in the plurality of metaphors comprises receiving from the user a request for a metaphor in the subset of metaphors.

In accordance with other embodiments described herein there is provided a computer readable medium comprising computer program instructions which when executed implement the methods of any one of paragraphs [5] to [35].

In accordance with other embodiments described herein there is provided a system for capturing event feedback comprising:
  a) a computer-readable storage module for storing a plurality of different event records for a plurality of different events such that the plurality of different event records comprise a corresponding event record for each event in the plurality of different events;
  b) a communication module configured, for each event record in the plurality of different event records, to receive a plurality of feedback indicia arrays for that event record, the communication module being electronically linked to the computer-readable storage module for communication therewith, wherein each feedback indicia array in the plurality of feedback indicia arrays stores a plurality of different times and a plurality of feedback indicia, such that for each time in the plurality of different times, the plurality of feedback indicia comprises an associated feedback indicium; and
  c) a data processing module linked to the computer-readable storage module for communication therewith, the data processing module being configured to determine, for each event record in the plurality of different event records, an aggregate feedback result array from the plurality of feedback indicia arrays received for that event record, wherein the aggregate feedback result array defines an associated aggregate feedback timeline, and for a plurality of different times in that timeline, a plurality of aggregate feedback results, such that for each time in the plurality of different times in that timeline, the plurality of aggregate feedback results comprises an associated aggregate feedback result, the plurality of aggregate feedback results being determined by aggregating the plurality of feedback indicia for each feedback indicia array in the plurality of feedback indicia arrays based on the plurality of different times for each feedback indicia array in the plurality of feedback indicia arrays.

The communication module may be configured to receive the plurality of feedback indicia arrays from a plurality of mobile devices for at least one event record in the plurality of event records, The communication module may be configured to receive the plurality of feedback indicia arrays from the plurality of mobile devices in real time by, for each feedback array transmitted from each mobile device, receiving the plurality of feedback indicia as an ordered sequence over time at the communication module based on the timeline for that feedback indicia array such that some feedback indicia in the plurality of feedback indicia are receivable by the communication module before other feedback indicia in the plurality of feedback indicia are transmitted to the communication module by the mobile device.

The communication module may be configured to receive a request to register a new event by adding a new event record to the plurality of event records, and the data processing module is configured to add the new event record to the plurality of event records based on information in the request.

The data processing module may be configured to further define the new event record by receiving from a requester at the communication module and storing in the computer-readable storage module at least one feedback source acceptance attribute, wherein the feedback source acceptance attribute identifies a possible characteristic of a mobile device in the plurality of mobile devices, or a user of the mobile device; the communication module may be configured to receive an unfiltered plurality of feedback indicia arrays; and the data processing module may be operable to filter out from the unfiltered plurality of feedback indicia arrays any feedback indicia arrays in the unfiltered plurality of feedback indicia arrays not satisfying the at least one feedback source acceptance attribute in determining the aggregate feedback result array, such that the aggregate feedback result array is determined without considering any feedback indicia arrays filtered out from the unfiltered plurality of feedback indicia arrays.

The communication module may be configured to display a plurality of characteristics comprising location, age, gender, nationality, mobile device type and mobile device model to the requester, the communication module further comprising an input operable by the requester to select the at least one feedback source acceptance attribute from the plurality of characteristics comprising location, age, gender, nationality, mobile device type and mobile device model.

The feedback source acceptance attribute may comprise a plurality of feedback indicia array sources identifying a user or a mobile device in the plurality of mobile devices, and wherein each feedback indicia array in the plurality of feedback indicia arrays received at the communication module may be received from an associated feedback indicia array source in the plurality of feedback indicia array sources and wherein the data processing module may be configured to determine the aggregated feedback result array without considering feedback from a source other than the plurality of feedback indicia array sources.

On receiving the request to register the new event from the requester, the data processing module may be configured to further define the new event record by receiving from a requester at the communication module and storing in the computer-readable storage module at least one authorized feedback indicium kind selected from a plurality of feedback indicia kinds wherein the at least one authorized feedback indicium kind is selected from a group consisting of human feedback indicating a rating provided by a user, biometric feedback indicating a biometric characteristic of the user, and environmental feedback indicating an environmental condition around the user; the communication module may be configured to receive an unfiltered plurality of feedback indicia arrays; and the data processing module may be operable to filter out any feedback indicia arrays in the unfiltered plurality of feedback indicia arrays defining feedback kinds other than the at least one authorized feedback indicium kind, such that the aggregate feedback result array is determined without considering any feedback indicia arrays filtered out from the unfiltered plurality of feedback indicia arrays.

At least one authorized feedback indicium kind may comprise the human feedback and at least one of environmental feedback and biometric feedback; and, the plurality of feedback indicia arrays received for the new event record, may be configured to store, for each time in the plurality of different times, an associated human feedback rating and at least one of an environmental feedback entry and a biometric feedback entry.

The human feedback received by the computing device may comprise electro-mechanical feedback.

The data processing module may be configured to analyze each feedback indicia array in the plurality of feedback indicia arrays received at the communication module to determine a plurality of tentative milepost times in the plurality of different times for that feedback indicia array such that the feedback indicium corresponding to each tentative milepost time in the plurality of milepost times differs from the feedback indicium corresponding to a time in the plurality of different times immediately before this milepost time by more than a threshold amount; and compare the plurality of tentative milepost times for each feedback indicia array in the plurality of feedback indicia arrays with the plurality of tentative milepost times for other feedback indicia arrays in the plurality of feedback indicia arrays to determine a plurality of confirmed milepost times in the associated aggregate feedback timeline, wherein the aggregate feedback result array corresponding to each confirmed milepost time in the plurality of confirmed milepost times differs from the aggregate feedback result corresponding to a time in the plurality of different times for the associated aggregate feedback timeline immediately before this confirmed milepost time by more than an aggregate threshold amount.

For each event record in the plurality of different event records, the data processing module may be configured to determine the aggregate feedback result array from the plurality of feedback indicia arrays received for that event record by determining the associated aggregate feedback timeline by converting the plurality of different times for each feedback indicia array in the plurality of feedback indicia arrays to a common timescale along the associated aggregate feedback timeline based on the plurality of tentative milepost times determined for each feedback indicia array.

The data processing module may be further operable to change the threshold amount when determining the aggregate feedback timeline.

The communication module may be configured to receive at least one input tag from a user for each feedback indicia array in at least two feedback indicia arrays in the plurality of feedback indicia arrays; and the data processing module may be operable to determine, for each feedback indicia array in the at least two feedback indicia arrays, a user selected timeline segment, a start time tag and an end time tag based on the at least one input tag, wherein the user selected timeline segment corresponds to a duration of time of a segment within an event timeline, the start time tag corresponds to a start time of the user selected timeline segment and the end time tag corresponds to an end time of the user selected timeline segment, and wherein the at least two feedback indicia arrays are selected such that the user selected timeline segment of one feedback indicia array in the at least two feedback indicia arrays differs in length from a different feedback indicia array in the at least two feedback indicia arrays; and determine the aggregate feedback result array by defining an associated aggregate feedback timeline by comparing at least two user selected timeline segments for the at least two feedback indicia arrays to determine at least one time scale adjustment and adjusting the relative timing of at least some of the plurality of the feedback indicia arrays based on the at least one time scale adjustment before aggregating the plurality of feedback indicia arrays.

The data processing module may be configured to operate in real time to determine an updateable version of the aggregate feedback result array based, in part, on a part of a feedback indicia array in the plurality of feedback indicia arrays received from one mobile device before a remainder of that feedback indicia array is received at the communication module; and the communication module may be operable to progressively transmit updated versions of the updateable version of the aggregate feedback result array to the one mobile device before all of that feedback indicia array from the one mobile device is received at the communication module.

The computer-readable storage module may be operable to store two or more event records for the same event.

For the at least one event record in the plurality of event records, the computer-readable storage module may be configured to store a plurality of feedback indicia array sources, wherein each feedback indicia array source in the plurality of feedback indicia array sources identifies at least one of a mobile device in the plurality of mobile devices, a user of the mobile device and a location of the mobile device; the communication module may be configured to receive identification information from a mobile device in the plurality of mobile devices, the identification information comprising mobile device name, mobile device model, mobile device operating system, mobile device identifier, mobile device GPS location, user identifier and user password, the identification information also identifying at least one of a mobile device, a user of the mobile device and a location of the mobile device; the data processing module may be configured to compare information identified by each of the feedback indicia array source in the plurality of feedback indicia array sources stored for each event records in the plurality of event records stored at the computer-readable storage module to corresponding information identified in the identification information received from the mobile device; and the data processing module may be further configured to generate a list of event records in the plurality of event records stored at the computer-readable storage medium based on the comparison such that for each event record in the list of event records, at least one feedback indicia array source in the plurality of feedback indicia array sources identifies all that information also identified in the identification information received from the mobile device.

In some other embodiments described herein, there is provided a computing device for capturing and communicating event feedback comprising:

a transmission module configured to synchronize to an event record stored on a remote computer-readable storage module, wherein the event record represents an event of interest such that transmission of event feedback at the transmission module is configured to link the event feedback to the event record;

a user interface module configured, at a plurality of different times during an event timeline, to receive the event feedback as feedback indicia associated with an event of interest; and a data processor configured to assemble a feedback indicia array using the feedback indicia, wherein the feedback indicia array stores the plurality of different times and an associated plurality of feedback indicia, such that for each time in the plurality of different times, the feedback indicia array comprises a time indicium pair comprising that time and an associated feedback indicium in the associated plurality of feedback indicia, wherein the event timeline defines a period of time for the event for that computing device; and wherein the transmission module may be configured, during the event timeline, to provide the event feedback by periodically transmitting each time indicium pair in the feedback indicia array to a remote data processing module until all of the feedback indicia array is transmitted to the remote data processing module, wherein the transmission of each time indicium pair in the feedback indicia array is configured to link the time indicium pair to the event record.

The transmission module may be configured to synchronize to the event record stored on the remote computer-readable storage module to link the feedback indicia array to the event record by transmitting an event identifier identifying the event record to the remote data processing module.

The transmission module may be configured to transmit the event identifier with each time indicium pair in the feedback indicia array to the remote data processing module.

The transmission module may be configured to synchronize to the event record stored on the remote computer-readable storage module to link the feedback indicia array to the event record by transmitting each time indicium pair in the feedback indicia array to a location, wherein the location identifies the event record. The term 'location' may mean physical or virtual locations, such as an identified resource. For example, the location may be a uniform resource identifier (URI). A uniform resource identifier (URI) may be classified as locators (URLs), names (URNs), or both. A URN (uniform resource name) may define a resource identity and URL (uniform resource locator) may function like an address and provide a method for finding the resource.

The user interface module may be configured, for the event of interest, to receive feedback indicia comprising human feedback, wherein the associated plurality of feedback indicia stored in the feedback indicia array comprises a plurality of human feedback ratings, each human feedback rating being provided by a user of the computing device, such that for each time in the plurality of different times, the feedback indicia array comprises a time human indicium pair comprising that time and an associated human feedback rating in the associated plurality of human feedback ratings.

The transmission module may be, during a delayed time interval overlapping with the event timeline, configured to receive an aggregate feedback array determined at the remote data processing module, wherein the aggregate feedback array is determined by aggregating the time indicium pairs transmitted to the remote data processing module with other feedback indicia associated with the event received from other users.

For each time in the plurality of different times, the aggregate feedback array may comprise a runtime value and an aggregate result pair, the runtime value being associated with a point in time within the event timeline and the aggregate result being determined at the remote data processing module from the associated feedback indicium in the time indicium pair for that runtime value; and the transmission module may be configured, for each time in the plurality of different times, to periodically receive the runtime value and aggregate result pair.

The transmission module may be configured to receive some of the runtime value and aggregate result pairs during the event timeline and before transmitting some associated feedback indicia in the associated plurality of feedback indicia to the remote data processing module.

The computing device may be configured for wireless communication with the remote data processing module and the remote computer-readable storage module, wherein the transmission module may be configured to wirelessly transmit the feedback indicia array to the remote data processing module and wirelessly receive the aggregate feedback array from the remote data processing module.

The computing device may comprise a display, wherein the display is, during the event timeline, may be configured to progressively display more of the time indicium pairs and the runtime value and aggregate result pairs.

The computing device may further comprise at least one sensor device being one of a heart rate sensor, a pulse rate sensor, a temperature sensor, a sound level sensor, a light level sensor, a GPS location sensor, an image sensor and an olfactory sensor, wherein the at least one sensor device may be configured, at each time in a plurality of different sensor measurement times during the event timeline, to measure a sensor feedback value to provide a plurality of sensor feedback values, each sensor feedback value being one of biometric feedback indicating a biometric characteristic of a user and environmental feedback indicating an environmental condition around the user; the data processor may be configured to receive the at least one sensor feedback value measured at the sensor device and a corresponding sensor measurement time in the plurality of sensor feedback values, and assemble a sensor feedback indicia array therefrom, wherein the sensor feedback indicia array may store a plurality of different sensor measurement times and an associated plurality of sensor feedback values, such that for each time in the plurality of different sensor measurement times, the sensor feedback value may comprise a sensor measurement time sensor feedback value pair comprising that time and an associated sensor feedback value in the associated plurality of sensor feedback values; and the transmission module may be configured, during the event timeline, to periodically transmit each sensor measurement time sensor feedback value pair in the sensor feedback indicia array along with each time human indicium pair in the human feedback indicia array to a remote data processing module until all of the sensor feedback indicia array and the human feedback indicia array is transmitted to the remote data processing module.

The computing device may further comprise a metaphor generator operable to configure a plurality of metaphors such that each metaphor in the plurality of metaphors is providable at the computing device and usable by the observer to input a variable human feedback rating; and the user interface module may be configured to receive from the user a request for a metaphor in the plurality of metaphors configured by the metaphor generator; to provide the metaphor requested by the user; and to receive, at a plurality of different times during the event timeline, human feedback using the metaphor provided; and the data processor may be configured to convert the human feedback received using the metaphor into the human feedback indicia array, wherein each human feedback indicia array in the associated plurality of human feedback indicia arrays comprises a mapping of the human feedback received using the metaphor into a numerical value and each time corresponding to the human feedback in the plurality of different times comprising the time at which the human feedback was received, wherein the mapping of the human feedback into a numerical value is based on mapping information provided by the event record representing the event of interest.

The transmission module may be configured to transmit an indication of the metaphor provided at the computing device to receive human feedback from the user to the remote data processing module; and receive at the transmission module the aggregate feedback array determined by the remote data processing module, wherein the aggregate feedback array is determined based on the indication of the metaphor transmitted.

The data processor may be operable to reconfigure the metaphor generator to restrict the plurality of metaphors to a subset of metaphors, the subset of metaphors comprising at least one metaphor, wherein the subset of metaphors to be provided at the user interface module for the observer to input the human feedback rating is specified by the event record; and wherein receiving from the user a request for a metaphor in the plurality of metaphors comprises receiving from the user a request for a metaphor in the subset of metaphors.

In another aspect, some embodiments provide

A method for capturing event feedback comprising:
registering an event record and assigning an event identifier to the registered event record, wherein the event record is associated with an event and comprises an event timeline, wherein the event timeline defines a period of time for the event;
receiving a plurality of feedback indicia for the event from a plurality of devices, wherein each feedback indicia is associated with an event timestamp, wherein each event timestamp indicates a point in time within the event timeline;
storing the received feedback indicia for the event in association with the event record;
generating feedback results for the event, wherein the feedback results comprise a vector of feedback result values for the event, wherein each feedback result value is associated with a point in time within the event timeline, and wherein each feedback result value for the event is computed by aggregating the received feedback indicia for the event based on their associated event timestamps; and
providing a representation of the feedback results.

An event may be an observable phenomenon selected from the group consisting of: a concert, a sporting event, an audio program, a television program, web-based media, a movie, a political event, an artistic performance, a party, a meeting, a class, a seminar, a conference, a recorded event, a live event, and an artistic performance.

At least some of received feedback indicia for the event may comprise environmental indicia selected from the group consisting of date, time, longitude, latitude, altitude, acceleration, sound levels, light levels, colors, images, videos, temperature, smell, heart rate, images, videos, air pressure, humidity, and wherein at least some feedback values for the event are computed based on the received environmental indicia for the event.

The method may further comprise sending an electronic invitation for event feedback to at least some of the plurality of devices, wherein the electronic invitation configures the device to send feedback indicia for the event.

The method may further comprising registering at least some of the plurality of devices and assigning a device identifier to each registered device, wherein at least some of the received feedback indicia may be associated with one or more device identifiers.

The method may further comprise registering an event observer and assigning an event observer identifier to each registered event observer, wherein at least some of the received feedback indicia may be associated with the event observer identifier.

At least some of the events may be associated with a geographic location, and in relation to such events, the method may further comprise: receiving a geographic location of the device; generating the list of the events based on the geographic location of the device, wherein at least some of the events identified in the list of events may be associated with a geographic location proximate to the geographic location of the device.

The method may further comprise: generating the list of events based on one or more factors selected from the group consisting of: a geographic location of the event, a geographic location of the device, the event timeline, a current time, a list of observers invited to provide feedback for the event, and whether the event is publically available for feedback.

The method may further comprise specifying one or more metaphors for receiving the feedback indicia, wherein the metaphors are selected from the group consisting of a slider, a question, a numerical scale, a point within an image, a hand gesture, a simulated hand gesture, an icon, a button, a graph, text, a chart, a grid, a multi-touch gesture, moving sliding finger, tapping rhythmically, clapping hands, clapping on the Internet by, for example, activation or repeated use of a button, and a number of symbols. The method may further comprise changing the metaphors for receiving the feedback at fixed points in time within the time period for the event. The method may further comprise changing the metaphors for receiving the feedback in response to received feedback indicia.

The method may further comprise validating the received feedback indicia.

The event may be associated with a plurality of event outcomes, and the method may further comprise:

selecting an event outcome of the plurality of event outcomes based on the received feedback indicia; and
providing the selected event outcome.

The method may further comprise altering the event by implementing the selected event outcome.

At least some of the received feedback indicia for the event may relate to a rating measurement, wherein the rating measurement provides an indication of event enjoyment.

At least some of the feedback results may comprise an engagement measurement, wherein the engagement measurement indicates the quality and quantity of the received feedback indicia at different points in time in the event timeline.

At least some of the received feedback indicia may be in a continuous form or a discrete form.

In accordance with other embodiments there is provided a method for capturing event feedback comprising:
associating an event with an event identifier and an event timeline that defines a period of time for the event;
receiving a plurality of feedback indicia for the event at a device, wherein each feedback indicia is associated with a timestamp, wherein each timestamp indicates a point in time within the event timeline;
providing the received feedback indicia for the event to a server;
receiving feedback results for the event, wherein the feedback results comprise a vector of feedback result values for the event, wherein each feedback result value is associated with a point in time within the event timeline, and wherein each feedback result value for the event is computed by aggregating received feedback indicia for the event based on their associated timestamps; and
providing a representation of the feedback results.

In accordance with other embodiments described herein there is provided a system for capturing event feedback comprising: a plurality of clients for receiving feedback indicia at a corresponding plurality of devices; a server system for registering an event record associated with an event and assigning an event identifier to the registered event, wherein the event record is associated with an event timeline, wherein the event timeline defines a period of time for the event; receiving a plurality of feedback indicia for the event from a plurality of devices, wherein each feedback indicia is associated with an event timestamp, wherein each event timestamp indicates a point in time within the event timeline; storing the received feedback indicia for the event in association with the event record; generating feedback results for the event, wherein the feedback results comprise a vector of feedback result values for the event, wherein each feedback result value is associated with a point in time within the event timeline, and wherein each feedback value for the event is computed by aggregating the received feedback indicia for the event based on their associated event timestamps; and providing a representation of the feedback results to the clients.

The system may have a client-server architecture or a peer-to-peer architecture.

In accordance with other embodiments there is provided a computer-readable storage device comprising a plurality of instructions for an application, the application for execution on a computing device, the instructions for performing a method of capturing feedback comprising: associating an event with an event identifier and an event timeline that defines a period of time for the event; receiving a plurality of feedback indicia for the event at a device, wherein each feedback indicia is associated with a timestamp, wherein each timestamp indicates a point in time within the event timeline; providing the received feedback indicia for the event to a server; receiving feedback results for the event, wherein the feedback results comprise a vector of feedback result values for the event, wherein each feedback result value is associated with a point in time within the event timeline, and wherein each feedback result value for the event is computed by aggregating received feedback indicia for the event based on their associated timestamps; and providing a representation of the feedback results.

BRIEF DESCRIPTION OF THE DRAWINGS

For a better understanding of embodiments of the systems and methods described herein, and to show more clearly how they may be carried into effect, reference will be made, by way of example, to the accompanying drawings in which:

FIGS. 9 to 49 are example screenshots of the system in accordance with at least one embodiment.

Figure 1:
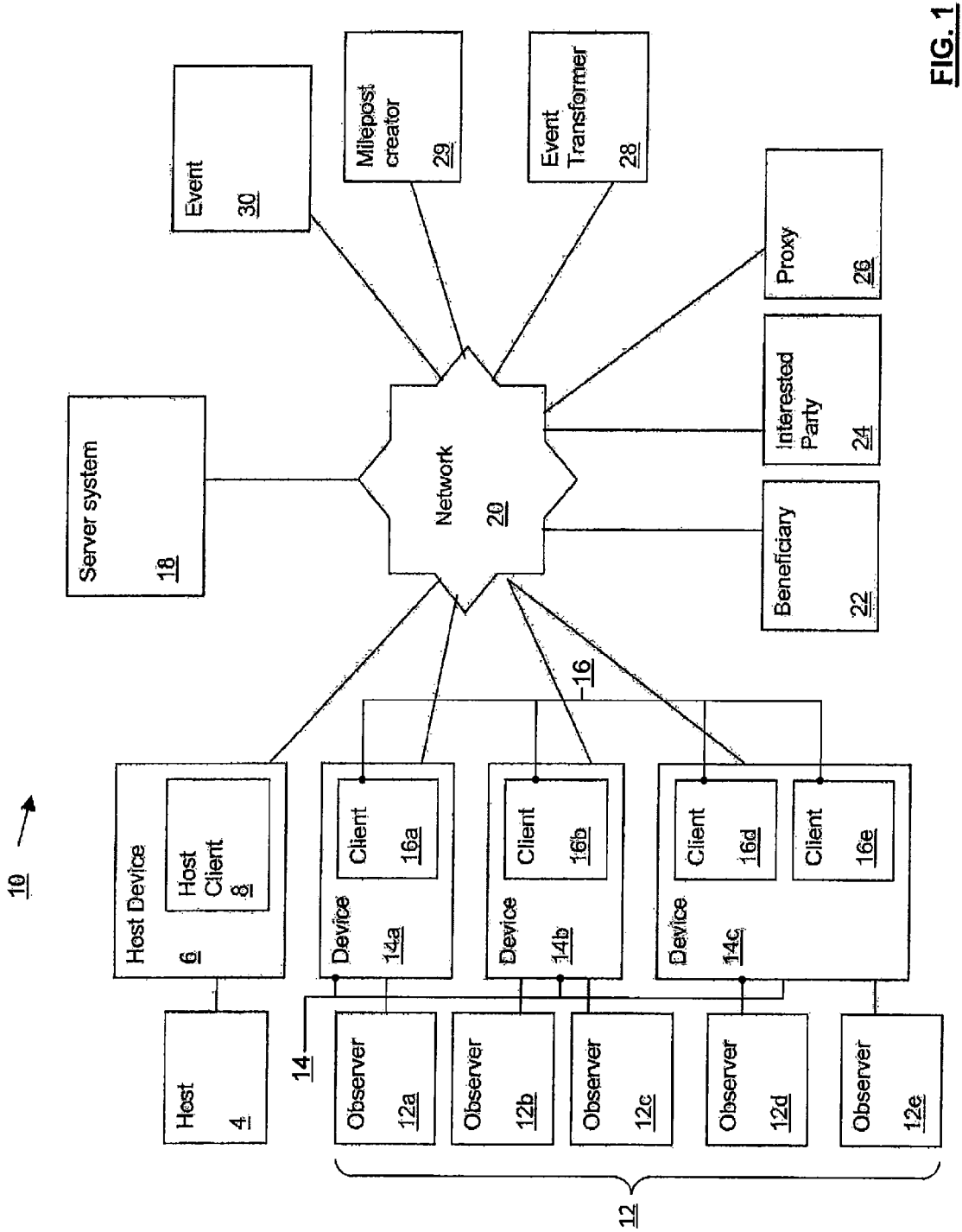
FIG. 1 is a block diagram of a system for capturing event feedback in accordance with at least one embodiment.

The drawings, described below, are provided for purposes of illustration, and not of limitation, of the aspects and features of various examples of embodiments of described herein. The drawings are not intended to limit the scope of the applicants' teachings in any way. For simplicity and clarity of illustration, elements shown in the figures have not necessarily been drawn to scale. The dimensions of some of the elements may be exaggerated relative to other elements for clarity. Further, where considered appropriate, reference numerals may be repeated among the figures to indicate corresponding or analogous elements.

DESCRIPTION OF EXEMPLARY EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

The embodiments of the systems and methods described herein may be implemented in hardware or software, or a combination of both. However, these embodiments may be implemented in computer programs executing on programmable computers, each computer including at least one processor, a data storage system (including volatile and non-volatile memory and/or storage elements), and at least one communication interface. For example, the programmable computers may be a server, network appliance, set-top box, embedded device, computer expansion module, personal computer, laptop, personal data assistant, or mobile device. Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication. In still other embodiments, there may be a combination of communication interfaces.

Each program may be implemented in a high level procedural or object oriented programming or scripting language, or both, to communicate with a computer system. However, alternatively the programs may be implemented in assembly or machine language, if desired. In any case, the language may be a compiled or interpreted language. Each such computer program may be stored on a storage media or a device (e.g. ROM, magnetic diskette, flash memory, USB drives, memory cards, and so on), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product including a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Reference is first made to FIG. 1, which illustrates a block diagram of a system 10 for capturing event feedback in accordance with at least one embodiment. System 10 includes a server system 18 operable to receive feedback indicia for an event 30 from devices 14 operated by event observers 12 observing the event 30. In some embodiments, system 10 can accommodate observers 12a to 12e providing feedback for the event 30 from a number of different locations. In some other embodiments, the location of the venue from where the observers 12a to 12e can provide feedback may be limited. In other embodiments, observers 12a to 12e can provide feedback from any location. In various embodiments, any number of observers providing feedback can be accommodated by the system 10. In various other embodiments, system 10 is operable to receive feedback from observers 12a to 12e at different times. System 10 may also receive feedback from observers 12 in different time zones, such as for example in California and New York State, for the same event 30 being broadcasted a few hours apart. Even within the same time zone, system 10 can receive feedback from observers 12a to 12e for the same event 30 using different devices, even when the observers are close in proximity and time. System 10 can also be operable to receive feedback from observers 12a to 12e for the event 30 any time after it is over, or any time in the future, for example.

System 10 is operable to receive feedback indicia throughout the period of time for the event 30 to continuously evaluate the event 30. Server system 18 is operable to generate feedback results by aggregating and statistically analyzing the received feedback indicia, and provide representations of the feedback results to devices 14 operated by the event observers 12 and to beneficiaries 22, such as an interested party 24 and a proxy 26, for example.

System 10 is operable to enable event observers 12 (also referred to herein as observers) to share the mutual experience of the event 30 and their collective reaction throughout the event 30 by providing and sharing feedback indicia and receiving feedback results throughout the event 30. System 10 may enable observers 12 and beneficiaries 22 (such as an interested party 24 and a proxy 26) to monitor the reactions of other observers 12 at key moments of the event. That is system 10 provides a tool that assists the beneficiaries 22 in evaluating feedback results for the event 30 generated by aggregating feedback indicia received from event observers 12.

System 10 may use the feedback results to evaluate or score periods of time of an event. The feedback results may aid an event organizer, as an example beneficiary 22 or host 4, in determining what satisfies the event observers 12, who may be consumers. The feedback results may assist marketers as another example beneficiary 22 in identifying prime exposure time windows for more targeted advertising campaigns. The feedback results may provide the required input data to determine an outcome of the current event 30 or future occurrences of the event 30. System 10 may give an active role to event observers 12a to 12e by enabling the event observers 12a to 12e to provide feedback indicia throughout the event 30.

An event 30 may be any observable phenomenon. An event 30 is associated with an event timeline, where the event timeline defines a period of time for the event. An event 30 may be live or recorded. It may be directly observed or otherwise provided for event observers 12a to 12e, such as by broadcast, file transmission or otherwise. Event 30 may also be provided by a satellite provider, cable provider or webcast. Examples of events 30 include concerts, sporting events, television programs, web-based media, personal parties, movies, political events, reality shows, a meeting a class, a seminar, a conference, an artistic performance, and so on. In essence, an event 30 may be anything that can cause event observers 12a to 12e to respond with feedback indicia.

Optionally, server system 18 may include an event transformer 28 configured to alter the progress of or outcome of an event 30. An event may be associated with a plurality of event outcomes. Server system 18 may select an event outcome based on the received feedback indicia and provide the selected event outcome. Server system 18 may alter or control the event by implementing the selected event outcome. Server system 18 may prompt for additional feedback indicia based on the selected event outcome.

For example, the event 30 may be a movie, television show, online media or other media with a dynamic story line. Observers 12, through feedback, may influence which story line is chosen as the event 30 with the dynamic story line progresses. As an example, the event 30 may be a reality show. Reality show producers may use the feedback results during a live production to influence the show. The event 30 may be a political debate. Receiving moment-by-moment feedback indicia from event observers 12 during political speeches may enable politicians to determine the perception (from most favorable to most unfavorable) of each statement or position taken during the speech. The event 30 may relate to education or business. A meeting organizer (where the meeting could be a class, seminar, conference or business meeting, for example) can use feedback results generated by feedback indicia received in response to questions asked by the meeting presenter to ask additional questions selected by system 10 based on the feedback results. System 10 is operable to display the feedback results immediately in the presenter's charts. Additionally, the effectiveness of presenters can be evaluated moment-by-moment for immediate or future use. The event 30 may be a sporting event or artistic performance. Part of the fun of attending a sporting event or performance is the "roar of the crowd". This aspect may be missing when event observers 12 view the event remotely. System 10 can break down geography and bring together the "virtual crowd" of event observers 12. This may add enjoyment to the game or performance and makes the fan reaction interactive among fans.

System 10 includes network 20 to connect a server system 18, a host device 6 operated by a host 4, a plurality of devices 14 for receiving feedback indicia from event observers 12, and beneficiaries 22 (including an interested party 24 and a proxy 26). Although only one event 30 is shown, system 10 is configured to receive feedback indicia and generate feedback results for multiple events. In some embodiments, system 10 is configured to receive feedback indicia and generate feedback results for multiple events simultaneously. In this example, event 30 is associated with computing components configured to connect to system 10 via network 20 in order to provide input data and receive output data, such as feedback results. However, in some embodiments event 30 may not be associated with components capable of connecting to system 10 via network 20, or otherwise may not connect to system 10. In some embodiments, the input data can be stored locally on device 14 until connection to a network 20 is made available to the observers 12a to 12e.

Network 20 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these. Although not shown, devices 14, server system 18, and other components may connect to network 20 via a firewall, which is a device, set of devices or software that inspects network traffic passing through it, and denies or permits passage based on a set of rules and other criteria. Firewall may be adapted to permit, deny, encrypt, decrypt, or proxy all computer traffic between network 20 and devices 14, server system 18, and other components based upon a set of rules and other criteria. For example, firewall may be a network layer firewall, an application layer firewall, a proxy server, or a firewall with network address translation functionality.

Host device 6 is operable by a host 4 and may be any networked computing device including a processor and memory, such as a personal computer, workstation, server, portable computer, mobile device, personal digital assistant, laptop, smart phone, WAP phone, an interactive television, video display terminals, gaming consoles, an electronic reading device, and portable electronic devices or a combination of these. Host 4 may be anyone (such as for example, one or more individuals, companies or businesses) or anything (such as for example, an automated computer system) that registers one or more events 30, or one or more aspects of events 30 with server system 18. In some embodiments, host 4 may need to enter an agreement with server system 18 before being able to register events 30. In various embodiments, no agreements are required between host 4 and server system 18 prior to registration of events 30 by the host 4. Although for clarity only one host device 6 is illustrated in FIG. 1, there may be more host devices 6 connected via network 20. Host device 6 may include a host client 8 which may be a computing application, application plug-in, a widget, instant messaging application, mobile device application, e-mail application, online telephony application, java application, web page, or web object residing or rendered on the host device 6 in order to access the functionality of system 10. Host device 6 is operable by a host 4 to, for example, register an event 30, make a reservation for receiving feedback for an event 30 and specify the computational resources needed for evaluating an event 30. An event may also refer to various aspects of the same event 30. For example, in a case of a political debate, a host 4 or a host device 6 may register various aspects of this event, such as for example political debate reviewed as Republican, political debate reviewed as Democrat, or political debate reviewed as Independent etc.

Server system 18 is operable to provide the host 4 with options for obtaining and recording feedback indicia for an event 30 from the devices 14 operated by observers 12. The host device 6 is operable to configure the server system 18 for aggregating, analyzing, packaging and distributing the feedback indicia received from the event observers 12. The host device 6 operated by a host 4 may make a reservation for receiving feedback for an event 30, which may entail registering an event record for the event 30 with the server system 18 (if an event record for the event does not exist already, for example) and authenticate the host device 6 with the server system 18. A host device 6 may specify the parameters for aggregating, analyzing, packaging, and distributing of event 30 related data. The event record may comprise an event timeline, event objects, event parameters, and event variables, which may be created, generated, determined and stored throughout the event 30 in response to input data such as feedback indicia and other data such as feedback results.

The host device 6 may specify parameters for receiving feedback indicia for the event 30, the type of feedback indicia, aggregating the received feedback indicia for the event 30, processing and analyzing the received feedback indicia for the event 30, generating feedback results based on the received feedback indicia for the event 30, and providing and distributing the generated feedback results. Specifying parameters is optional and the server system 18 may be configured with default parameters if event parameters are not specified by host device 6. Server system 18 may store the parameters in association with the event record. Optionally, the host device 6 may provide server system 18 with configurations for creating a unique event experience for one or more observers 12 by customizing the appearance of a visual display of the client 16 on each associated device 14. Server system 18 may create unique event experience for one or more observers 12 by using logos, graphic displays/designs and other industry nuances and by specifying one or more metaphor(s) used on the client 16 to receive feedback indicia.

The host device 6 may also provide configurations to create a suite of one or more metaphors for the event record from which one or more observers 12 can select. The host device 6 may specify that metaphors and the visual appearance of the client 16 may change either statically or dynamically in response to received feedback indicia, feedback results, a milepost, or instruction from the server system 18. In some other embodiments, the host 4 or host device 6 may allow the client 16 to generate a selected subset of metaphors from which an observer 12 can select one metaphor of choice.

In some embodiments, the host device 6 may allow the server system 18 to dynamically provide one or more clients 16 with themes corresponding to the feedback indicia received from the same client 16, where the themes may include images, audio clips etc. related to the event 30 being observed. For instance, if an observer 12 is evaluating an event 30 such as a movie, and providing a positive feedback for various scenes or background scores, the host device 6 may allow the server system 18 to dynamically provide images or audio clips to the client 16 in order to change the appearance of the client 16 to create a unique experience for the observer 12. In various embodiments, the observers 12 may have the option of accepting or rejecting the themes provided by the server system 18.

When a host device 6 makes a reservation for receiving feedback for an event 30, the server system 18 is operable to determine whether an event record exists for the event, and if not to create an event record for the event. The server system 18 is operable to generate a reservation identifier to identify the specific host device 6 that made the reservation for receiving feedback for the event, and create a link between the reservation identifier and the event record. The reservation identifier maybe a unique identifier issued by server system 18 when a host device 6 makes a reservation for an event. Server system 18 may use the reservation identifier or other identifier to create a link between the host device 6 and the event record. The host device 6 may also declare that the reservation identifier is accessible to all observers 12 or only accessible to a specific list of observers 12. Server system 18 provides the host device 6 with the reservation identifier, which may be shared with the potential observers 12 of the event through an invitation. Server system 18 provides the host device 6 with confirmation of options specified in the reservation.

When server system 18 creates an event record, the server system 18 generates and assigns an event identifier to the event record. The event identifier maybe a unique identifier issued by server system 18 upon creating an event record to register an event. The event identifier may be a unique token-based identifier (such as a string of characters) or may be a relative identifier defining the event record relative to other data. Server system 18 may use the event identifier to identify and recall an event record. In accordance with some embodiments, server system 18 generates one event identifier for each event record. Server system 18 is operable to generate one or more reservation identifier for each host device 6 that makes a reservation for receiving feedback indicia an event. For example, server system 18 may create an event record for a baseball game and assign one event identifier to that event record. One host device 6 may make a reservation to receive feedback indicia in relation to dance entertainment at the baseball game, another host device 6 may make a reservation to receive feedback indicia in relation to food at the baseball game, and a further host device 6 may make a reservation to receive feedback indicia in relation to the batting at the baseball game. In response, server system 18 is operable to create three different reservation identifiers each associated with the same event record and event identifier, where each reservation identifier creates a link between the host device 6 that made the reservation and the event record. There may be only one event identifier assigned to each event record but there may be multiple reservation identifiers associated with each event record, creating a link between different host devices 6 and the respective event record.

In some embodiments, only one host device 6 can register an event record or make a reservation for receiving feedback indicia for the event, such that there is only one host device 6 associated with the event 30. In other embodiments, multiple host devices 6 can make a reservation for the same event 30. Server system 18 is operable to register only one event record for the event 30 (even if there are multiple reservations for the event) or multiple event records for the same event but associated with each other. Each host device 6 obtains their own reservation identifier for their respective reservation for the same event 30. A host device 6 may create multiple reservations for the same event 30 and obtain multiple reservation identifiers for the same event in order to, for example, receive different types of feedback indicia for the event 30. Further, a host device 6 may register multiple events 30 or may make multiple reservations for different events 30.

Device 14 is an instrument capable of receiving input from an observer 12, providing the received input to client 16, carrying out client 16 instructions and communicating with the server system 18. Devices 14 are operable by event observers 12 and may be any networked computing device including a processor and memory, such as a personal computer, workstation, server, portable computer, mobile device, personal digital assistant, laptop, smart phone, WAP phone, an interactive television, video display terminals, gaming consoles, an electronic reading device, tablets, other portable electronic devices, device simulators such as embedded applications in websites or consumer electronics or a combination of these. Although for clarity only three devices 14a, 14b, 14c are illustrated in FIG. 1, there may be more devices 14 connected via network 20. The illustrated devices 14a, 14b, 14c may be different types of devices. Devices 14a, 14b, 14c may include a client 16 which may be a computing application, application plug-in, a widget, instant messaging application, mobile device application, e-mail application, online telephony application, java application, web page, or web object residing or rendered on the respective devices 14a, 14b, 14c in order to access the functionality of system 10. Devices 14a, 14b, 14c will be described in more detail herein in relation to FIG. 2.

Device 14 is operable to carry out instructions and communicate with the server system 18. The communication may be done directly via network 20 or it may be done indirectly through removable storage or other means. A single device 14a may support a single observer 12a, such as their mobile phone for example. A single device 14b may also support multiple observers 12b, 12c, such as an embedded application in a website or consumer electronics for example. A single device 14c may support multiple observers 12d, 12e and may contain multiple clients 16d, 16e, one per observer 12d, 12e.

Client 16 may be a set of instructions running on a device 14 capable of receiving observer 12 feedback indicia and transmitting to server system 18. Device 14 may come preloaded with a client 16, or may automatically upgrade itself with a client 16. An observer 12 may download or load a client 16 on the device 14. The device 14 may be simulated in a website that contains the client 16. The device 14 contains hardware and software modules to receive observer input data from input devices such as a keypad, and hardware services for determining and recording environmental indicia, for provision to the client 16. That is, device 14 is operable to receive input data and provide the received input data to client 16. Client 16 is operable to convert the received input data into feedback indicia. For example, device 14 may receive a value of 4 as input data for provision to client 16. Client 16 is operable to process the input value to convert the value of 4 into feedback indicia. As another example, device 14 may receive biometric indicia such as a heart rate or pulse rate value as input data for provision to client 16. Client 16 is operable to process the input value to convert the heart rate or pulse rate value into feedback indicia such as a metric indicating how excited an observer 12. Device may also receive environmental indicia as input data for provision to client 16. Client 16 is operable to process the environmental indicia for conversion into feedback indicia such as a metric indicating the geographic location of the observer 12. Examples of environmental indicia include but are not limited to: date, time, longitude, latitude, altitude, acceleration, sound levels, images, videos, temperature, light levels, colors, smell, and so on. The client 16 converts the received input data into feedback indicia and instructs the device 14 to send a transmission of the feedback indicia to the server system 18. In addition, the device 14 forwards transmissions of feedback results and other data received from the server system 18 to the client 16.

An observer 12 is an entity that observes the event 30 and conveys their reaction by providing input data to a device 14 with a client 16. For example, the observer 12 may rate a sporting event on a scale of 1 to 10 by providing rating values as keyboard input to device 14 throughout the game. Client 16 is operable to convert the received input values (rating values) into feedback indicia. An observer 12 responds to his or her perception of the event 30 by providing input data to the device 14 as real-time feedback which client 16 converts into feedback indicia for provision to the server system 18 as the event 30 occurs. If an observer 12 is using a personal device 14 the observer 12 may be required to obtain a copy of the client 16 on their device 14. For example, an observer 12 may download a client 16 from a computing application repository. In some embodiments, the downloaded client 16 may be operable to automatically update itself or its version number. In some other embodiments, the downloaded client 16 may be operable to notify the observer 12 that a new version is available, and may update itself or its version number if the observer 12 permits it, for example. Real-time may mean that the feedback is provided in real-time in relation to the event timeline. For example, if the event is a live event then the feedback will be provided while the event is occurring or thereafter in reference to mileposts or a period or instance of time on the event timeline. If the event is a recorded event then the client 16 is operable to determine when in the event timeline the feedback was received in order to correlate the received feedback to the event timeline. Real-time may mean that feedback indicia are received timely and continuously. For example, for a sporting event the feedback indicia may be received continuously via a slider bar (an example of a metaphor) where the device 14 enables an observer 12 to move the slider bar up and down throughout the event 30. Each position on the slider bar may correspond to a rating value, which is an example of feedback indicia. In this example, device 14 and client 16 are operable to convert the position of the slider bar into feedback indicia.

In various embodiments, the observer 12 uses the client 16 and device 14 to register (or create an account) with the server system 18 after the client is on the observer's 12 device 14. The observer 12 can use the client 16 and device 14 to register for one or more events 30 and to provide feedback indicia for one or more event. Registration (account creation) may include providing information such as name, phone number, email address, demographics, and geo-demographics, for example, which may or may not be provided to the host device 6 associated with the event 30. When sufficient account information has been received from the client 16 and device 14, the server system 18 assigns an observer identifier and creates an observer record (indexed by the observer identifier or other data relating to the observer 12).

In preparation for the event 30, the observer 12 uses client 16 to review a list of available events. Events may be identified in the list by reservation identifiers, event identifiers, and other identifiers. The list of available events may be provided by the server system 18. Server system 18 is operable to generate a list of events by selecting one or more events that were previously registered by hosts 4. Observer 12 uses device 14 to select an event 30 to evaluate from the list of events. The list may contain all publically available events, private events available for the specific observer 12, or events that are most relevant to the observer 12, such as those events geographically proximate to the observers 12 location, events for a certain time, or those events that the observer 12 has been invited to, or a combination thereof. Client 16 provides an interface to search for events and to display identified events.

During the event 30, the observer 12 can provide input data (which corresponds to feedback indicia) to the device 14 and client 16, and in some embodiments, the observer 12 provides input data (which corresponds to feedback indicia) using metaphors. The metaphors may be configured and specified by the host 4, server system 18, or client 16. Metaphors enable the collection of input data as feedback indicia and may facilitate the provision and receipt of feedback indicia. In other words, metaphors may be useable by the observers 12 to input a variable human feedback rating. Example metaphors include, but are not limited to sliders, questions, buttons, scale, rating, stars, icons and a point on an image. Other examples of metaphor include "odometers", drop-down boxes, dials, number-choosers, search boxes, accordion panes, horizontal/vertical panes, checkboxes, "pickers", "choosers", "cover flows", scroller, menus, lists, on/off switch, playback controls (reverse, play, forward), progress bar, radio buttons, tabs, tag cloud, tooltip, callout, "rating stars", "rating thermometers", "hot/cold" metaphors, joystick metaphor, time scroller, animated images, a video, gauges, sprites, keyboard, scales, hand gestures, simulated hand gestures, clapping hands, clapping on the Internet by, for example, activation or repeated use of a button etc. If the metaphor is a slider or slider bar, then each position along the slider bar corresponds to a rating value (feedback indicia). If the metaphor is a question then each response corresponds to feedback indicia, and so on. Using the supplied metaphors, the observer 12 conveys their evaluation to the client 16 as input data to the device 14. Also during the event 30, the observer 12 may be able to see information received from the server system 18 summarizing and aggregating the feedback from other observers 12 of the event 30, feedback received so far from the observer 12 and provide input data (which corresponds to feedback indicia) based on the feedback results for the event 30, and so on.

The client 16 may be a set of instructions for execution by a processor or application resident on a device 14. The client 16 is operable to authenticate or register with the server system 18 so forthcoming transmissions may be identified as coming through an identified client 16. The client 16 requests from the server system 18 a list of events (identified as event identifiers, reservation identifiers, and so on) that are available to the observer 12. The client 16 displays the list of available events (or reservation identifiers, event identifiers and so on) from which the observer 12 can select. The client 16 relays the observer 12 selections to the server system 18 to begin a session of giving/receiving event feedback indicia. The client 16 receives from the server system 18 salient parts of the reservation for feedback for an event made by the host 4 in order to capture and transmit observer 12 feedback indicia to the server system 18. The client 16 may require that feedback indicia be received in accordance with the specifications and parameters, or may receive feedback indicia in any format. The client 16 is configurable to utilize different themes, visual appearances or other variations to display and capture input data as feedback indicia and other data. The client 16 may provide a manifestation of the observer's 12 reaction (feedback indicia) through movements on the device 14 such as touches on the device 14, vibration, keystrokes, pointing devices, and so on. The manifestation of the observer's 12 intent received as input data may be transmitted to the client 16 through the device 14 using the metaphors and other mechanisms for receiving input data. The client 16 is operable to convert the received input data into corresponding feedback indicia. The client 16 is also operable to receive environmental indicia supplied by the device 14.

When the client 16 obtains feedback indicia and other input data, it is operable to transmit the feedback indicia and data to the server system 18. The client 16 may perform processing and normalization on the feedback indicia prior to provision to server system 18 in order to ensure that the feedback indicia is a format compatible with the server system 18. The client 16 may use synchronous communication, asynchronous communication, batch communication and so on. Under certain conditions the client 16 and device 14 may not be able to access network 20 or connect with server system 18, and in such case the client 16 will retain the data until transmission is possible. The client 16 is operable to locally store a copy of all or part of the data transmitted to server system 18.

If specified by the host device 6, the client 16 may be entitled to packaged or aggregated information (feedback results) returned by the server system 18 which may be received asynchronously, for example, to the transmission of observer 12 input data and feedback indicia. In various embodiments, the server system 18 puts the received input data into a relational database for immediate reuse and analysis, and therefore presents feedback results as an event 30 occurs. In such embodiments, completion of the event 30 by all observers 12 is not a requirement for analysis of the received feedback indicia. In some other embodiments, the server system 18 processes the input data as it is being received by using data stream mining techniques. Data stream mining is a process of extracting knowledge structures from continuous, rapid data records, such as the received input data. The client 16 is operable to provide a user-interface to display feedback results generated by server system 18 for consumption by the observer 12. Examples of consumable forms include text, graphs, charts, grids, images, metaphors, video and so on. For example, a chart may plot aggregate feedback results received from all observers 12 against time corresponding to an event timeline. The client 16 may also juxtapose or compare the observer's 12 own feedback results against the feedback results of other observers 12, or receive such comparison data from the server system 18 in the form of feedback results for display to observer 12. For example, a chart may plot feedback values received from specific observers 12 against aggregate feedback results received from all other observers 12, or a subset thereof.

Server system 18 comprises one or more servers with computing processing abilities and memory such as database(s) or file system(s). For example, server system 18 may include a mail server, web server, database server, application server, message queue server and so on. Although only one server system 18 is shown for clarity, there may be multiple server systems 18 or groups of server systems 18 distributed over a wide geographic area and connected via e.g. network 20. For each event 30 tracked by system 10, server system 18 is operable to register an event record and assign an event identifier to the registered event record. The event record is associated with an event 30 and an event timeline, which defines a period of time for the event. Server system 18 is operable to uniquely identify and correlate feedback indicia for each event using reservation identifiers, event identifiers, and other identifiers. Server system 18 receives feedback indicia for the event 30 from a plurality of devices 14 operated by event observers 12. Each feedback indicia is associated with an event timestamp that is associated with a point in time within the event timeline. In some embodiments, the feedback indicia is based on an ISO 8601 standard (also known as a Unix time standard, or wall time) so that the feedback indicia can be compared with events within or outside of the system 10, for example. In some other embodiments, the feedback indicium is based on the elapsed time, or the runtime, of the event 30. In various embodiments, the runtime is derived from the wall time. Server system 18 is operable to store the received feedback indicia for the event 30 in association with the event record. Server system 18 is operable to generate feedback results for the event based on received feedback indicia. The feedback results include a vector of feedback result values for the event, where each feedback result value is associated with a point in time within the event timeline, and computed by aggregating the received feedback indicia for the event based on their associated event timestamps. For example, at a point in time within the event timeline multiple observers 12 may provide feedback indicia. Server system 18 is operable to aggregate the feedback indicia received from all observers 12 and linked to that point in time. Server system 18 is operable to provide a representation of the feedback results to host device 6, device 14, beneficiaries 22 (such as an interested party 24 or a proxy 26), or other device.

Server system 18 coordinates activity and data among hosts 4, observers 12, milepost creators 29, and beneficiaries 22, such as an interested party 24 and proxy 26. Before the event 30, the server system 18 is operable to receive data from the host device 6 and host client 8. The server system 18 is operable to authenticate and authorize the host 4, host device 6, and the host client 8 to provide information necessary to register the event by creating an event record, and to create a reservation for receiving feedback data for the event 30 and generate a corresponding reservation identifier. The data received from the host device 6 is stored for use when observers 12 observe the event 30 by providing input data that corresponds to feedback indicia. If reservations of other systems are required (e.g. cloud capacity), the server system 18 is operable to make the appropriate reservations. When sufficient data is received for event registration, the server system 18 generates an event record or a reservation for receiving feedback for an event 30.

The server system 18 sends a client 16 a list of events 30 identified by event identifiers, reservation identifiers and so on. The list of events 30 includes events 30 granted public access by hosts 4 and events 30 granted access to the observer 12 by hosts 4, and other relevant events. The host 4 may communicate event invitations and the server system 18 may also be directed by the host 4 to send event invitations by push or pull technology for example. Server system 18 may send an electronic invitation prompting for feedback indicia for an event 30 to the devices 14, where the electronic invitation configures the device 14 to send feedback indicia for the event 30.

Before receiving feedback indicia and generating and providing feedback results for the event 30, the server system 18 communicates with the client 16 to configure how the client 16 manifests itself to the observer 12. An initial metaphor or manifestation may be changed by the server system 18 during an event 30 in response to received input data, feedback indicia, feedback results, and so on. As the event 30 progresses, the server system 18 receives the observer 12 feedback indicia sent by the client 16 on the device 14. In some embodiments, the server system 18 uses the pull technology, where the server system 18 polls the device 14 or client 16 to pull the data from the device 14. In some other embodiments, the server system 18 uses the push technology, also known as an "event-driven" model, to receive feedback indicia from the device 14 or client 16. In other words, only the observer-created events are pushed to the server system 18 when they occur. In an example using a "slider" metaphor, the only positions recorded are due to the movement of the slider by the observer 12. When the slider is stationary because of no change in the observer input, no information is recorded. This may introduce more efficiency in the system 10 by not recording redundant data and by precisely recording the time when the observer actually provides an input, such as by moving the slider. The use of push technology also prevents the transmission of redundant environmental indicia or data to the server system 18; only a change in the environmental indicia is transmitted. The server system 18 aggregates and processes the received feedback indicia from all observers 12 for use in the analyzing, packaging, and distributing feedback results. The server system 18 analyzes the raw feedback indicia including but not limited to: aggregating the received feedback indicia using a correlation based on an event or feedback timestamp, analysis of the data for purposes of validation, including checks for counterfeit submissions or incorrectness, validating format of feedback indicia, generating feedback results, generating comparisons for specific observers 12, analysis of the data for greater understanding of the observer 12 intent including but not limited to removing bias or statistical noise in the data (examples of validation), and processing of the data so that it can be more easily or completely understood including but not limited to correlating it with the environmental indicia or other data and/or summarizing feedback results in charts, graphs, tables and any other form for presentation. The server system 18 may aggregate and analyze the input data or feedback indicia based on many characteristics, such as for example, time of rating of the event 30 by observers 12, time the rating is sent to the server system 18, or GPS locations of the observers 12 etc.

The server system 18 may be the computational resource that receives, aggregates, analyses, packages, and distributes observers' 12 feedback data (including feedback indicia and feedback results). The server system 18 is operable to package the feedback results according to the specification given by the host 4. This includes but is not limited to metaphors used in collecting the data, the number of observers 12 (actual and invited), the time spent by observers 12 using the metaphors, geographic location, type, duration and number of data points provided by the observers 12, statistical analysis generated from observers 12 moment-by-moment reactions to the event 30, comparison of one set of observer 12 reactions to another set of observers 12, statistical filtering to remove noise in the data, biases detected during the event 30, validation information, raw data in export formats (e.g., CSV, XML, JSON, etc.), and so on.

The server system 18 is operable to distribute the packaged information and feedback results according to requests received from the host client 4 or client(s) 16. If authorized by the host 4, the server system 18 is operable to transmit the feedback results (or a portion thereof) immediately back to each client 16 on the device 14. If authorized by the host 4, the server system 18 is operable to make the information such as the feedback results available to authorized beneficiaries 22 in such forms such as reports, web services, exported data formats, and so on.

An event timeline defines a period of time for the event 30. The event timeline may define a collection of mileposts, where each milepost may be a reference to a point in time within the event timeline. The event timeline may be annotated to indicate when certain moments of the events 30 are of particular interest. Milepost creator 29 may create mileposts within the event timeline. Although shown separately in FIG. 1, the client 16, the host client 8, and server system 18 may each contain a milepost creator 29, or a combination thereof. The milepost creator 29 defines mileposts of the event timeline that are used to aggregate, chart and compare received feedback indicia. Milepost creator 29 may identify a point or period of time on the event timeline as milepost before or after feedback indicia has been received in relation to that period of time or milepost. The client 16, the host client 8, and server system 18 are operable to associate at least some of the received feedback indicia with one or more mileposts. For example, the feedback indicia may include an indication that it is associated with a milepost, or the event time stamp associated with the received feedback indicia may correlate to a milepost of (point in time of the event timeline). Examples of mileposts include the moment of conflict resolution in a movie plot; the throwing of a knock-out punch in a boxing event; or the "funny" part of a YouTube video; the end of an inning or period in sporting event; a goal; and so on. The annotation to the timeline or creation of mileposts may be made before, during, or after the observers 12 observe the event 30 by providing feedback indicia. The milepost annotations are used to correlate observers' 12 feedback indicia to important moments identified within an event 30. A milepost is a reference to a point in or period of time in an event timeline. It may optionally include a description. A milepost creator 29 is an entity that creates mileposts on the event timeline.

In some embodiments, the host 4 or other beneficiaries 22 may only be interested in receiving feedback with respect to one or more segments of interest within an event 30. For instance, for an event such as a football match being broadcasted live, certain parties, such as advertisers, may only be interested in receiving feedback regarding advertisement segments during the duration of the match. In such situations, creation of mileposts may facilitate comparison or aggregation of received feedback. In the football match example, the identification of a point or period of time of interest within the event timeline might be complicated if the match is being broadcasted on different channels where the various channels have a slight time delay with respect to each other. Further complications may arise if certain channels decide to play the advertisement segments of interest to an advertiser in different order or at different times than some other channels during the duration of the match.

Similar to the football match example, determining segments of interest within an event timeline may be complicated with respect to certain other events, such as a Broadway show, where the event may occur multiple times (such as every night for a week, or weekly for a month etc.) Receiving and aligning feedback from observers 12 watching the performance on various nights to determine the progress or popularity of the show, or to compare feedback for the show "night-after-night," may require use of mileposts. However, some complication may arise since the event may not start at the same time each night it is performed and may have a slightly different duration or length of performance on different nights. In other words, either the start time of the event may vary each time it is performed (such as the show may start at 8:00 p.m. on one night but 8:10 p.m. on the next night) or the length of the event may vary each time it is performed (such as on one night the show may be 90 minutes long, but on the next night, it may be 100 minutes long). Further complication may arise if, for instance, the producers are interested in comparing feedback results with respect to a performance by a leading lady of the show every night where the leading lady of the show commences performance 10 minutes into the show on one night, but 15 minutes into the show the next night.

In order to enable the comparison or aggregation of feedback received from different observers 12 from different channels or different nights, a tag or label may be provided by a user or a host or any third party, where the tag or label, along with other related information about the segment of interest, may facilitate the determination of the start and end times of the segment. In some embodiments, an observer 12 or a third party may themselves, using the client 16, relay the segment start time, along with the segment duration, to the milepost creator 29. In some other embodiments, an observer 12 or a third party may relay the segment start time and the segment end time to the milepost creator 29. In yet other embodiments, segment start time, segment duration or segment end time may be automatically determined based on the tag or label provided to the milepost creator 29.

The milepost creator 29 may be operable to use the segment related information (for instance, such as segment start time, segment duration or segment end time) to analyze feedback data corresponding to that segment. In one embodiment, the milepost creator 29 may adjust the various feedback data and the associated timestamps to correspond to a common timeline, thereby facilitating an easy comparison of various feedback results. For instance, referring back to the Broadway show example, the milepost creator 29 may aggregate feedback results for each night based on a common timescale, thereby making it easy to compare the observer response from one night to observer response from another night.

Milepost creator 29 may be configured to automatically create mileposts in the event timeline from triggers in the event. For example, for live events one knows certain types of triggers/actions will occur but do not know the exact time that these will occur. Examples of triggers may be scoring a goal in a hockey or soccer game, the beginning or end of a boxing round, the appearance of a singer in a talent-related reality TV show, a speaker taking the microphone at various times during a political debate.

Milepost creator 29 may be configured to allow a host 4, when registering an event 30 or making a reservation, to select or enter types of triggers and the corresponding milepost. When a trigger action occurs, the host 4 may signal that the trigger action has occurred to create the corresponding milepost. Alternatively, the milepost creator 29 may receive trigger signals from any third party to automatically create mileposts without host 4 involvement. This may be, for example, a third party service that sends alerts any time an action has occurred in a sporting event. In some embodiments, input to the server system 18 can be provided by a device that directly measures the event 30. For example, in a Broadway show, a mixing board can be used to send signals identifying a sound mix as input to the server system 18, or a light board can be used to send signals identifying when certain lights are adjusted in brightness or color as input to the server system 18. Another example is of a sporting event such as football, where a device detecting a whistle of a referee can send a signal as an input to the server system 18 upon detection of the whistle; likewise a device detecting a goal in a hockey or basketball game can send a signal as an input to the server system 18 upon detection of the goal. Another example is of a marching band, where a device could be strapped to the wrist of a drum major to detect a "beat" of the corps, and a signal can be send as input to the server system 18 upon detection of the beat. In such embodiments, the measuring of the event 30 by a device could be used in the detection of mileposts.

In some embodiments, a host 4 or any third party may provide a threshold amount to the milepost creator 29, where the threshold amount is used to determine if a trigger event qualifies as a milepost. The milepost creator 29 may be operable to analyze all the feedback received from an observer 12 with respect to an event to determine a significant change in the received feedback. The threshold amount may be used to determine if a change is significant or not. If a significant jump or a drop in the feedback data is identified, it may tentatively signify a milepost. The milepost creator 29 may then compare the various tentative mileposts to determine confirmed mileposts.

In some other embodiments, the milepost creator 29 may first aggregate all the received feedback before identifying a significant change (a jump or a drop) in the aggregate results by comparing it to a threshold amount.

Furthermore any milepost created from a trigger action may further cause a change in the user interface of client 16 or change in metaphor. The server system 18 may further be configured to allow a host 4, when registering an event 30, to select how the metaphor will change in response to the creation of a milepost. For example, the scoring of goal in a sporting event may cause a metaphor showing "cheer" and "boo" to appear at the client so that the observer can provide feedback pertaining to the trigger action in the event 30.

Milepost creator 29 may be configured to create mileposts automatically based on, for example, observer 12 feedback indicia. For example, peeks or drops in viewer ratings, or increases or decreases in the number of viewers providing feedback, might identify a milepost.

A beneficiary 22 may be an entity deriving value from the analysis of the observation data and generated feedback results. Example beneficiaries include event producers, advertisers, observers 12, hosts 4, and so on. Beneficiaries 22 may be sub-categorized as interested parties 24, proxies 26, milepost creator 29 and event transformers 28. Although shown separately in FIG. 1, one or more of interested parties 24, proxies 26, milepost creator 29 and event transformers 28 may be illustrated within beneficiaries 22 as it is a sub-category thereof. Interested parties 24 may be any user interested in the information and feedback results. Event transformers 28 may be entities that use feedback results to alter the progression of the event 30. Proxies 26 may be entities that convey the feedback results and data derived from the feedback results to an interested party 24. A proxy 26 may be a beneficiary that conveys the value of the packaged data to another interested party.

In accordance with some embodiments, the host 4 may specify if the feedback results are available for a beneficiary 22. A beneficiary 22 may be an entity, such as for example a person, computing program or computing device that receives analyzed information (such as feedback results) distributed from the server system 18 and derives value from the analysis of observer 12 feedback indicia and other data. This may or may not be the host 4. Beneficiary-types include event transformers 28, interested parties 24, milepost creators 29, and proxies 26. In some embodiments, the host 4 may configure the server system 18 to output or post the real-time analysis of the feedback indicia to third party social media applications, such as for example, Facebook, Twitter etc. The server system 18 is operable to receive configuration parameters from one or more host 4, observer 12, and beneficiaries 22 in order to generate a specific type of feedback results tailored to the respective host 4, observer 12, beneficiary 22, or other third parties. That is, server system 18 is operable to generate and provide different feedback results for different hosts 6, observers 12 and beneficiaries 22 etc. For example, a host 4 who creates a reservation for feedback for an event may specify as configuration parameters to set the scope of feedback indicia and feedback results that may be provided to a beneficiary 22. As a further example, a beneficiary 22 may specify the format of the feedback results that it is permitted to receive.

An event transformer 28 is a beneficiary that uses packaged information (including feedback results) to alter the progression of the event 30. An event transformer 28 may be entities that use feedback results to alter the progression of the event 30 and may be a gateway to a feedback loop. An event transformer 28 may be used by server system 18 if part of an event 30 can be modified automatically. The event transformer 28 may process the feedback results in order to automatically determine how the event should unfold or the server system 18 may process the feedback results to determine how the event should unfold and instruct the event transformer 28 accordingly. Examples of parts of an event 30 that can be modified include the order of songs performed in a concert, topics chosen during a speech, charts shown during a presentation, media that support alternative formats, a dynamic story line, and so on. The event transformer 28 is a specific type of a beneficiary 22. When the event transformer 28 receives the feedback results or instruction from the server system 18, it may alter the course of the event 30. The event transformer 28 is operable to make decision on how the event 30 should progress given the options available at that time for the event 30. Example modifications include reordering the list of songs to be played, modifying the text to be put on a teleprompter, or digitally creating or reordering the story being told in an animation, movie or play. Other examples might be a digital animation created in real time to match the response from the observers 12 or a presenter altering his or her presentation (i.e., the event 30 being observed) in real time to incorporate the feedback from the observers 12 in the audience. Once the event transformer 28 has modified the event 30, the observers 12 see the altered progression of the event 30. The observers 12 continue to provide feedback via the client 16, forming a feedback loop.

Feedback indicia and feedback results may be provided to an event transformer 28 in real-time, but in some embodiments it need not be real-time. The feedback indicia and results extend over the event timeline, and thus can be correlated with particular mileposts, objects or characters in an event 30.

For example, consider an event 30, such as a television show, with a plurality of participants. At different times within an episode of the show, different participants will be shown or not shown, and sometimes two or more participants may be shown interacting. Based on observer 12 feedback indicia that are correlated with the timing of the show (the event timeline), television producers can determine if an observers rating of the show goes up or down when a particular participant is involved, and transform the storyline using components of an event transformer 28. This can also be done for combinations of participants. For example, participant A and participant B may not be very popular on their own, but may be very popular in their interaction with one another.

This need not only be for participants. For example, on a show there might be different routes that can be taken. Observers 12 might be much more engaged with one route than the other.

Another example transformation may be a story or a narrative that has a number of alternate endings. These alternate endings differ from one another in terms of how some characters do relative to other characters, and how often some characters appear in these endings relative to other endings. For example, given five endings one to five, and four characters A, B, C and D, character A may be more prevalent in ending one than all the other characters, character B may be more prevalent in ending two then all the other characters, character C may be more prevalent or appear more often in ending 3 than all of the other characters, and character D may appear more often in ending 4 than any of the other characters. Also, the endings may be distinguished from one another based on how characters do. That is, character A may be more prevalent in endings one and five than all of the other characters; however, in ending one, character does well, while in ending five, character A comes to a bad end.

Another example may be in the context of advertising. For example, some songs are more popular than other songs. The event transformer 28 may be operable to reorder the songs based on their popularity. In addition, system 10 may sell advertising based on the popularity of the songs, and also based on demographic information regarding each of the songs. Thus, if one song is much more popular than another, then an advertiser may pay more to sell advertising in association with that song. On the other hand, if one song is more popular with mature females, while another song is more popular with adolescent males, then different advertisements may be targeted for each these songs.

An interested party 24 is a special case of a beneficiary 22 that is interested in studying and further processing the feedback results and other packaged data received from server system 18. An interested party 24 uses event related data for a purpose of interest.

A proxy 26 is a special case of a beneficiary. The role of the proxy 26 is to receive feedback results and use some or all of the feedback results as selected by the observer 12 within the limits allowed by the proxy 26. An example might be that an observer's 12 Facebook page would have a widget, embedded application or a plug-in that shows their reaction in real-time to any event 30, such as for example a TV show currently being watched. A plug-in is a set of software components that adds specific capabilities to a larger software application. The proxy 26 can provide feedback results to other interested parties 24.

An account identifier is a unique identifier for each observer 12-device 14 pairing. Its purpose is to collate stateless, asynchronous transmissions to the server system 18. Similar techniques include cookies and session identifiers. As discussed previously, in some embodiments, the server system 18 issues a unique observer identifier and an observer record in response to registration of an observer 12. This enables the observer 12 to use one or more different devices 14 in the future, without having to re-register the observer 12-device 14 pairing. Likewise, this also enables the same device 14 to be used by different observers 12. In various embodiments, issuing of a unique identifier to the observer 12 along with creation of an observer record may enable the server system 18 to suggest events 30 to the observer based on what he has observed, evaluated and enjoyed in the past. The unique identifier for each observer 12 may be in the form of a user id-password combination.

In some other embodiments, the server system 18 issues a unique identifier to the device 14 only. This may allow an observer 12 to observe and evaluate an event 30 even if the observer 12 does not desire to sign up or register to obtain a unique observer identifier. The unique identifier for each device 14 may be based on all or some of the following parameters, such as for example, device name, device model, operating system, operating system version etc. By issuing a unique identifier for an observer 12, device 14 or both, server system 18 can differentiate among various observers 12 during the analysis of received feedback indicia.

In some other embodiments, the server system 18 may not generate a unique identifier for an observer 12, device 14 or both, in which case, the server system 18 may differentiate among different observers 12 based on their GPS information, such as for example, longitude, latitude, altitude etc. Other environmental indicia may also be used.

The event identifier is a unique identifier associated with an event record, and is used to identify an event. This identifier may be used to collate data across reservations for observing the same event, and collate received feedback indicia for the same event, and so on. An event identifier is assigned to an event record in order to identify data for the event.

The reservation identifier is a unique identifier issued by the server system 18 for each host 4-event 30 pairing, in general. In general, a reservation for an event is a reservation that specific feedback indicia will be received for that event. Multiple reservations may be made for one event, in order to, for example, collect different types of feedback indicia for the same event. A host 4 may create multiple reservations for the same event 30, so the reservation identifier may be specifically a unique identification of a (host 4, event 30, instance) tuple, as an example.

The reservation identifier is created in response to a host device 6 registering a reservation for receiving feedback for an event 30 with server system 18. The reservation identifier is used to inform the observer 12 of the event 30 for which feedback is requested. The reservation identifier is used by the server system 18 to collate all activities for the host's 4 request, collate feedback indicia received in relation to the reservation, and so on.

An invitation may be an announcement of the host 4 creation of a reservation and assignment of a reservation identifier for use during feedback indicia collection for the event 30. The invitation may have two manifestations. First, the invitation may be a communication between the host 4 and observers 12 announcing the request for feedback on an event 30.

Second, the invitation may be a host 4 specified list of which observers 12 are granted the privilege of providing feedback on an event 30. In this scenario, the reservation identifier (or other data describing the reservation) may show up on the clients 16 of authorized observers 12. The public, in general, may not receive notice if the reservation indicates that it should be private and limited to certain observers 12.

The server system 18 may send reminders of invitations prior to an event 30.

Figure 2:
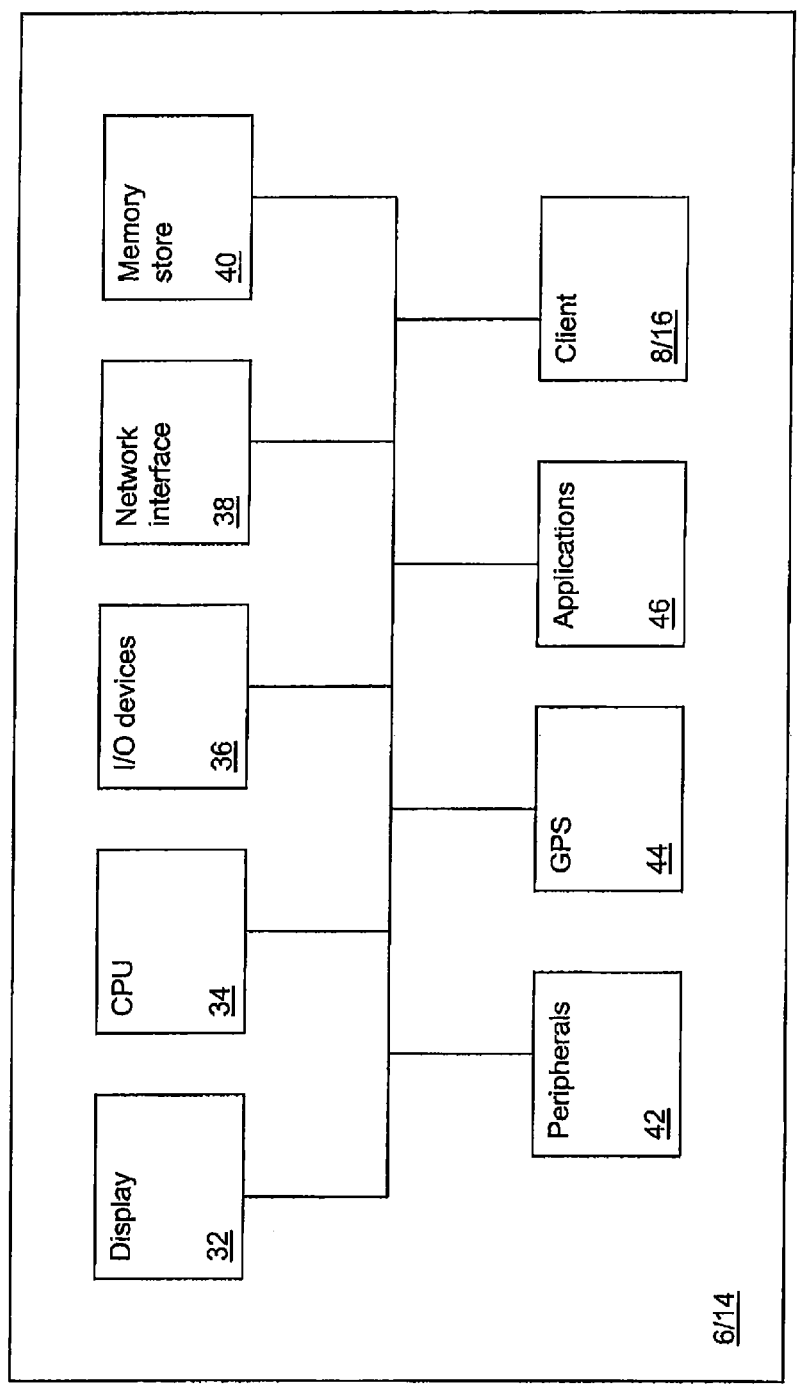
FIG. 2 is a block diagram of a device for capturing event feedback in accordance with at least one embodiment.

Reference is now made to FIG. 2, which illustrates a block diagram of a device 14 (including host device 6) in further detail. In an exemplary embodiment, device 14 has associated with it a display 32, a central processing unit 34, input output devices 36, a network interface 38, a memory store 40, peripherals 42 (e.g. internal or external hardware service modules) including a global positioning system 44, applications 46, and client 16 (or host client 8). The display 32 may be a monitor or display screen that is used to electronically display data. The input output devices 36 may be any device that allows for input, examples of which may include, but are not limited to, keyboards, microphones, speakers, and pointing devices. The memory store 40 include any type of computer memory that is located either internally or externally to the device 14 such as, for example, random-access memory (RAM), read-only memory (ROM), compact disc read-only memory (CDROM), electro-optical memory, magneto-optical memory, erasable programmable read-only memory (EPROM), electrically-erasable programmable read-only memory (EEPROM), flash memory, USB drives, memory cards, solid-state drive, hybrid drives or the like. The central processing unit 34 is used to execute instructions for operation of the device 14 and may include any type of processor, such as, for example, any type of general-purpose microprocessor or microcontroller, a digital signal processing (DSP) processor, an application-specific integrated circuit (ASIC), a programmable read-only memory (PROM), or any combination thereof. The network interface 38 may be a wired and/or wireless network interface that allows the device to connect to the network 20. Device 14 may also include peripheral devices 42, such as printers, antenna, transceivers, speakers, camera, microphone, global positioning system 44, sensors, scanners, and other input output devices 36. Applications 46 provide additional services to device and interact with input output devices 36, peripherals 14 and other components of the device 14.

Figure 3:
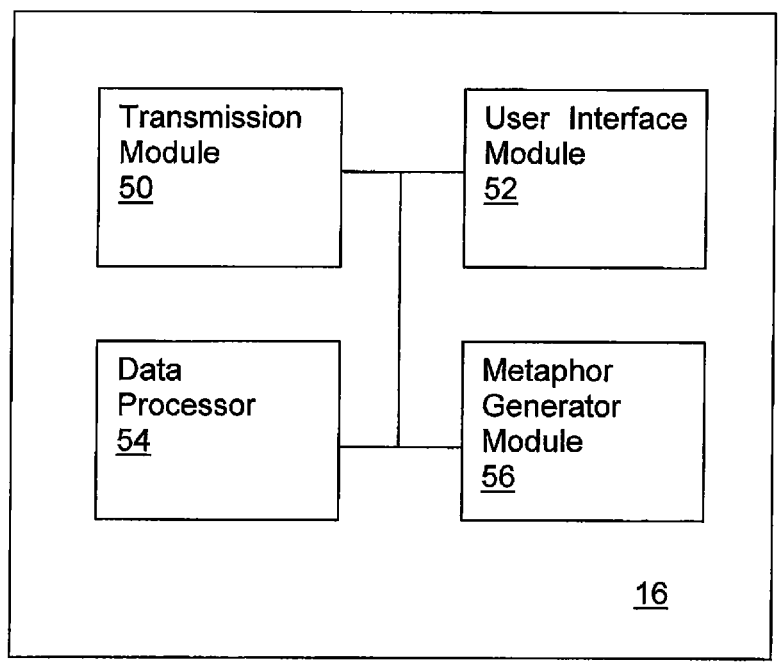
FIG. 3 is a block diagram of a client for capturing event feedback in accordance with at least one embodiment.

Reference is now made to FIG. 3 which illustrates a block diagram of a client 16 for capturing event feedback in accordance with at least one embodiment, In this example embodiment, client 16 comprises a transmission module 50, user interface module 52, data processor 54, and metaphor generator module 56.

Transmission module 50 may be configured to synchronize to an event record stored on a remote computer-readable storage module, such as server system 18 for example. As described herein the event record represents an event of interest such that transmission of event feedback at the transmission module is configured to link the event feedback to the event record.

User interface module 52 is configured, at a plurality of different times during an event timeline, to receive the event feedback as feedback indicia associated with the event of interest. These different times may define time segments of approximately equal length; alternatively, the different times may define time segments that vary widely in length.

Data processor 54 is configured to assemble a feedback indicia array using the feedback indicia. The feedback indicia array stores the plurality of different times and an associated plurality of feedback indicia. For each time in the plurality of different times, the feedback indicia array comprises a time indicium pair. The time indicium pair may be referred to as a (time, indicium) pair. The time indicium pair may include a "time" entry and an "indicium" associated with that time, i.e. the pairing of the time and the associated feedback indicium. An event timeline defines a period of time for the event for that client 16.

In some embodiments, the transmission module 50 is configured, during the event timeline, to provide the event feedback by periodically transmitting each time indicium pair in the feedback indicia array to a remote data processing module (such as on server 18) until all of the feedback indicia array is transmitted to the remote data processing module. The transmission of each time indicium pair in the feedback indicia array is configured to link the time indicium pair to the event record.

In some embodiments, transmission module 50 is configured to synchronize to the event record stored on the remote computer-readable storage module (such as on server 18) to link the feedback indicia array to the event record by transmitting an event identifier identifying the event record to the remote data processing module.

In some embodiments, the transmission module 50 is configured to transmit the event identifier with each time indicium pair in the feedback indicia array to the remote data processing module (such as on server 18).

The transmission module 50 may also be configured to synchronize to the event record stored on the remote computer-readable storage module to link the feedback indicia array to the event record by transmitting each time indicium pair in the feedback indicia array to a location. The location may identify the event record. As mentioned above, the term 'location' may mean a physical or virtual location, such as an identified resource. For example, 'location' may refer to a uniform resource identifier, which may be classified as locators, names, or both.

The user interface module 52 may be configured, for the event of interest, to receive human feedback indicia. The associated plurality of feedback indicia stored in the feedback indicia array may then also include a plurality of human feedback ratings. A human feedback rating may be provided by a user of the computing device, such that for each time in the plurality of different times, the feedback indicia array comprises a time human indicium pair comprising that time and an associated human feedback rating in the associated human feedback ratings.

In some embodiments, transmission module 50 is, during a delayed time interval overlapping with the event timeline, configured to receive an aggregate feedback array determined at the remote data processing module. The aggregate feedback array may be determined by aggregating the time indicium pairs transmitted to the remote data processing module with other feedback indicia associated with the event received from other users.

For each time, the aggregate feedback array may include a runtime value and an aggregate result pair. The runtime value may be associated with a point in time within the event timeline. The aggregate result may be determined at the remote data processing module from the associated feedback indicium in the time indicium pair for that runtime value.

The transmission module 50 may be configured, for each time in the plurality of different times, to periodically receive the runtime value and aggregate result pair. In some embodiments, the transmission module 50 may be configured, for a particular time in the plurality of different times, to only receive that runtime value and aggregate result pair when the aggregate result corresponding to that runtime value is not the same as the aggregate result corresponding to an immediately previous runtime value. In other words, if the aggregate result for runtime value 'a' and runtime value 'b' are the same, where runtime value 'a' comes immediately before runtime value 'b,' the transmission module 50 may be configured to not receive one of these runtime value aggregate result pair to avoid duplication. In various embodiments, the communication module 62 of the server system 18 is configured to only transmit that runtime value and aggregate result pair when the aggregate result corresponding to that runtime value is not the same as the aggregate result corresponding to an immediately previous runtime value. Duplicate data refers to the same data or aggregate result, and may not refer to the same data or aggregate results received at different times, or for different runtime values. In other embodiments, all data values, or aggregate results, including duplicates, are received and transmitted. Duplication avoidance may occur because of an understanding between the server system 18 and the device 16 that duplicate aggregate results sampled next to each another may not be sent to the device 16 in order to save device power used to receive signals. In such embodiments, the device 16 may be configured to assume the same aggregate result over a duration of time until a new runtime value and aggregate result pair is received. In other words, the understanding between the server system 18 and the device 16 may be that if no runtime value aggregate result pair is received by the transmission module 50, then no change in the aggregate result for the subsequent runtimes is assumed until a new runtime value aggregate result pair is received. A sequence of runtime value aggregate result pair, such as {(T1, 6), (T6,3), T(9,7)} may be received by the device 16 to mean {(T1,6), (T2,6), (T3,6), (T4,6), (T5,6), (T6,3), (T7,3), (T8,3), T(9,7)}. In some other embodiments, the understanding between the server system 18 and the device 16 may be that if no runtime value aggregate result pair is received by the transmission module 50, then the aggregate result for the subsequent runtimes is assumed to be 'null' until a new runtime value aggregate result pair is received. In such embodiments, a sequence of runtime value aggregate result pair, such as {(T1,6), (T6,3), T(9,7)} may be received by the device 16 to mean {(T1,6), (T2,null), (T3,null), (T4,null), (T5,null), (T6,3), (T7,null), (T8,null), T(9,7)}. In other embodiments, all runtime value and aggregate result pairs transmitted from the communication module 62 of the server system 18 are received by the transmission module 50 of the device 16.

The transmission module 50 may be configured to receive some of the runtime value and aggregate result pairs during the event timeline before transmitting some associated feedback indicia in the associated plurality of feedback indicia to the remote data processing module.

The transmission module 50 may be configured to wirelessly transmit the feedback indicia array to the remote data processing module and wirelessly receive the aggregate feedback array from the remote data processing module.

During the event timeline, the client 6 may be configured to progressively display more of the time indicium pairs and the runtime value and aggregate result pairs.

The client 16 may comprise at least one sensor device, such as a heart rate sensor, a pulse rate sensor, a temperature sensor, a sound level sensor, a light level sensor, a GPS location sensor, an image sensor, an olfactory sensor, a speech sensor, and so on. The sensor device may be configured, at each time in a plurality of different sensor measurement times during the event timeline, to measure a sensor feedback value to provide a plurality of sensor feedback values. A sensor feedback value may be one of biometric feedback indicating a biometric characteristic of a user and environmental feedback indicating an environmental condition around the user. In some embodiments, sensor devices may also be used to provide human feedback indicia. For example, a speech sensor may be used to receive feedback indicia based on an observer 12 speaking to the speech sensor device 16. In some cases, the speech may then be translated into text and the text may be used to send feedback indicia. In another example, for events such as marching, ice skating, or boxing competitions, the judges or other individuals may provide feedback indicia by saying sport-specific terms or phrases into the sensor device. Some of those terms or phrases may have an impact of providing positive feedback indicia, for example by adding points to the event scores. Some of the other terms and phrases may have an impact of providing negative feedback indicia, for example by deducting points from the event scores. In yet other embodiments, a milepost creator 29 may create mileposts using sensor devices, such as for example a speech sensor device. This may be done by a milepost creator 29 speaking into the sensor device terms or phrases that may signify creation of a milepost. For example, a milepost creator 29 (such as a person) may speak into the sensor device a term, such as 'goal,' to mean that a basketball has gone through the hoop or a hockey puck has gone into the net and accordingly a milepost is created for that goal.

In some embodiments, the data processor 54 may be configured to receive the at least one sensor feedback value measured at the sensor device and a corresponding sensor measurement time, and assemble a sensor feedback indicia array therefrom. The sensor feedback indicia array stores different sensor measurement times and an associated sensor feedback values, such that for each time in the plurality of different sensor measurement times, the sensor feedback value may include a sensor measurement time sensor feedback value pair with that time and an associated sensor feedback value in the associated plurality of sensor feedback values. The transmission module 50 may be configured, during the event timeline, to periodically transmit each sensor measurement time sensor feedback value pair in the sensor feedback indicia array along with each time human indicium pair in the human feedback indicia array to a remote data processing module until all of the sensor feedback indicia array and the human feedback indicia array is transmitted to the remote data processing module.

In some embodiments, each sensor measurement time sensor feedback value pair transmitted to the remote data processing module may not be in any particular order with respect to time (for instance, may not be in an ascending or descending order with respect to time). In other words, a pair comprising a sensor measurement time 'b' and a corresponding sensor feedback value may be transmitted before another pair comprising a sensor measurement time 'a' and a corresponding sensor feedback value even if the sensor measurement time 'b' occurs after the sensor measurement time 'a.' Similarly, in some other embodiments, each time human indicium pair transmitted to the remote data processing module may not be in any particular order with respect to time. In some embodiments and contexts, it may be more efficient, in terms of data transmission rates, to order data transmission in a non-timewise manner.

In some embodiments, the different sensor measurement times in the sensor feedback indicia array and the different times in the human feedback indicia array may coincide, and the transmission module 50 may be configured, during the event timeline, to periodically transmit each time in the human feedback indicia array and the associated human indicium and sensor feedback value as a three-tuple to the remote data processing module. In some other embodiments, the transmission module 50 may be configured to send an n-tuple including a timestamp, and a plurality of human feedback indicia and a plurality of sensor feedback values, all corresponding to that timestamp. For example, at a given time, the plurality of human feedback indicia may include an x-position, a y-position, gesture etc. and the plurality of sensor feedback values may include values measured by different sensors, such as heart rate sensor, a pulse rate sensor or a temperature sensor. This n-tuple may be represented as a data structure of the form (timestamp, human-feedback-type1, human-feedback-type2, . . . , human-feedback-typeN, sensor-feedback-type1, sensor-feedback-type2, . . . , sensor-feedback-typeN), where each of the human-feedback-type1, human-feedback-type2, . . . , human-feedback-typeN, sensor-feedback-type1, sensor-feedback-type2, . . . , sensor-feedback-typeN correspond to the same timestamp.

In some embodiments, the different sensor measurement times in the sensor feedback indicia array and the different times in the human feedback indicia array may coincide. In some other embodiments, the different sensor measurement times in the sensor feedback indicia array and the different times in the human feedback indicia array may not coincide.

In some embodiments, each sensor measurement time sensor feedback value pair and each time human indicium pair transmitted to the remote data processing module may be in random order with respect to each other. In other words, the transmission module 50 may be configured to transmit a time human indicium pair after transmitting a plurality of sensor measurement time sensor feedback value pairs, or vice versa. For example, the transmission module 50 may be configured to transmit a (time$_{hfa}$, human feedback) pair after transmitting (time$_{sfa}$, sensor feedback) pair and (time$_{sfb}$, sensor feedback) pair, where time$_{hfa}$ and time$_{sfa}$ coincide, and time$_{sfb}$ occurs after time$_{sfa}$.

The clients may also include a metaphor generator 56. The metaphor generator may be operable to configure a plurality of metaphors such that each metaphor in the plurality of metaphors is providable at the computing device 14 and usable by the observer 12 to input a variable human feedback rating.

In some embodiments, the user interface module 52 may be configured to receive from the user a request for a metaphor in the plurality of metaphors configured by the metaphor generator and to provide the metaphor requested by the user. The user interface module 52 may then receive, at a plurality of different times during the event timeline, human feedback using the metaphor provided. The data processor 54 may be configured to convert the human feedback received using the metaphor into the human feedback indicia array. Each human feedback indicia array in the associated plurality of human feedback indicia arrays may include a mapping of the human feedback received using the metaphor into a numerical value and each time corresponding to the human feedback in the different times which include the time at which the human feedback was received. The mapping of the human feedback into a numerical value may be based on mapping information provided by the event record representing the event of interest.

The transmission module 50 may be configured to transmit an indication of the metaphor provided at the computing device to receive human feedback from the user to the remote data processing module, and receive the aggregate feedback array determined by the remote data processing module. The aggregate feedback array may be determined based on the indication of the metaphor transmitted.

The data processor 54 may be operable to reconfigure the metaphor generator to restrict the plurality of metaphors to a subset of metaphors that include at least one metaphor. The subset of metaphors may be provided at the user interface module 52 for the observer 12 to input the human feedback rating specified by the event record.

Figure 4:
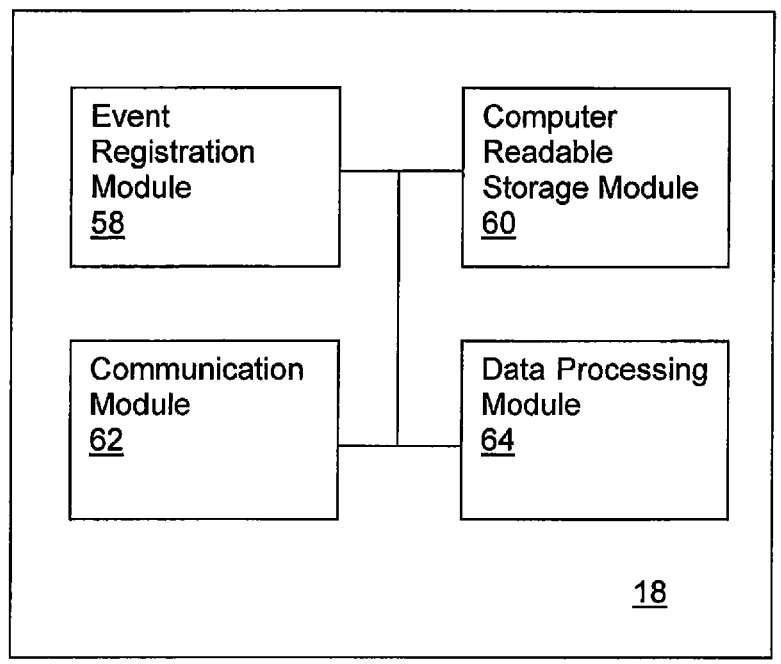
FIG. 4 is a block diagram of a server for capturing event feedback in accordance with at least one embodiment.

Reference is now made to FIG. 4 which illustrates a block diagram of a server 18 for capturing event feedback in accordance with embodiments described herein.

The server may include an event registration module 58, a computer-readable storage module 60, a communication module 62, and a data processing module 64.

Figure 5:
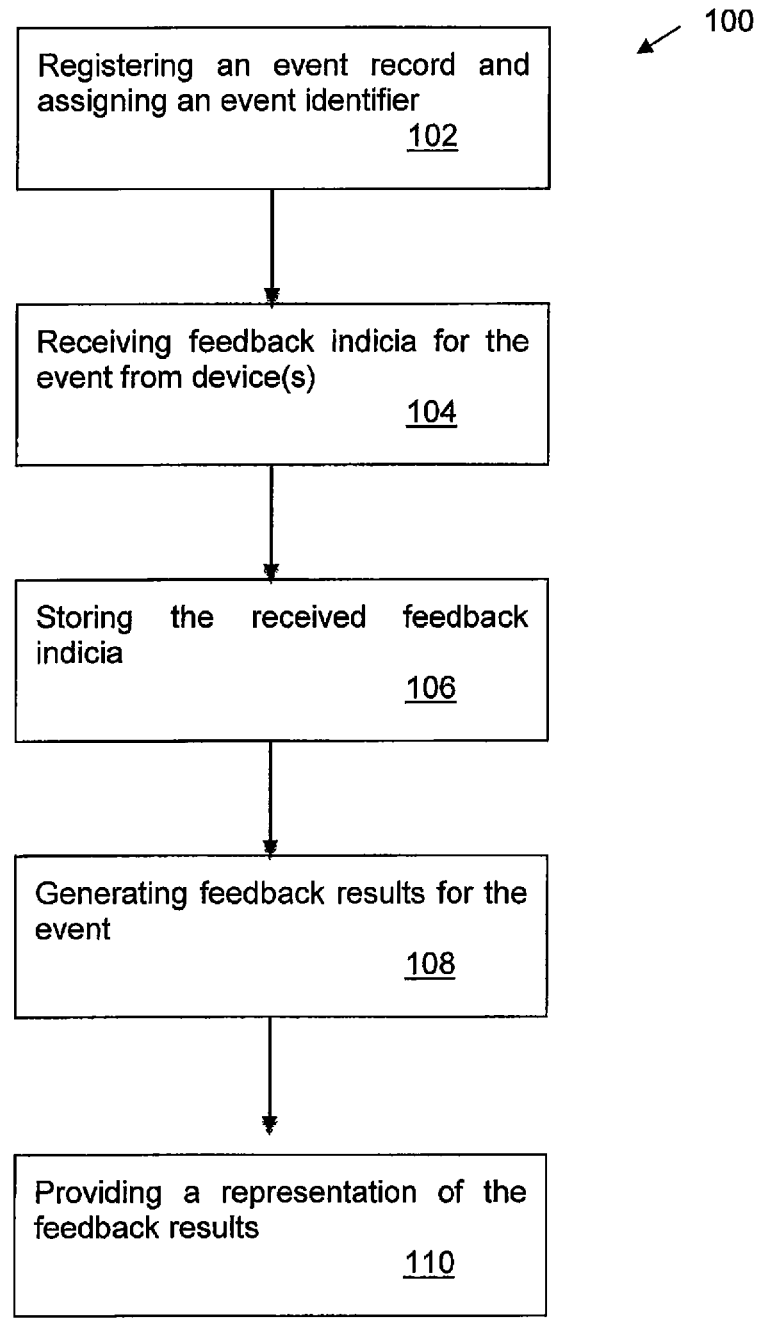
FIG. 5 is a flowchart diagram of a method for capturing event feedback in accordance with at least one embodiment.

The event registration module 58 may be configured to register an event, as described herein, such as in relation to FIG. 5 for example.

The computer-readable storage module 60 may store different event records for different events. The different event records may include a corresponding event record for each event.

The communication module 62 may be configured, for each event record in the different event records, to receive a plurality of feedback indicia arrays for that event record. The communication module 62 may be electronically linked to the computer-readable storage module 60 for communication therewith. Each feedback indicia array may store a plurality of different times and a plurality of feedback indicia, such that for each time in the plurality of different times, the plurality of feedback indicia includes an associated feedback entry indicium. In some embodiments, the communication module 62 may be configured to receive a plurality of feedback indicia arrays for a plurality of event records simultaneously.

The data processing module 64 may be linked to the computer-readable storage module 60 for communication therewith. The data processing module 64 may be configured to determine, for each event record in the plurality of different event records, an aggregate feedback result array from the plurality of feedback indicia arrays received for that event record. The aggregate feedback result array may define an associated aggregate feedback timeline, and for a plurality of different times in that timeline, a plurality of aggregate feedback results. For each time in the plurality of different times in that timeline, the plurality of aggregate feedback results may include an associated aggregate feedback entry result. The aggregate feedback results may be determined by aggregating the plurality of feedback indicia for each feedback indicia array in the plurality of feedback indicia arrays based on the plurality of different times for each feedback indicia array in the plurality of feedback indicia arrays. In some embodiments, the data processing module 64 may be configured to determine an aggregate feedback result array for a plurality of event records simultaneously.

In some embodiments, for at least one event record in the plurality of event records, the communication module 62 may be configured to receive the plurality of feedback indicia arrays from a plurality of mobile devices.

The communication module 62 may be configured to receive the plurality of feedback indicia arrays from the plurality of mobile devices in real time by, for each feedback array transmitted from each mobile device, receiving the plurality of feedback indicia as an ordered sequence over time at the communication module based on the timeline for that feedback indicia array. Some feedback indicia may be receivable by the communication module 62 before other feedback indicia in the plurality of feedback indicia are transmitted to the communication module 62 by the device 14.

The communication module 62 may be configured to receive a request to register a new event by adding a new event record to the plurality of event records. The data processing module 64 may be configured to add the new event record to the plurality of event records based on information in the request.

The data processing module 64 may be configured to further define the new event record by receiving from a requester at the communication module and storing in the computer-readable storage module 60 at least one feedback source acceptance attribute. The feedback source acceptance attribute may identify a possible characteristic of a mobile device in the plurality of mobile devices, or a user of the mobile device.

The communication module 62 may be configured to receive an unfiltered plurality of feedback indicia arrays. The data processing module 64 may be operable to filter out from the unfiltered plurality of feedback indicia arrays any feedback indicia arrays in the unfiltered plurality of feedback indicia arrays not satisfying the at least one feedback source acceptance attribute from the unfiltered plurality of feedback indicia arrays in determining the aggregate feedback result array. The aggregate feedback result array may be determined without considering any feedback indicia arrays filtered out from the unfiltered plurality of feedback indicia arrays.

The communication module 62 may be configured to display characteristics such as location, age, gender, nationality, mobile device type and mobile device model to the requester. The communication module 62 may include an input operable by the requester to select the at least one feedback source acceptance attribute from the plurality of characteristics comprising location, age, gender, nationality, mobile device type and mobile device model. The feedback source acceptance attribute may comprise a plurality of feedback indicia array sources. Each feedback indicia array source may identify a user or a device 14. Each feedback indicia array received at the communication module 62 may be received from an associated feedback indicia array source in the plurality of feedback indicia array sources. The data processing module 64 may determine the aggregated feedback result array without considering feedback from a source other than the plurality of feedback indicia array sources. On receiving the request to register the new event from the requester, the data processing module 64 may be configured to further define the new event record by receiving from a requester at the communication module 62 and storing in the computer-readable storage module 60 at least one authorized feedback indicium kind. The at least one authorized feedback indicia indicium kind may include a rating provided by a user, biometric feedback indicating a biometric characteristic of the user, and environmental feedback indicating an environmental condition around the user.

The communication module may be configured to receive an unfiltered plurality of feedback indicia arrays. The data processing module may be operable to filter out any feedback indicia arrays in the unfiltered plurality of feedback indicia arrays defining feedback kinds other than the at least one authorized feedback indicium kind. The aggregate feedback result array may be determined without considering any feedback indicia arrays filtered out from the unfiltered plurality of feedback indicia arrays.

The at least one authorized feedback indicium kind may include the human feedback and at least one of environmental feedback and biometric feedback. The feedback indicia arrays received for the new event record, is configured to store, for each time in the plurality of different times, an associated human feedback rating and at least one of an environmental feedback entry and a biometric feedback entry.

In an example, the human feedback may include electromechanical feedback.

The data processing module 64 may be configured to analyze each feedback indicia array in the plurality of feedback indicia arrays received at the communication module 62 to determine a plurality of tentative milepost times in the plurality of different times for that feedback indicia array. The feedback indicium corresponding to each tentative milepost time in the plurality of milepost times may differ from the feedback indicium corresponding to a time immediately before this milepost time by more than a threshold amount. The data processing module 64 may also compare the plurality of tentative milepost times for each feedback indicia array in the plurality of feedback indicia arrays with the plurality of tentative milepost times for other feedback indicia arrays in the plurality of feedback indicia arrays to determine a plurality of confirmed milepost times in the associated aggregate feedback timeline. The aggregate feedback result corresponding to each confirmed milepost time in the plurality of confirmed milepost times differs from the aggregate feedback result corresponding to a time in the plurality of different times for the associated aggregate feedback timeline immediately before this confirmed milepost time by more than an aggregate threshold amount.

In some embodiments, for each event record in the plurality of different event records, the data processing module 64 may be configured to determine the aggregate feedback result array from the plurality of feedback indicia arrays received for that event record by determining the associated aggregate feedback timeline by converting the plurality of different times for each feedback indicia array in the plurality of feedback indicia arrays to a common timescale along the associated aggregate feedback timeline based on the plurality of tentative milepost times determined for each feedback indicia array.

The data processing module 64 may be further operable to change the threshold amount when determining the aggregate feedback timeline.

The communication module 62 may be configured to receive at least one input tag from a user for each feedback indicia array in at least two feedback indicia arrays in the plurality of feedback indicia arrays. The data processing module 64 is operable to determine, for each feedback indicia array in the at least two feedback indicia arrays, a user selected timeline segment, a start time tag and an end time tag based on the at least one input tag. The user selected timeline segment corresponds to a duration of time of a segment within an event timeline. The start time tag corresponds to a start time of the user selected timeline segment and the end time tag corresponds to an end time of the user selected timeline segment. The at least two feedback indicia arrays may be selected such that the user selected timeline segment of one feedback indicia array in the at least two feedback indicia arrays differs in length from a different feedback indicia array in the at least two feedback indicia arrays. The data processing module 64 may further determine the aggregate feedback result array by defining an associated aggregate feedback timeline by comparing at least two user selected timeline segments for the at least two feedback indicia arrays to determine at least one time scale adjustment and adjusting the relative timing of at least some of the plurality of the feedback indicia arrays based on the at least one time scale adjustment before aggregating the plurality of feedback indicia arrays.

The data processing module 64 may be configured to operate in real time to determine an updateable version of the aggregate feedback result array based, in part, on a part of a feedback indicia array in the plurality of feedback indicia arrays received from one mobile device before a remainder of that feedback indicia array is received at the communication module. The communication module 62 may be operable to progressively transmit updated versions of the updateable version of the aggregate feedback result array to the one mobile device before all of that feedback indicia array from the one mobile device is received at the communication module.

The computer-readable storage module 60 may be operable to store two or more event records for the same event. In some embodiments, the server system 18 may register and the computer-readable storage module 60 may be operable to store different event records for the same event 30 wherein each event record corresponds to a different aspect of the event 30. For example different event records may be provided for different groups of users, or for the same event viewed from different perspectives.

For the at least one event record in the plurality of event records, the computer-readable storage module 60 may be configured to store a plurality of feedback indicia array sources. Each feedback indicia array source in the plurality of feedback indicia array sources may identify at least one of a mobile device in the plurality of mobile devices, and a user of the mobile device and a location of the mobile device.

The communication module 62 may be configured to receive identification information from a device 14. The identification information may include a mobile device name, mobile device model, mobile device operating system, mobile device identifier, mobile device GPS location, user identifier and user password, the identification information also identifying at least one of a mobile device, a user of the mobile device and a location of the mobile device.

The data processing module 64 may be configured to compare information identified by each of the feedback indicia array source in the plurality of feedback indicia array sources stored for each event records in the plurality of event records stored at the computer-readable storage module 60 to corresponding information identified in the identification information received from the mobile device.

The data processing module 64 may be further configured to generate a list of event records in the plurality of event records stored at the computer-readable storage module 60 based on the comparison that for each event record in the list of event records, at least one feedback indicia array source in the plurality of feedback indicia array sources may identify all that information also identified in the identification information received from the mobile device.

Reference is now made to FIG. 5, which illustrates a flowchart diagram of a method 100 for capturing event feedback implemented by server system 18 in accordance with at least one embodiment. Some or all of the method steps may be implemented in near real time.

At step 102, server system 18 registers an event record and assigns an event identifier to the registered event record. The event record is associated with an event 30 and an event timeline, where the event timeline defines a period of time for the event. For example, the event timeline may have a start and end time and may be divided into time steps or annotated with mileposts. The event record may be used to store data regarding the event including event details, feedback indicia for the event 30, and feedback results for the event 30. An example of an event timeline that is divided into time steps may be for a concert that begins at 8:00 pm, ends at 11:00 pm, and in which the time steps might be individual songs, or some other form of performer/audience interaction. The event timeline may be different than the actual time the event is viewed by observers 12, such as if the event is not a live event for example, In other examples, the event timeline may correspond to the time the event is viewed by observers 12, such as for example if the event is a live event. However, even if the event is a live event the event timeline may not correspond to the time the event is viewed by observers 12. System 10 is operable to compare two performances or views of the same event 30 that are viewed by observers 12 at different times. For example, a song in a concert or a live musical may not be performed at the same second at different performances at different times, such as on different days. The use of individual songs as time steps on the event timeline or mileposts enables the system 10 to compare different parts of the two performances.

Server system 18 may receive configuration parameters for receiving the feedback indicia and generating and providing feedback results. For example, the host 4 may create a reservation for a specific event 30 and in response server system 18 registers an event record if an event record for the event 30 does not already exist. To create reservation for an event, the host 4 can 1) specify the computational resources needed for evaluating an event, and 2) select options for obtaining and recording feedback indicia from the observers 12 and clients 16; 3) select options for aggregating, analyzing, and packaging the feedback from the observers 12; and 4) select options for distribution to beneficiaries 22, among other configurations.

The host 4 can 1) register with the server system 18; 2) authenticate to the server system 18; 3) specify the parameters for the event 30 observation (e.g., how the server system 18 will aggregate the feedback indicia received from the observers 12 during the event 30; 4) specify the parameters for the analysis of the feedback indicia; and 5) specify the parameters for the feedback results. Optionally, the host 4 may create a unique observer 12 experience by customizing the appearance (using logos, graphic displays/designs and other industry nuances) and the metaphor used on the client 16 to provide feedback to the server system 18.

The initial registration may be changed. Registration information that is not required before the event 30 begins may be supplied at any time, such as for example distribution of feedback results.

The server system 18 is operable to verify or validate the information supplied by the host 4. This may include event 30 identification, metaphors used by the client 16, maximum resource consumption, analysis strategies, packaging, and distribution of the feedback results. The server system 18 then stores information that will be used at the time of the event. If in a cloud environment, the server system 18 may also need to reserve computational resource for the time of the event 30. Not all information is required before the event 30. Some aspects such as analysis, packaging, and distribution may be received from the host 4 after the event. Once the server system 18 has sufficient information to make a reservation, the host 4 is provided a reservation identifier for the event 30. This information may be kept in the host's 4 account on the server system 18.

Optionally, to attract observers 12, the host 4 may publicize the registration identifier or invite potential observer 12 to rate an event 30 via the client 16. Alternatively, the host 4 may request the server system 18 to publicize the event 30 and/or the Registration Identifier or invite potential observers 12 to rate an event 30 via the client 16.

Referring now to table 1, interactions between various components of system 10, namely observers 12, clients 16 and server system 18 can be depicted in accordance with one embodiment as below:

TABLE 1

Interactions between observers 12, clients 16 and server system 18

| | Observer 12 (user) | Client 16 | Server System 18 front-end | Server System 18 Queue | Server System 18 back-end | Server System 18 Database |
|---|---|---|---|---|---|---|
| 1 | User launches app | | | | | |
| 2 | User optionally enters userid/ password | | | | | |
| 3 | | Sends identifying information to server | | | | |
| 4 | | | Returns user identification | | | |
| 5 | User types search term | | | | | |
| 6 | | Sends fragments for type-ahead to server | | | | |
| 7 | | | Returns search terms matching typing fragments | | | |
| 8 | User selects search term | | | | | |
| 9 | | Sends search information to server | | | | |
| 10 | | | Returns search results | | | |
| 11 | User selects event to score | | | | | |
| 12 | | Sends userid and event id to server. | | | | |

TABLE 1-continued

Interactions between observers 12, clients 16 and server system 18

| Observer 12 (user) | Client 16 | Server System 18 front-end | Server System 18 Queue | Server System 18 back-end | Server System 18 Database |
|---|---|---|---|---|---|
| 13 | | Returns voting booth link and voting booth key | | | |
| 14 | Optionally sends request for user interface metaphor for event id to server | | | | |
| 15 | | Returns client user interface metaphor information | | | |
| 16 | Retrieves the user interace elements | | | | |
| 17 User gives feedback | | | | | |
| 18 | Sends user feedback to server | | | | |
| 19 | | Server puts feedback in queue | | | |
| 20 | | | Feedback remains in queue until retrieved | | |
| 21 | | | | Backend retrieves user feedback from queue and puts data into database | |
| 22 | | | | | User feedback stored in database. |
| 23 User request feedback graph | | | | | |
| 24 | Device event identification in request for user feedback graph data | | | | |
| 25 | | Server queries database and returns aggregated, analyzed feedback data to client. | | | |

Prior to the event 30, the observer 12 may need to install the client 16 on a device 14. However, the client 16 may, for example, be embedded within another application or webpage. The device 14 then launches the client 16. For example, the observer using a mobile device 14 may select the icon representing the application corresponding to client 16 of system 10. As discussed above, the observer 12 may have to provide the client 16 with a unique observer identifier to be sent to server system 18. In some embodiments, the unique identifier corresponding to the device 14 on which the client 16 is launched is transmitted to the server system 18. In some other embodiments, a GPS location of the device 14 on which client 16 is launched is transmitted to the server system 18. In various embodiments, a combination of some or all of the above is transmitted to the server system 18. This enables the server system 18 to differentiate among various observers 12. In some embodiments, the name and version number of the client 16 may be transmitted to the server system 18 so an updated version of the client 16 can be provided to the observer 12 and device 14. Other identifiers may also be used in other example embodiments.

In various embodiments, the server system 18 includes a table for each identifying attribute, such as for example, device identifier, observer identifier, GPS location etc. The server system 18 may search a database for the received identifying attribute to determine if the observer 12, the device 14 or both have been identified previously. If so, a unique observer identifier corresponding to a table entry in the database may be returned to the observer 12. If not, then the server system 18 may create a new entry corresponding to the received identifying attributes in a table of the database, generate a new unique observer identifier and return the observer identifier to the observer 12 for subsequent uses.

To select an event 30, the observer 12 requests from the client 16 a list of registered events. In some embodiments, the observer 12 request is triggered when the observer 12 types in a search term or a part of the search term on the device 14. In various embodiments, the server system 18 is operable to find search terms, such as titles of actual events 30, matching the keystrokes entered by the observer 12 (also known as a type-ahead feature). For instance, as soon as the observer 12 enters the letter 'p', the server system 18 may be able to send the client 16 a list of registered events starting with letter 'p' or a list of search terms starting with the letter 'p', such as events titled 'political debate', 'Phantom of the Opera' (a musical), 'Parenthood' (a TV show), 'Pro Wrestling' (a sport) etc. In some other embodiments, the event list provided to the observer 12 includes events that contain the entered keystrokes, not necessarily starting with the entered keystrokes. This allows an event 30 titled 'The Phantom of the Opera' to appear in the event list as well, for example. In some other embodiments, the server system 18 is operable to provide candidate search terms, and not titles of actual events 30, based on the keystrokes entered by the observer 12. This may be convenient for the user if for example if the list of the titles associated with the input is long as compared to a list of candidate search terms In some embodiments, only those events 30 starting with or containing the entered keystrokes that the observer 12 is permitted to observe and evaluate are displayed. Such a list may include all publically available events but only those private events that the observer is either invited to or permitted to observer. In some other embodiments, all registered events 30 starting with or containing the entered keystrokes are displayed. In such a case, the private or invitation-only events are displayed with an indicator, such as a lock or text, indicating that the observer 12 is not permitted to observe that event 30. As the observer 12 enters more keystrokes, the automatic display of event 30 list gets filtered and updated. The observer 12 may then either complete typing the search term or chose one of the displayed events.

In some embodiments, to select an event 30 to observe, the observer 12 requests from the client 16 a list of reservation identifiers or event identifiers that the observer 12 is authorized to see. The observer 12 then selects the appropriate reservation identifier or event identifier. In various embodiments, the GPS information or the observer's 12 observer record may filter the event list, reservation identifiers or event identifiers displayed to the observer 12. For example, at least some of the events 30 in the event list may be associated with a geographic location. Server system 18 may receive a geographic location of the device and generate the list of the events based on the geographic location of the device 14. Server system 18 may generate a list of events proximate to the geographic location of the device 14. As further examples, the list of events may be generated based on a geographic location of the event, a geographic location of the device 14, the event timeline, a current time, a list of observers invited to provide feedback for the event, whether the event 30 is publically available for feedback, prior event selection choices by that observer 12 and so on.

The event list may be displayed in the order of event 30 start-times. The event list may also be organized based on the duration of the events 30. The order of the listing of the events 30 may also be customized based on the options selected by the host device 6 or observer 12. In some embodiments, the listing of the events 30 may be customizable and ordered based on the GPS coordinates of the observer 12 or device 14. For example, if a fast food chain restaurant wants to gather feedback for their restaurant, the observer 12 may be able to receive a list of events (such as restaurants) in the order of geographical proximity to them, i.e. the closest restaurant for that fast food chain to appear on the top of the list. The device 14 may receive the location via GPS, QR code, manual input, and so on. The observer 12 may also customize the client 16 to display only a few events 30 on the user-interface at a given time. For instance, if the event list contains 100 events, the client 16 can be customized to only display 10 results at a time. The observer 12 may request the next set of event results to be displayed by either pressing a button, scrolling or other means. The observer 12 or host 4 (or host device 6) may customize the level of detail associated with an event 30 that is available to the observer 12. For instance, a small description of the events 30 may be made available in the event list. In various embodiments, a unique identifier may appear with each event 30 in the event list. This identifier may be the event identifier, reservation identifier or a new and unique identifier.

In some embodiments, the appearance of the client 16 may be customized based on the options selected by the host device 6. In some other embodiments, the server system 18 may specify one or more metaphors for receiving the feedback indicia, such as a slider, a question, a numerical scale, a point within an image, a hand gesture, a simulated hand gesture, an icon, a button, a graph, text, a chart, a grid, a multi-touch gesture, moving sliding finger, tapping rhythmically, clapping hands, clapping on the internet by, for example, activation or repeated use of a button, or a number of symbols, for example. The server system 18 may change the metaphors for receiving the feedback at fixed points in time within the time period for the event. The server system 18 may change the metaphors in response to received feedback indicia.

In various embodiments, the observer 12 may send a request for a user interface metaphor to the server system 18. For instance, the observer 12 may want to use a slider or a line as a metaphor. The observer 12 may desire to move a pointer on a line, where extreme right may indicate an extreme positive feedback, and extreme left may indicate an extreme negative feedback, over answering questions (another example of a metaphor). In other embodiments, questions may be used to gather different information than positions on a slider. The server system 18 may be operable to provide the observer 12 with some information with respect to the requested metaphor, such as which direction or action indicates positive feedback etc.

In various embodiments, once an event 30 is selected by the observer 12, the server system 18 first determines if the observer 12 is authorized to observe the event 30. This may be done by prompting the observer 12 to either provide the unique observer identifier (discussed above), the unique identifier corresponding to each event 30 in the event list or both to the client 16 to be sent to the server system 18. If the observer 12 is found to be authorized, the server system 12 generates a key for the observer 12. The key may be generated using cryptographic methods, such as for example, RFC 2014 Hash based Message Authentication Code etc.

Before the observer 12 experiences the event, the server system 12 provides the observer 12 with the address of the evaluation location from where the observer 12 may evaluate the event 30 and provide input data. In various embodiments, the observer 12 is prompted to provide the key generated by the server system 12 upon authentication of the observer 12 for verification. Once the entered key is verified to be the same as the generated key, the observer 12 is permitted to enter the evaluation location to provide feedback. In various embodiments, the evaluation location provided to the observer 12 is based on the observer 12 or device 14 GPS location. This may be helpful in regulating online traffic and minimizing latency. In system 10, any individual can host and define what observers are permitted to provide feedback, based on type of observer, location of observer, observer identifier, and so on, for example. This allows users to create their own network of friends and receive and share their feedback amongst themselves rather than the world at large.

In some embodiments, an observer 12 and a host 4 may be the same entities, and the client 16 may functionally also include the host client 8 or vice versa. Once an observer launches a client 16 either on a device 14, or through a webpage, or by any other means, the observer 12 may be able to select an event from a plurality of registered events at the server system 18 and invite a selected group of individuals to provide feedback with respect to the selected event. For instance, an observer 12 may be interested in providing feedback for an event, such as for example 'American Idol,' but may also want to see how his or her friends rate the same event. The selected group of friends may be selected from one's social media accounts, such as Facebook, Twitter etc. The selected group of friends may also be invited by providing a link in electronic mails where the link may be followed to provide feedback such that the feedback can be linked to the event record of the event selected by the observer (in this example, American Idol). Accordingly, system 10 is operable to link feedback from observers 12 that are "friends" in order to provide specific results to observers regarding their friends.

The observer 12 experiences the event. An event 30 is an observable phenomenon such as: a concert, a sporting event, an audio program, a television program, a movie, a political event, an artistic performance, a party, a meeting, a class, a seminar, a conference, a recorded event, a live event, or an artistic performance, for example.

At step 104, server system 18 receives feedback indicia for the event 30 from observers 12 via a plurality of devices 14 and clients 16, where each feedback indicia is associated with an event timestamp. Each event timestamp indicates a point in time within the event timeline. This enables the feedback data to be correlated to the event timeline in order to process the data and generate feedback results. In some embodiments, the feedback indicia may consist of human feedback identifying the reaction of the observer 12. The human feedback indicia may be received by using metaphors, such as sliders or answering questions etc. The human feedback indicia may also be received by electro-mechanical means. For example, a device 14 may be a flip-phone or a slide-phone and the reaction of the observer 12 may be recorded based on the number of times the observer 12 flips open or slides the device. Likewise, a device 14 may consist of an accelerometer, which may detect the shaking of the device as an expression of how excited an observer 12 may be. In some embodiments, the client 16 may be operable to convert the electro-mechanical indicia or other human feedback indicia received using metaphors to a numerical scale.

In some embodiments, the client 16 may be embedded in a webpage where the webpage corresponds to an event record, such that feedback with respect to an event may be provided on that webpage, and the webpage may automatically link the received feedback to the event record of the event being rated. In some other embodiments, the feedback indicia received by a client 16 to be transmitted to the server system 18 which may be configured to link to an event record by transmitting an event identifier identifying an event record to the server system 18. In some embodiments, the event identifier may be transmitted along with each feedback indicia transmitted to the server system 18.

The feedback indicia received at the client 16 may be transmitted in the form of an array. A two-dimensional array may be usable to transmit feedback indicia to the server system 18 where one of the columns of the two-dimensional array may consist of timestamps, and the second column may consist of a feedback indicium corresponding to each time in the timestamps. In some embodiments, each feedback indicium and the corresponding time is transmitted one at a time. In some other embodiments, a batch of feedback indicia and the corresponding times are transmitted at once. In yet some other embodiments, a buffer may be used at the client 16 to store the feedback indicia along with the corresponding times as they are made available and transmit the feedback indicia and corresponding times as soon as the buffer is either full or has reached a threshold value.

In various embodiments, the feedback indicia and the corresponding times may be transmitted before other feedback indicia and the corresponding times are made available at the client 16. In other embodiments, the transmission of the feedback indicia and the corresponding times begins only after all the feedback indicia for an event is made available at the client 16.

The observer 12 feedback and other environmental or biometric factors may also be transmitted to the server system 18 throughout the event 30. In some embodiments, the device 14 may either be operable to or be coupled to a sensor device that is operable to measure biometric feedback, environmental feedback or both. Examples of sensor device may include a heart rate sensor, a pulse rate sensor, a temperature sensor, a sound level sensor, a light level sensor, a GPS location sensor, an image sensor and an olfactory sensor etc.

In some embodiments, the human feedback, biometric feedback and the environmental feedback may be transmitted by the client 16 to the server system 18 as a four-dimensional array consisting of four different columns: timestamps, human feedback corresponding to various times in the timestamps, biometric feedback corresponding to various times in the timestamps and environmental feedback corresponding to various times in the timestamps. In some embodiments, there may be a corresponding human feedback, biometric feedback and environmental feedback for each time in the timestamps column.

In some other embodiment, the human feedback, environmental feedback and biometric feedback may not be grouped together into one array. Instead, three different arrays may be transmitted where each array consists of two columns with one column being time and the other column being one of the human feedback, biometric feedback or environmental feedback.

In some other embodiments, only human feedback and one of the biometric feedback or environmental feedback may be transmitted to the server system 18. In some embodiments, the transmission to the server system 18 may be as a three-dimensional array consisting of time as one column, and human feedback and one of environmental feedback or biometric feedback as the other two columns, such that the each time has a corresponding human feedback and one of environmental or biometric feedback. In some other embodiments, the transmission to the server system 18 as a three-dimensional array may consist of time as one column, and human feedback and one of environmental or biometric feedback as the other two columns such that each time in the time column may not necessarily have both corresponding entries (that is, may not necessarily have both a corresponding human feedback and one of corresponding environmental or biometric feedback). In some other embodiments, the transmission to the server system 18 may be as two separate arrays, where one array consists of time and corresponding human feedback; and the other array consists of time and one of corresponding environmental or biometric feedback.

In some embodiments, the server system 18 may use the received feedback to provide an indication of event 30 enjoyment or an indication of engagement. Engagement may not be the same thing as rating enjoyment. Rating measures how much observers 12 viewing the event enjoy it. On the other hand, engagement indicates whether observers 12 are presently providing feedback indicia. If they are not providing feedback indicia, or if the feedback indicia they are providing does not change over time, this can be taken to imply that they are disengaged, which presumably is something that event producers do not like. The feedback results may include an evaluation of engagement. The feedback indicia may be in discrete or continuous form. An example of continuous feedback indicia is moving a slider to different positions throughout the event where different positions correspond to different rating measurements. Another discrete form example may be that an observer 12 could select one of five or six different categories of feedback indicia.

For example, an observer 12 may operate a metaphor such as a slider to record their level of enjoyment of the event. The observer 12 could also move the slider over time to reflect changes in their enjoyment level. At some points during the event 30 some of the observers 12 may become disengaged, and will no longer provide feedback such that either no new feedback indicia is received or the level of enjoyment will stay constant over time. In such cases, the server system 18 may determine that at least some of these observers have become disengaged from the event 30. Alternatively, at some point during the event, observers 12 may become re-engaged and start to operate their slider to indicate changes in their level of enjoyment. This too could be recorded by server system 18.

In some embodiments, the server system 18 may be operable to determine the aggregate feedback results based on the metaphor selected by the observer 12.

Server system 18 may also receive one or more feedback timestamps for at the least some of the received feedback indicia for the event. The feedback timestamp indicates a time that the respective feedback indicia were received. If the event 30 is a live event 30 then the feedback timestamp may be the same as or proximate to the event timestamp.

In some embodiments, the server system 18 may provide feedback results back to the client 16 as soon as they are available so that the observer 12 can assess and provide feedback based on the feedback results, and so on. In such embodiments, client 16 can simultaneously send observer 12 feedback indicia, observer 12 assessment of feedback results, and time (such as for example, feedback timestamps) to the server system 18 for analysis.

Some of received feedback indicia for the event 30 may include environmental indicia such as date, time, longitude, latitude, altitude, acceleration, sound levels, light levels, colors, images, videos, temperature, smell, images, videos, air pressure, humidity, and so on, for example. Some of received feedback indicia for the event 30 may include biometric indicia such as heart rate, fingerprint images, and so on. At least some feedback values for the event 30 may be computed based on the received environmental indicia and biometric indicia for the event.

At step 106, server system 18 stores and validates the received feedback indicia for the event 30 in association with the event record. The server system 18 may also reformat the feedback for efficient recall. Server system 18 may validate the received feedback by checking its format, to ensure that the same observer 12 is not submitting feedback indicia multiple times using different devices 14, and so on, for example. Other validations may also be implemented.

At step 108, server system 18 generates feedback results for the event.

In various embodiments, the server system 18 comprises a front-end server, a queue for each event 30 and a back-end server. The front-end server may be operable to receive a request from an observer 12 to provide feedback regarding an event 30 and to return confirmation to the observer 12 in response to the request. Confirmation may be expressed by returning some or all of the following: event list, voter identifier, identifier associated with each event in an event list, evaluation location address, evaluation location key, requested metaphor, metaphor associated information etc. The front-end server may also be operable to put the observer 12 request into a queue for deferred processing. In such a case, a confirmation of receipt of observer 12 request may be provided to the client 16.

In some embodiments, the observer 12 is not notified of a request that did not pass authentication. This may be helpful to prevent hackers or unauthenticated observers from being notified that their exploit was not successful and enticed to try again.

In various embodiments, a front-end server is also operable to receive feedback indicia along with other information from clients 16 and add them in a queue. The front-end server may be operable to notify the client 16 that the transmission of feedback indicia was received correctly.

The front-end server may also be operable to receive a request to receive feedback regarding an event 30 from one or more of observers 12, clients 16, hosts 4, host clients 8, beneficiaries 22 (including interested parties 24 and proxies 26), event transformers 28, milepost creators 29 and other third parties and to return aggregated, analyzed feedback data to the requesting party.

The server system 18 may contain a queue unique to each event 30 that may be required to differentiate processing of information based on priority, such as to differentiate high priority back-end processing from low priority back-end processing. A queue may be required to store observer 12 request to provide feedback regarding an event 30, observer 12 or other party requests to receive feedback regarding an event 30, and feedback indicia and other information received from the observer 12 regarding an event. In various embodiments, once a request to provide feedback is put into a queue, a queue item identifier may be returned from the queue. This may help server system 18 to detect and prevent duplicate processing. The storage time of a queue may be customized to last any duration of time, with or without a possibility of extension. For instance, in some cases, the storage may be up to 4 days with a possibility of extension up to 12 days.

The back-end server of the server system 18 may be operable to retrieve observer 12 request to provide feedback regarding an event 30 from the queue and process it. In various embodiments, the back-end is tasked with authentication of the observer 12. If the observer 12 cannot be authenticated, the back-end server may discard the observer 12 request to observe an event 30. This may be done by putting the request into a discard queue, which may be later analyzed for fraud detection.

The back-end server of the server system 18 may also be operable to retrieve feedback indicia (including observer input, environmental indicia, biometric indicia etc.) and other information (including timestamps, observer assessment of feedback results etc.) from the queue to be processed.

In various embodiments, there are separate databases or tables for each event 30. This may avoid interference of feedback indicia from an old event 30 with a new event 30. The feedback indicia and other information retrieved by the back-end server for processing may be stored in the database for future reference. The feedback results generated by the back-end server of the server system 18 may also be stored in the corresponding databases or tables. The server system 18 may archive the database or table once the data for the event 30 is no longer needed.

The back-end server of the server system 18 may also be operable to retrieve requests to receive feedback regarding an event 30 from the queue and send a query to the databases or tables where feedback results are stored. The feedback results may be formatted by the back-end server, and then returned to the requesting party by the front-end server. The back-end server may also store the formatted response in the corresponding table or database for future use.

As discussed previously, the server system 18 may register devices and assign a device identifier to each registered device 14. At least some of the received feedback indicia are associated with one or more device identifiers to indicate which device 14 the feedback indicia were received from. Server system 18 may register an event observer 12 and assign an event observer identifier to each registered event observer. The received feedback indicia may then be associated with the event observer identifier to indicate which observer 12 the feedback indicia were received from.

Server system 18 may receive feedback indicia for the event 30 by providing a list of events 30 to a device 14. Each event 30 identified in the list of events is associated with a unique identifier. Server system 18 may receive a selected event 30 identified in the list of events 30 from the device 14 and associate the received feedback indicia with the unique identifier associated with each event 30 in the list of events. This unique identifier may be the event identifier, reservation identifier or a new and unique identifier.

The feedback results may include a method used to receive the feedback indicia, a number of observers that feedback indicia is received from, a number of devices that feedback indicia is received from, a length of time that the feedback indicia was received, geographic locations for the plurality of the devices, geographic locations of observers that feedback indicia was received from, a list of types of feedback indicia received, a statistical analysis of the received feedback indicia in view of the event timeline, a comparison of feedback indicia received from a first set of observers to feedback indicia received from a second set of observers, a list of biases detected during the event, reports, a web service and raw data in export formats. The server system 18 is operable to receive feedback indicia as input and perform processing steps on the received input to produce feedback results. Further server system 18 is operable to perform analysis on feedback results to generate further feedback results.

The feedback results comprise a vector of feedback result values for the event 30, where each feedback result value is associated with a point in time within the event timeline. Each feedback result value for the event 30 is computed by aggregating the received feedback indicia for the event 30 based on their associated event timestamps. For example, for a given time defined by a timestamp, server system 18 is operable to aggregate all feedback indicia associated with that timestamp and event to compute an overall feedback result value for the time on the event timeline the feedback result value corresponds to. Server system 18 may generate the feedback results by removing statistical noise from the received feedback indicia. That is, the vector of feedback result values provides a mapping of feedback results values to points of time in the event timeline. The points of time may be mileposts for example.

For example, the results may include an engagement measurement, wherein the engagement measurement indicates the quality and quantity (such as frequency of interaction with client 16) of the received feedback indicia at different points in time in the event timeline. As another example, server system 18 determines the number of event observers 12 that feedback indicium for the event 30 is received from.

In various embodiments, the generation of feedback results is an ongoing and cumulative process. In cases where the event 30 being observed and analyzed is pre-recorded, observers 12 providing feedback indicia may not be providing such feedback at the same time. For example, if an event 30 is a video on the internet (for instance on YouTube), the feedback may not be provided by all observers 12 at the same time. Therefore, the server system 18 is operable to update the feedback results anytime new feedback indicium from an observer 12 is provided.

At least some feedback indicia for the event 30 may be associated with a first observer 12 and at least some other feedback indicia for the event 30 is associated with a group of other observers 12. The feedback results may include a comparison of the at least some feedback indicia for the event 30 associated with the first observer 12 to the at least some other feedback indicia for the event 30 associated with the one or more other observers 12.

In some embodiments, an observer 12 may be able to choose one or more other observers 12 to compare feedback indicia with. In other words, an observer 12 may be able to define and select his own set of audience in order for the server system 18 to generate feedback results that include a comparison of the feedback indicia of the first observer 12 to feedback indicia of the selected audience. For instance, an observer 12 may want to compare his feedback indicia to the feedback indicia of other observers 12 of same location, age, gender etc.

In some embodiments, the host 4 may register, with the event record, a list of characteristics, such as for example, location, age, gender, nationality, mobile device type and mobile device model. In some other embodiments, the list of characteristics may include source information identifying a user or an observer 12. The server system 18 may be operable to use such characteristic and source information to either determine aggregate feedback results or segregate feedback results accordingly. In other words, the server system 18 may filter out those feedback indicia that do not satisfy the characteristic or source requirements of the event record while determining an aggregate feedback result array.

In some embodiments, the received feedback indicia for the event 30 may be associated with an observer 12, and the feedback results may be specific to the observer 12 by aggregating the received feedback indicia for the event 30 associated with the observer 12.

In some embodiments, an observer 12 may be able to create a unique account on the server system 18 which may or may not be password protected. Observer 12 with the account may allow the server system 18 to display the observer 12 feedback results to one or more other observers 12. The observer 12 with the account may determine the qualifications of the one or more other observers. For instance, the one or more other observers may be limited only to those who are friends of observer 12 with the account. One or more other observers 12 may also elect to 'follow' the observer 12 with the account. By following the observer 12 with the account, one or more other observers or followers may be able to receive automatic updates of feedback results of any future events 30 observed and evaluated by observer 12.

As an example, feedback results may compare an observer's 12 own feedback indicia with the feedback of others who had previously or at the same time watched the event. This might work differently in real-time and with historical events.

In the real-time case, observer 12 may track their own enjoyment of the event. Thus, in a graph representing feedback results their own trajectory would be going up and down up to the present moment. At the same time the device 14 might provide an aggregate trajectory, which would not go up to the present moment as some processing would be involved, but could comprise earlier times in the event. Thus, the observer 12 could track their relative enjoyment, or lack of enjoyment, of an event.

In the historical example, where the observer 12 is watching an event that other observers 12 have already rated, the feedback results may be completely up-to-date. The device 14 and client 16 may provide a user interface or user display, which shows both the observer's 12 feedback results, and the aggregate feedback results, or alternatively, just shows the difference between the observer's 12 feedback results and the aggregate feedback results.

In some other embodiments, the system 10 may have celebrity accounts at the server system 18. A celebrity may be a national or an international person or entity who may have achieved some degree of frame among the masses. In some embodiments, the observers 12 may be able to view and or receive feedback as provided by the celebrities. In some other embodiments, the observers 12 may also be able to purchase a view of the celebrity feedback indicia or results at any time in the future. In yet some other embodiments, the observers 12 may be able to request an overlay of the celebrity feedback indicia over the observer's own feedback indicia. The observer 12 may also request the overlay of feedback indicia from a selected number of individuals (such as the observer's Facebook friends), observer's own feedback and feedback from one or more celebrities, or any other combination of these.

The system 10 may maintain agreements or contracts with celebrities such that celebrities receive a certain amount of money or a share of profits depending on how many events they provide feedback for. For instance, it may be a 5% share of the profits if a celebrity provides feedback for one event, but the share may go up to 7% if feedback is provided for two events.

The system 10 may maintain a list of subscribers who may be interested in purchasing feedback provided by celebrities. The system 10 may provide for various subscribers to enter into an agreement or contract where they pay a certain amount of money to receive feedback from a celebrity. The purchase price may vary depending on the number of celebrities a subscriber is interested in viewing feedback results from. The purchase price may further vary if a subscriber wants to view an overlay of celebrity feedback results over his own feedback results.

In various embodiments, an observer 12 may send a request to the server system 18 to receive feedback results at any time. It is not mandatory for the observer 12 to receive feedback results as soon as they are generated at the server system 18. The observer 12 may be able to access the feedback results the next day of the event, or a month therefrom, or till any time depending on storage capabilities of the server system 18.

At step 110, server system 18 provides a representation of the feedback results. As noted herein, a representation may be a chart, graph, table, or other representation of the feedback results in a wide variety of formats depending on the beneficiary 22 or device 14, for example.

In some embodiments, client 16 sends a request to the server system 18 to receive feedback results. In some other embodiments, client 16 automatically receives feedback results from the server system 18 as soon as they are available. In those embodiments, where the client 16 sends a request for feedback, one or more of unique identifiers, such as for example observer identifier, device identifier, voter identifier etc., may have to be provided to the client 16 to be transmitted to the server system 18. The front-end of the server system 18 may be operable to search the database and return aggregated and analyzed feedback results to the client 16.

The individual observer 12 data (including feedback results specific to the observer), along with the aggregated data (including feedback results) from all observers 12 may be sent to clients 16 from the server system 18 as specified by the host device 6. The client 16 receives the data and provides a representation of the data as specified by the host device 6 to the device(s) 14 for viewing or storing by the observer 12.

The server system 18 may also provide a representation of the feedback results to one or more beneficiaries 22. Depending on the default parameters or the parameters specified by the host device 6, this may include, but not be limited to, all the feedback indicia captured from observers 12, or selected and processed feedback results as it applies only to that particular beneficiary or beneficiaries 22.

A type of beneficiary is an event transformer 28. An event transformer 28 may receive feedback results from the server system 18, and then analyze and transform the feedback results into data that is used to affect the progression of the event 30.

Another type of beneficiary is a proxy 26. The feedback results received by a proxy 26 may be forwarded to other Interested Parties 24.

A milepost creator 29 is operable to create the mileposts before, during, or after the event 30 by making references to activities, feedback indicia, and feedback results that occur at specific points in event time line. The milepost creator 29 may provide additional data about the activities that may, along with the mileposts, be included as part of the analysis, packaging, and distribution of the information to the beneficiaries 22.

The event timeline and mileposts associated therewith may be created and packaged and transferred to the server system 18. The server system 18 may correlate the mileposts in the event timeline with observers' 12 data and transmit this analysis to beneficiaries 22.

Figure 6:
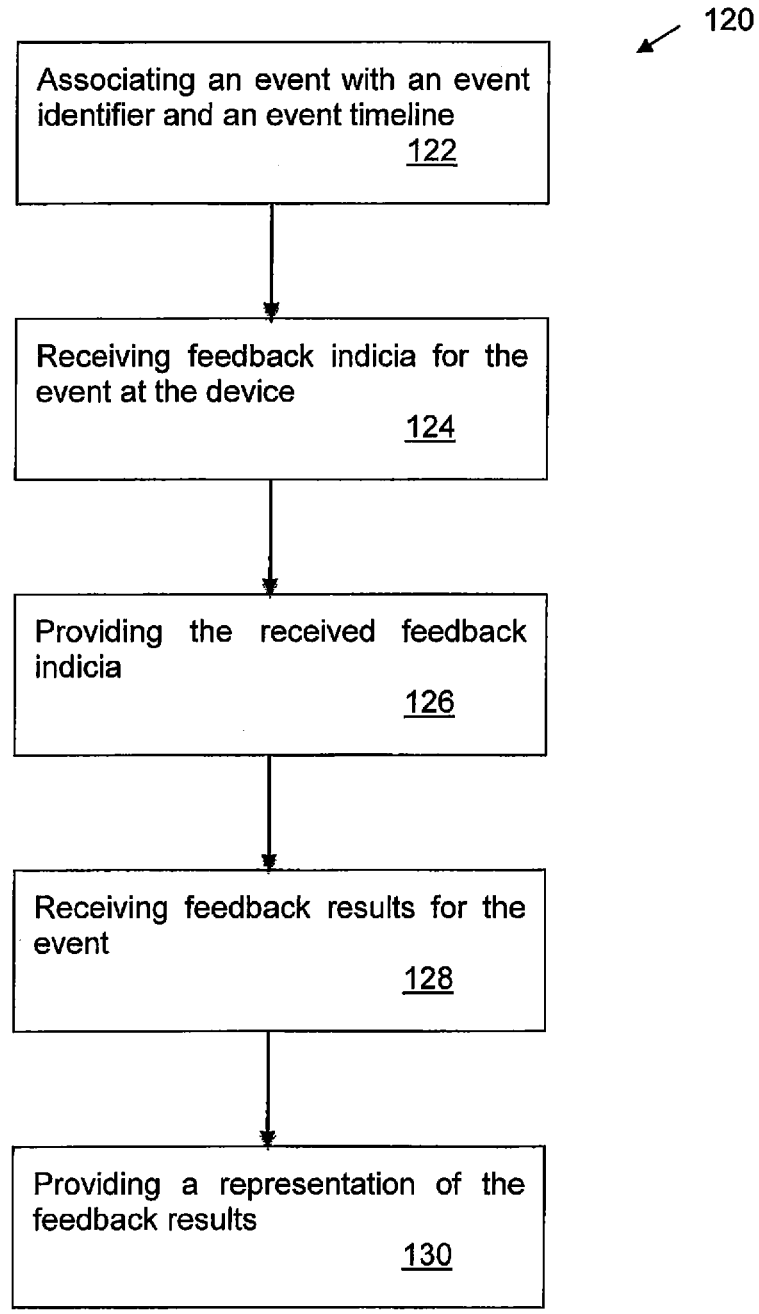
FIG. 6 is a flowchart diagram of another method for capturing event feedback in accordance with at least one embodiment.

Reference is now made to FIG. 6, which illustrates a flowchart diagram of a method 120 for capturing event feedback implemented by client 16 in accordance with at least one embodiment.

At step 122, client 16 associates an event 30 with an event identifier and an event timeline that defines a period of time for the event 30. For example, client 16 may receive an electronic invitation for event 30 feedback at the device 14, wherein the electronic invitation configures the device to receive and provide the feedback indicia for the event 30. As another example, the client 16 may receive a list identifying events 30 at the device 14, where each event 30 identified in the list is associated with an event identifier or reservation identifier. The client 16 may receive a selected event 30 identified in the list. The client 16 may receive feedback indicia for the selected event 30 at the device 14 and associate the received feedback indicia with the event identifier associated with the selected event 30.

At least some of the events 30 identified in the list may be associated with a geographic location. The client 16 may determine a geographic location of the device 14, provide the geographic location of the device 14, and receive the list identifying the events 30 based on the geographic location of the device 14. At least some of the events 30 identified in the list of events 30 are associated with a geographic location proximate to the geographic location of the device 14.

At step 124, client 16 receives a plurality of feedback indicia for the event 30 at a device 14. Each feedback indicia is associated with a timestamp and each timestamp indicates a point in time within the event timeline. The device 14 may receive input data, such as a keystroke that corresponds to a measurement value, and provide the input data to the client 16 for conversion into input data.

The event timeline defines a collection of mileposts, where each milepost is a reference to a point in time within the event timeline. The received feedback indicia may be associated with one or more mileposts, such that the feedback indicia provide a measurement of the milepost of the event 30.

Examples types of feedback indicia include human feedback, environmental feedback; biometric feedback; and electro-mechanical feedback. Examples of human feedback include a value corresponding to a rating metric, activation or repeated use of a button, movement of a slider bar, clapping hands and so on. Examples of biometric feedback include heart rate, DNA, fingerprint data, voice data, iris recognition, and so on. Environment feedback is also referred to herein as environmental indicia.

The client 16 may also receive environmental indicia captured by device 14, such as date, time, longitude, latitude, altitude, sound levels, light levels, colors, images, videos, temperature, smell, acceleration, video, images, humidity, air pressure, and wherein at least some feedback values for the event 30 are computed based on the received environmental indicia for the event 30.

At step 126, client 16 validates and provides the received feedback indicia for the event 30 to server system 18. The client 16 may register the device 14 and assigning a device identifier to the registered device, and provide the received feedback indicia for the event 30 to server system 18 in association with the device identifier. Examples of validation include checking the format of the feedback indicia and checking completeness of the feedback indicia.

At step 128, client 16 receives feedback results for the event 30. As described herein, the feedback results comprise a vector of feedback result values for the event 30, where each feedback result value is associated with a point in time within the event timeline. Each feedback result value for the event 30 is computed by aggregating received feedback indicia for the event 30 based on their associated timestamps. For example, all feedback indicia associated with the same timestamp (or proximate timestamps) may be correlated At step 130, client 16 provides a representation of the feedback results. For example, client 16 may display a representation of the feedback results on display 32 or output a representation of the feedback results using peripherals 42 or I/O devices 36. In some embodiments, the client 16 may be operable to create a representation of the feedback results. The client 16 may receive feedback results from the server system 18 as a table of data, stream or block of data, and may be operable to create a representation, such as for example, a graph, chart, image, of the feedback results. The client 16 may also be operable to generate feedback results and then create and provide a representation thereof.

There are various applications for the example embodiments described herein.

For example, the event 30 may be a movie. The literary device of dynamic story lines could be expanded to movies where the observers 12, through its feedback, could influence which story line is chosen as the movie progresses. Some movies have multiple story lines weaved through the movie. If the observer 12 feedback shows that a particular storyline is not of interest, the (digital) movie would be altered to attenuate the storyline. This is applicable to TV shows, radio programs, online media and any other capable media. TV shows that depend on character development for story continuity can glean detailed feedback indicia and feedback results to change a characters role, i.e. a main character is leaving for another town but observers 12 want him to stay yields as a better storyline.

The event 30 may also be an award show. Live events 30 like award shows can be custom tailored based on reactions from observers 12 i.e. criticisms of the hosts. The show's producer (an example beneficiary 22) would be able to determine on-the-fly if changes are needed to alter the event 30 to accommodate current feedback.

Another example event 30 may be reality shows. Reality show producers could use the feedback provided by observers 12 during a live production to influence the show. More detailed scoring allows for changes in following weeks. For example, on a talent singing show, the observer 12 feedback indicia may indicate that group songs are not as popular as single songs or that Beatles songs are more appreciated than Jazz.

An event 30 may be a political debate. Moment-by-moment feedback indicia from observers 12 during political speeches enable politicians to determine the perception (from most favorable to most unfavorable) of each statement, answer or position taken during the speech. Additionally the questions asked by the moderator could be evaluated by feedback indicia for his\her effectiveness.

Another example is education and business. A meeting organizer (where the meeting could be a class, seminar, conference, trade show, focus group or business meeting) can receive feedback indicia from observers 12 in the audience in response to questions asked from the presenter. The feedback results may be displayed immediately in the presenter's charts. Additionally, the effectiveness of presenters can be evaluated moment-by-moment for immediate or future use.

Another example event 30 is sporting events and artistic performances. Part of the fun of attending a sporting event 30 or performance is the "roar of the crowd". This aspect is missing when viewing the event 30 remotely. Embodiments can break the feedback data down geography and bring together the "virtual crowd". This adds enjoyment to the game or performance and makes the fan reaction interactive among fans (observers 12). Boxing is the only sport where the score and results are not known until the end of the bout. Additionally there is often a lack of understanding supporting the judges' scorecards. Embodiments described herein can be used to announce a fan's score round by round. The same logic can be associated with the Olympics and other tournaments where embodiments can be used to judge figure skating and gymnastics.

An event 30 may involve theater. On Broadway, understudies are used to fill in when the main actors are unable to perform. The embodiments described herein can help producers and directors evaluate the performance of the understudy by seeing the audience feedback for moments where the understudy performed and compare it to the moments where the regular actor performed. The understudy may be more crowd-pleasing than the regular actor.

The server system 18 operable to receive environmental indicia from clients 16 and devices 14.

Environment indicia can be captured from a mobile device, including longitude, latitude. With these indicia, server system 18 is able to discern whether the position of the observer 12 matters in the enjoyment of the event 30. It could be as small as the different locations in a theater or stadium or as large as global differences. For a worldwide event 30, altitude and longitude will allow feedback indicia and feedback results to be aggregated by country. For a national event 30, it will allow data analysis by state or zip code.

Altitude may be environmental indicia. Similarly to longitude and latitude, altitude could be used to discern whether the position of the observer matters in the enjoyment of the event 30. For example, in the case of a rock concert being played in a stadium, the server system 18 could figure out if the feedback from observers in the bleachers was better or worse than those at ground level.

Another example is sound levels. If the event 30 was being watched simultaneously in multiple locations (e.g., a football game being watched from sport bars around the country), the feedback indicia could consist of how loud the crowd reaction were to the event 30.

Environmental indicia may also include acceleration. Instead of sliding a finger on a device 14, users could shake the device 14 and the intensity of the movement would be interpreted by the three-axis gyroscope paired with the accelerometer to convert device 14 movement and convert the data to a 1-10 scale—the harder you shake your device 14 the more you like the rock concert you're watching. Note that this is very specific to device 14 but other mobile devices may also be used.

Environmental indicia may rely on existing technology at device 14.

Another example is colors and light levels. Studies show that certain colors have psychological effect. Pink calm prison inmates. Restaurants use orange because it makes people hungrier. With recurring events 30, producers can try different color combinations to see what gives the desired emotional response as audience feedback. The camera on the device 14 detects the predominant colors and sends this information with the observer 12 feedback. The analysis of the aggregated feedback data compared to historical feedback data can tease out the effect of color on the performance.

A further example is heart or pulse rate. Embodiments described herein could be used to help people improve their training. For example, a cyclist (observer 12) could wear a heart rate monitor and register his/her heart rate at various points in time during a circuit repeated over multiple days. Using the feedback data (e.g., maximum, minimum and average heart rate) at various points during the circuit the athlete could improve training. Alternatively, if all participants in a race were connected, the participants could see how they are doing compared to others or spectators could see how their favorite athlete is doing compared to the field. Additionally, server system 18 and client 16 could be used at a theme park to score or provide feedback on various rides like a roller coaster. The increase in pulse rate may be compared to other riders on that run as well as all riders that day\month etc. and displayed at the entrance. Can be used across the country for a 'best in the nation' rated ride. Finally, using biomedical feedback successes and declines for patients undergoing physical therapy sessions can be monitored more effectively in the home using a smartphone or similar device 14. Portability without additional expense to the patients.

Images and videos may also be used as feedback indicia and feedback results. People often attend events 30 not only for the event 30 itself, but also for the "roar of the crowd". Images and video may provide a clue to the reaction of the crowd as a whole. Are they standing up? Are they stone still? Are they constantly in motion? Images provide this information. Another use of images would be to have the device 14 simply capture an image of the observer's 12 facial expressions. Software exists to distinguished different facial expressions. These expressions could then be quantified and returned as feedback indicia.

Temperature may also be environmental indicia. During an outdoors event 30 such as golf tournaments, organizers could determine if increase/decrease in temperatures has an impact of enjoyment of the event 30. Air pressure is a further example. An event 30 may have a large sound component. Air pressure affects sound. By detecting the air pressure at the event 30, the results may be able to determine that the air pressure affected the audience feedback. This information is useful to audio engineers who can compensate for this. Humidity is another example. Using server system 18, a movie theater may detect that a particular audience (observers 12) did not enjoy a performance as much as other audiences. One of the environmental indicia or factors under the control of the theater owner is the humidity. Should it be determined that the humidity level was the only significant variable then the movie theatre operator can adjust the humidity levels in response to feedback indicia.

Figure 9:
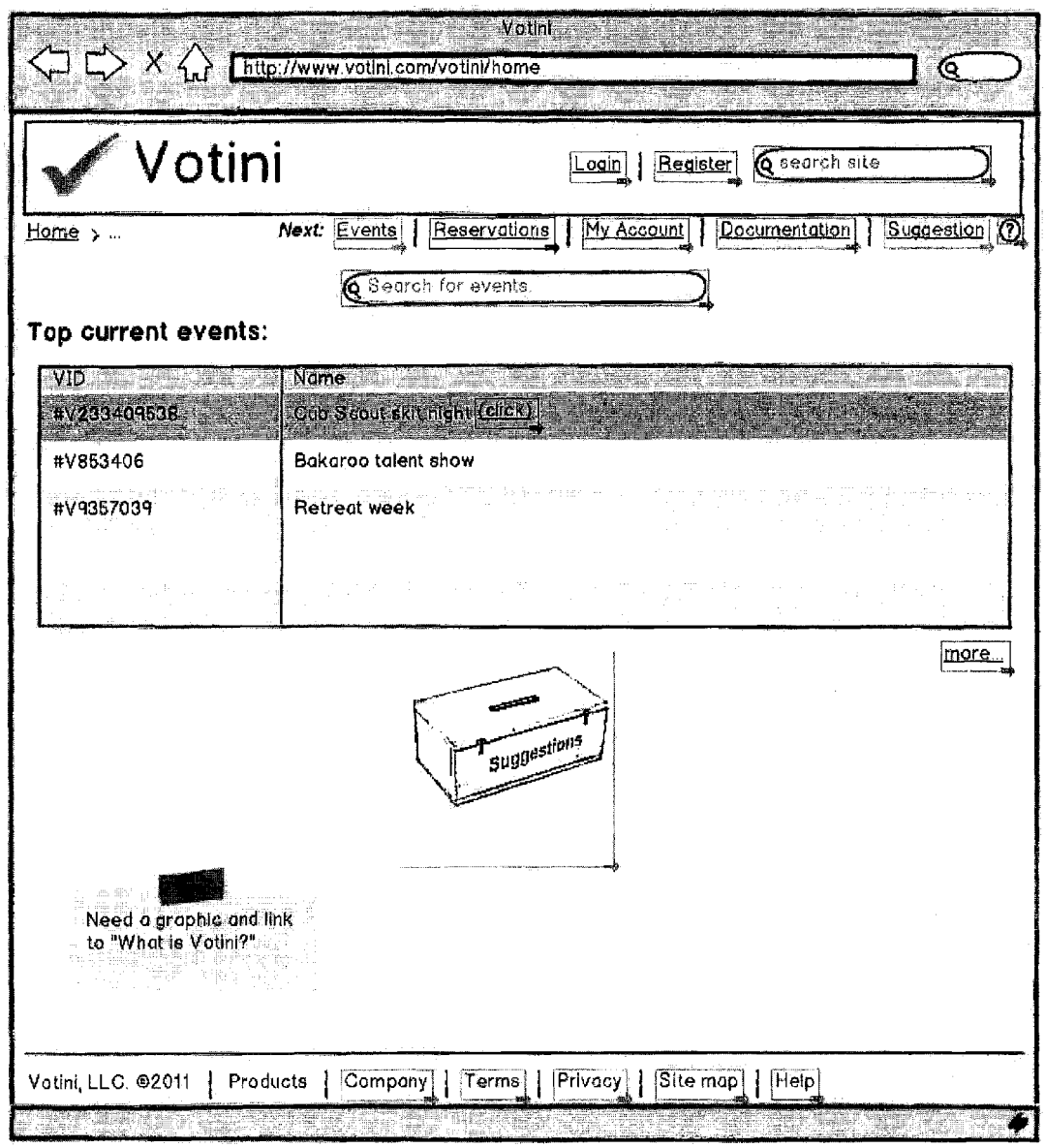

Reference is now made to FIGS. 9 to 49 illustrating system 10 in accordance with some embodiments. As illustrated in FIG. 9, even before logging in to the system 10, in this example referred to as Votini, which is implemented as an online website, an individual may be able to view a list of top current events (shown using an event identifier and a corresponding event name). This page may also contain a link to a suggestion box usable by any individual to provide suggestions to Votini. The page also contains a graphic and a link to a page called 'What is Votini?' The page may also contain links to Products, Company, Terms, Privacy, Site map and Help. Additional links may include links to Events, Reservations, My Account, Documentation, and Suggestion. The user may also have the option to Login or Register themselves with the system 10. The user may also have the option to use 'Reservations' to register an event 30 with the system 10.

Figure 10:
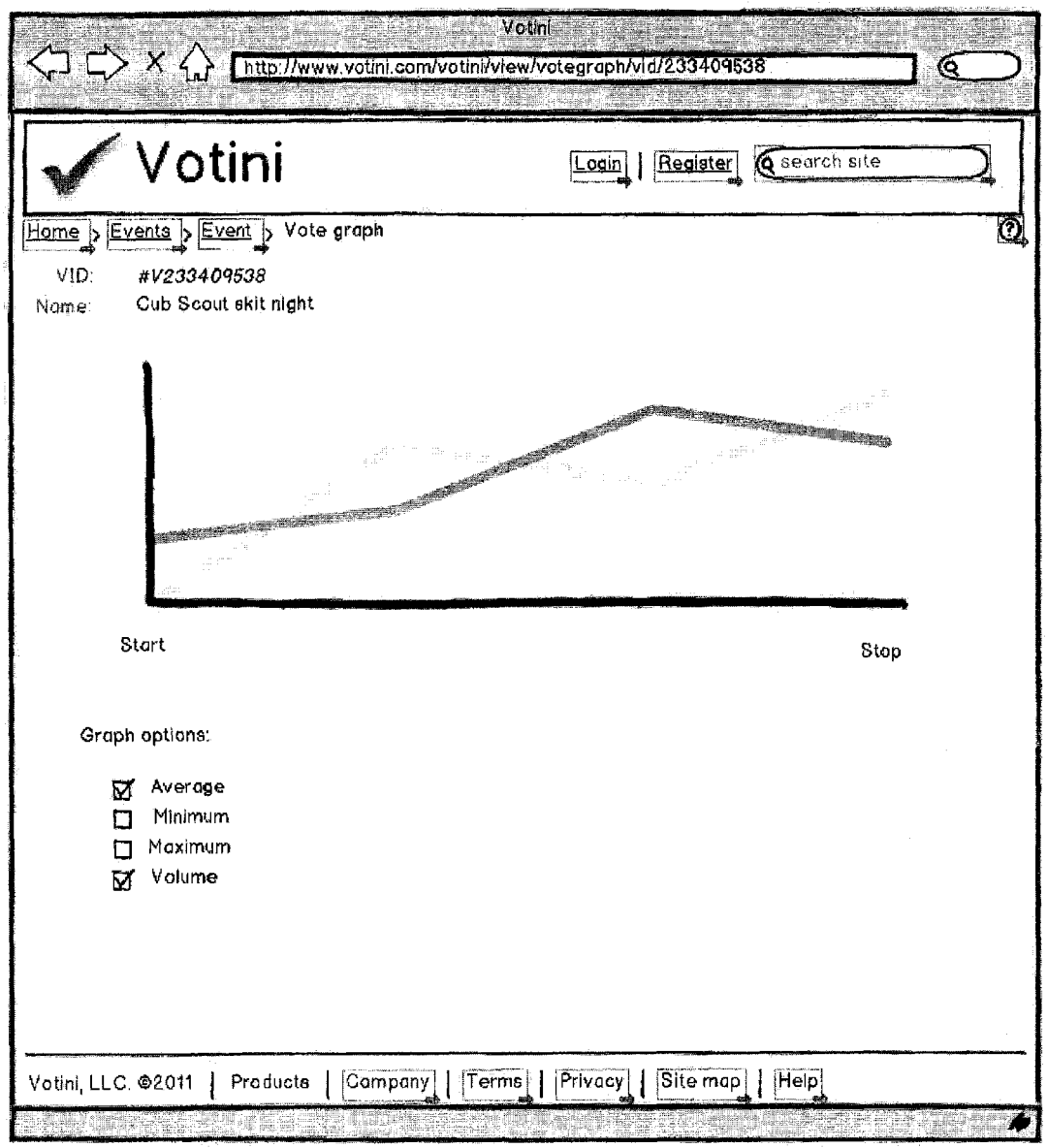

FIG. 10 illustrates accessing the Vote graph tab through Events tab in order to view one or more graphs representing an aggregate feedback result for an event. The Vote graph page may include an event identifier, the corresponding event name, and one or more graphs for the duration of the event. Various graph options may be provided to the user to control what is plotted in a graph; the options include: average, maximum, minimum and volume. The graph in this figure shows the simultaneous plotting of Average and Volume options against the duration of event or any other adjusted time.

Figure 11:
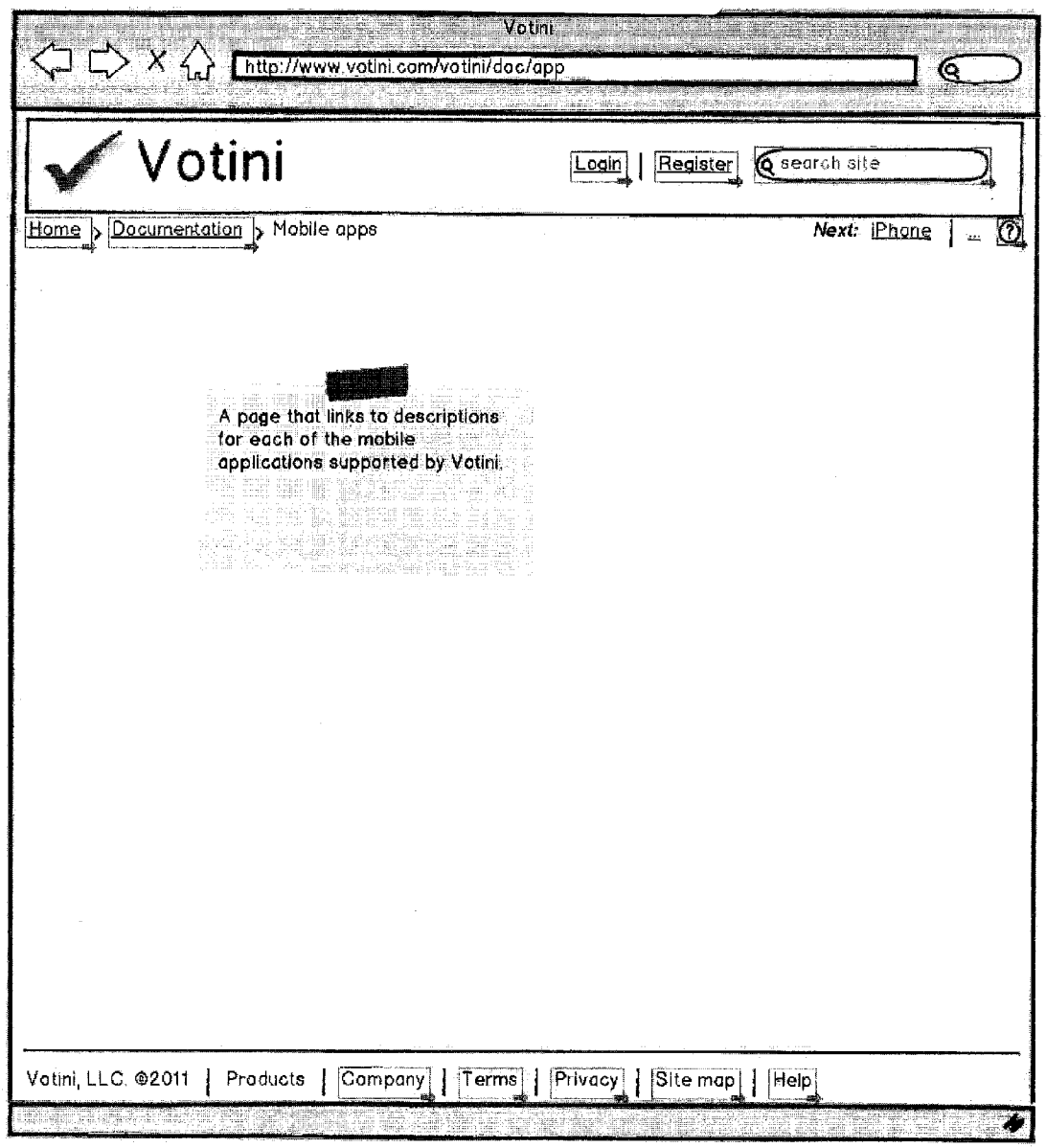
Figure 12:
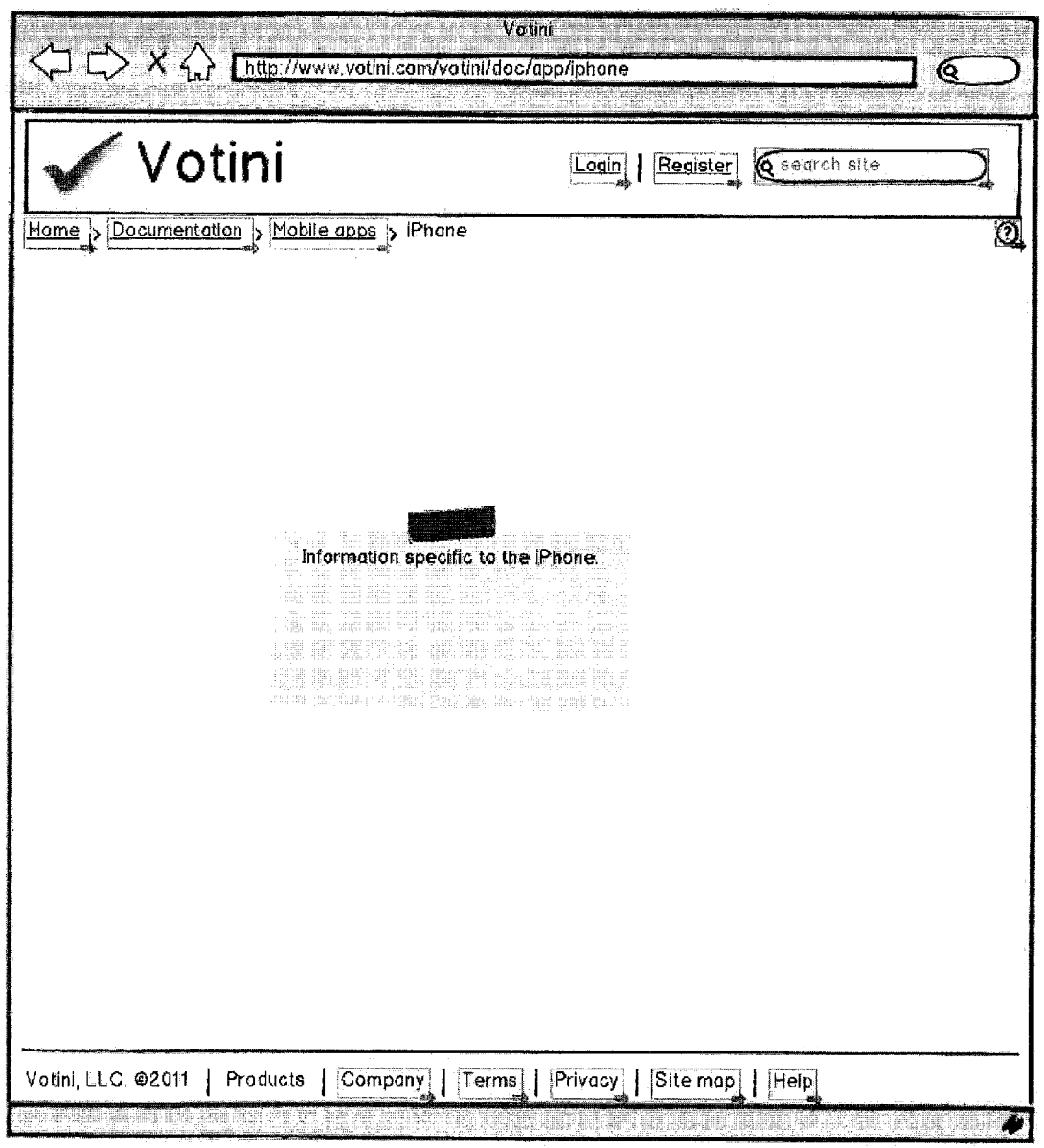

As illustrated in FIG. 11, the Mobile Apps page may be accessed to see the descriptions for each of the mobile applications supported by Votini, and to link to the various mobile apps. FIG. 12 illustrates accessing iPhone tab using Mobile apps tab where information specific to the iPhone may be provided. Similar pages may exist for other phones for which Mobile apps of the system 10 are available.

Figure 13:
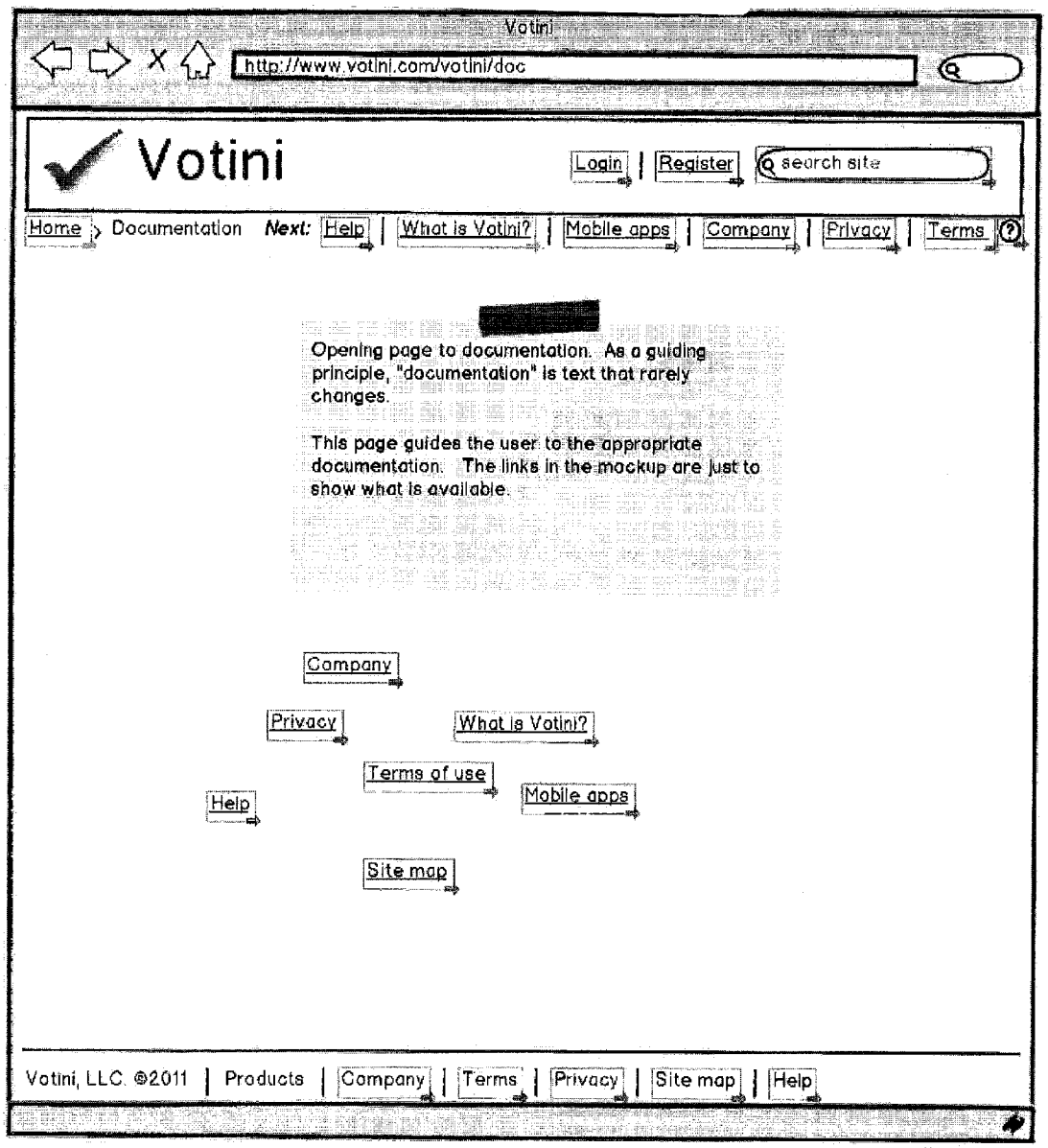

FIG. 13 illustrates accessing Documentation tab to access a documentation page. As a guiding principle, the documentation text on this page rarely changes. This page guides the user to an appropriate documentation. Certain links may be made available to the user on this page; examples include: Company, What is Votini?, Privacy, Terms of Use, Mobile apps, Help and Site map. These tabs may appear anywhere on the page, for instance as a list of link or tabs, or on the top right corner of the Documentation page.

Figure 14:
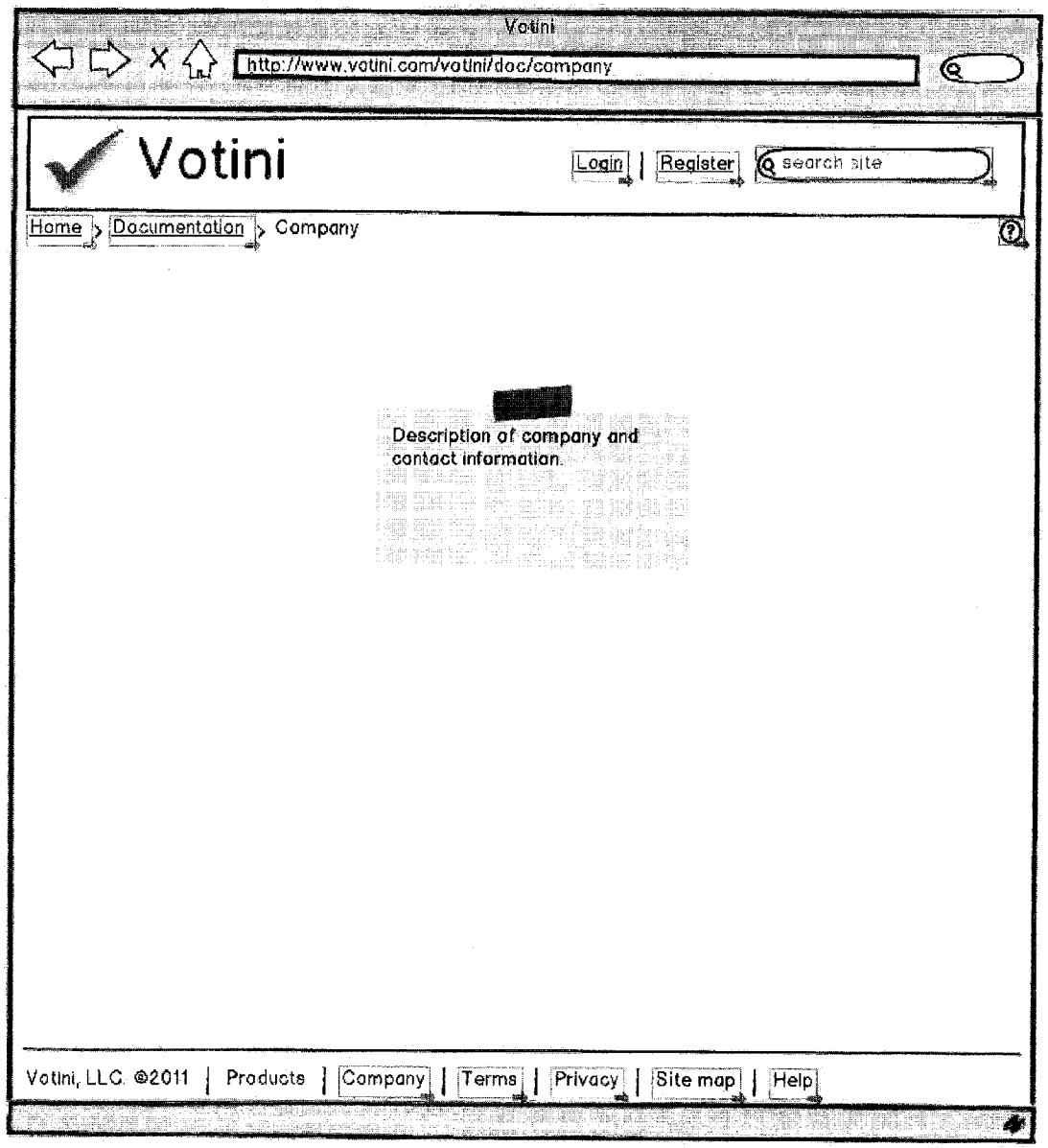
Figure 15:
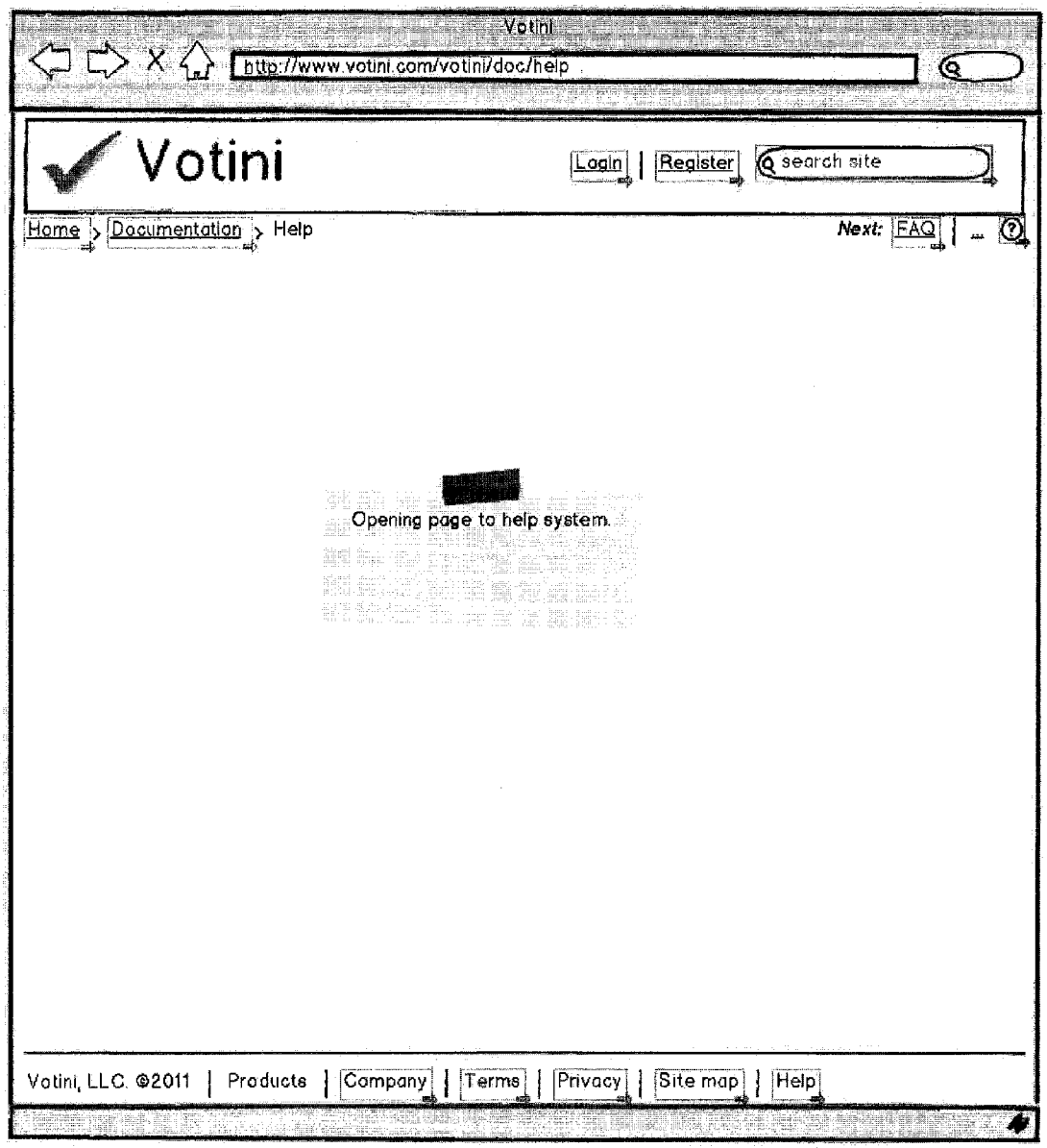
Figure 16:
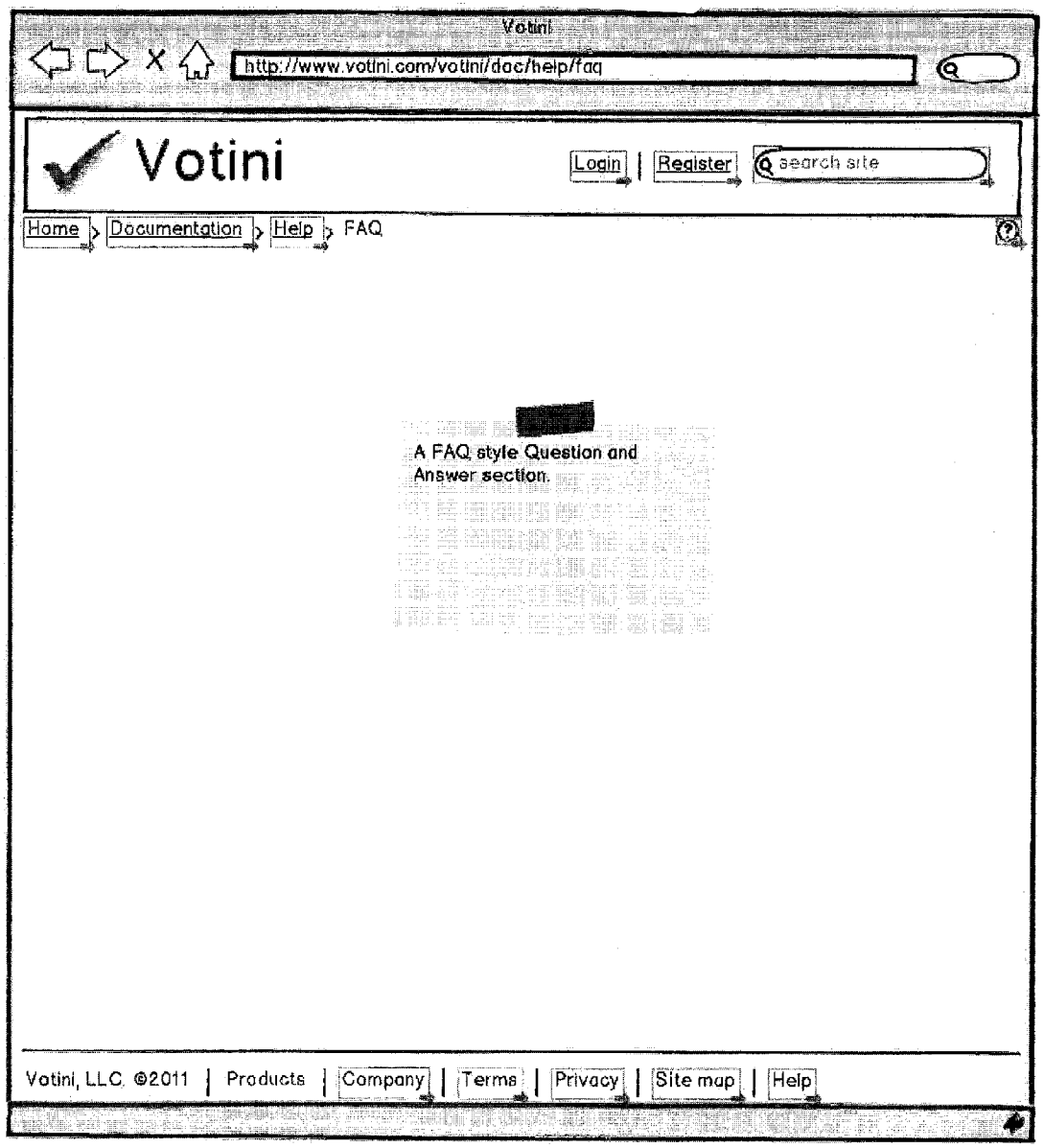
Figure 17:
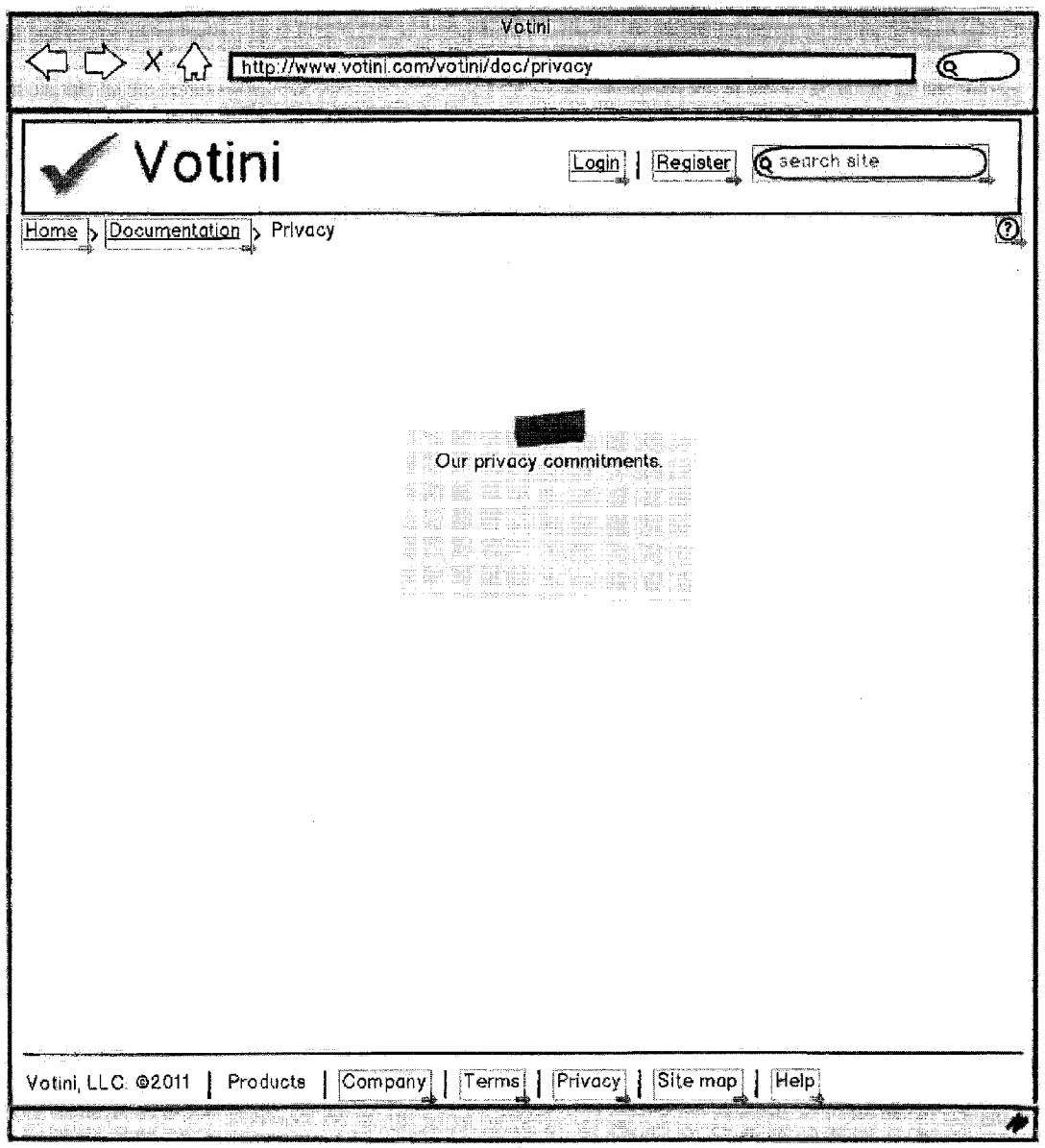
Figure 18:
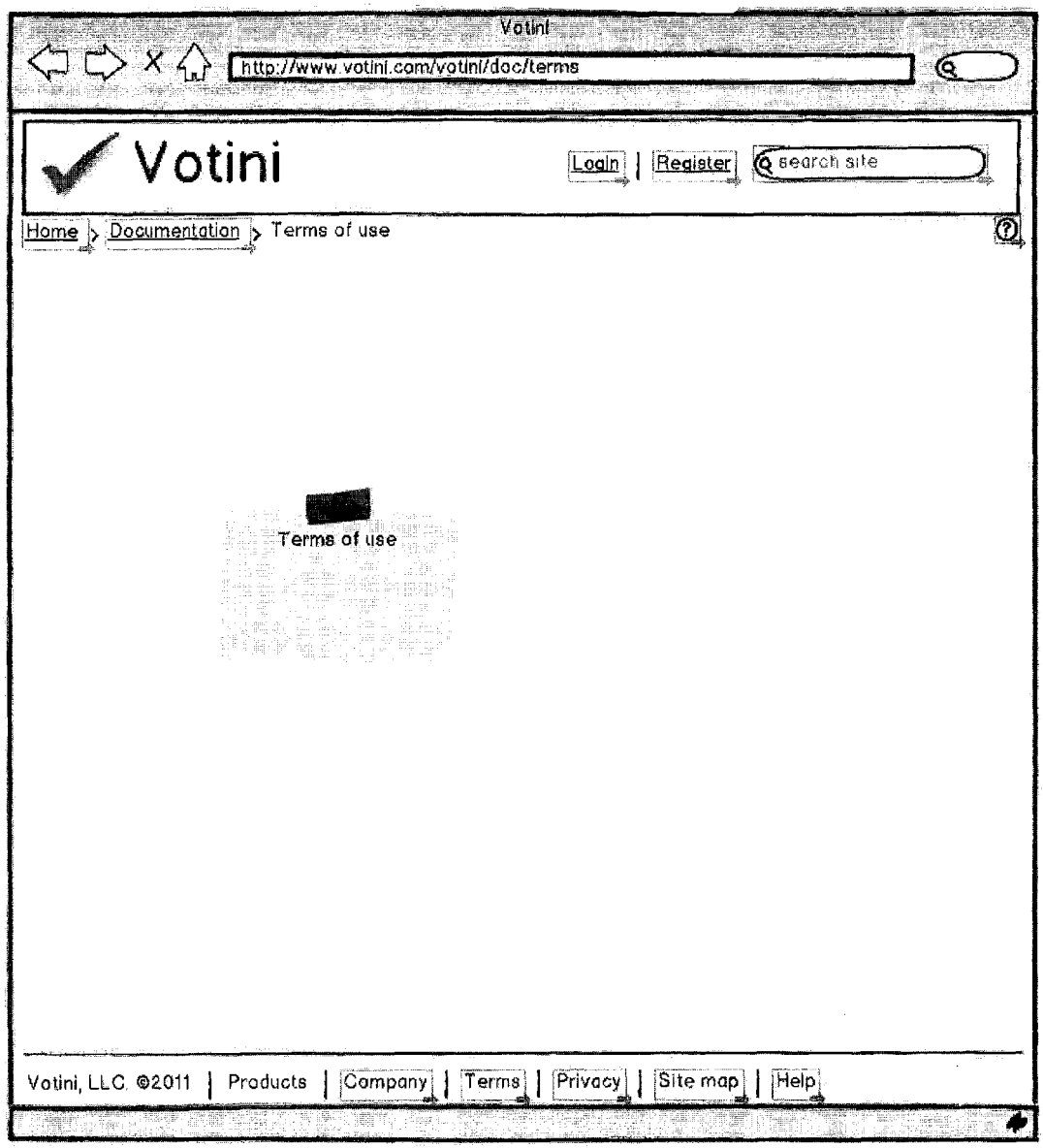
Figure 19:
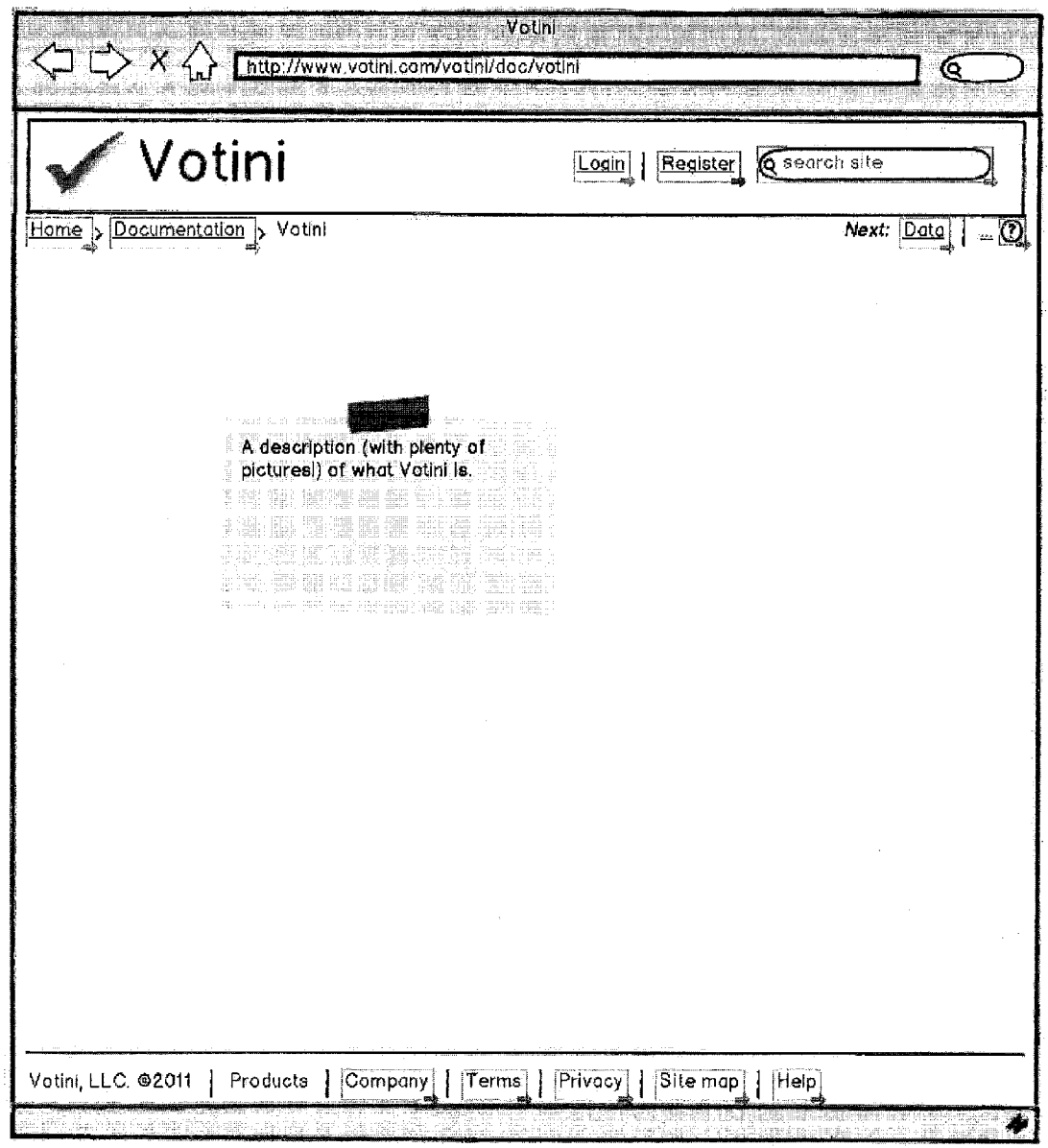

As illustrated in FIG. 14, the Company tab may be used to access description of company and contact information. FIG. 15 illustrates accessing Help option to open a help page for the system 10. FIG. 16 illustrates the availability of FAQ style questions and answers through the Help tab. FIG. 17 illustrates the availability of system 10 privacy commitments. As illustrated in FIG. 18, the user can access the 'Terms of Use.' FIG. 19 illustrates that the user can click on Votini tab to see a description (including text and pictures) of what Votini is.

Figure 20:
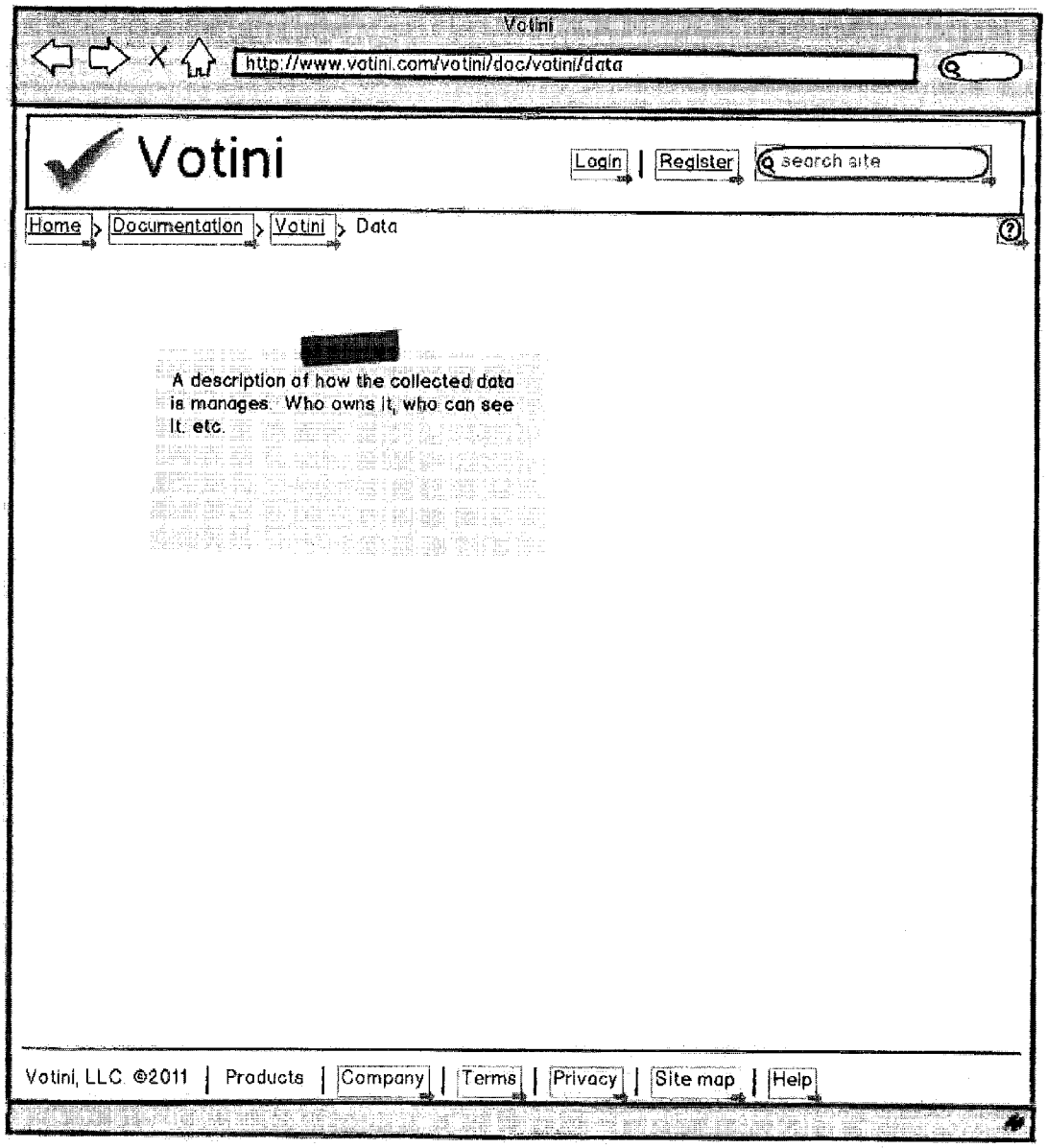
Figure 21:
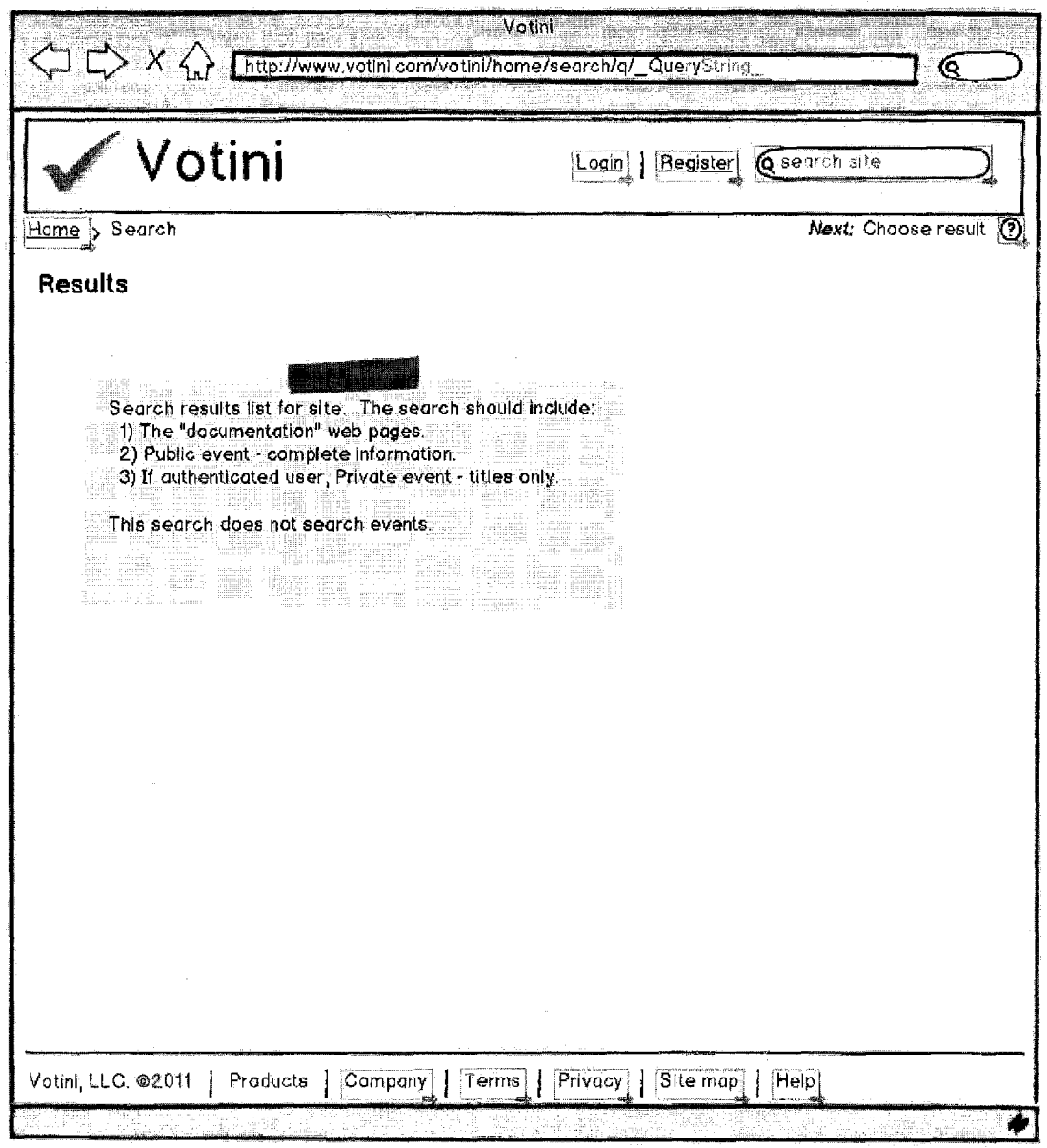

FIG. 20 illustrates that a data tab may be used to see a description of how the collected data is managed by the system 10. Information such as who owns the data, and who can access it etc. are all outlined here. FIG. 21 illustrates a search option for the users. The search does not search events, rather includes the 'Documentation' web pages. The search results list generated in response to a search may include complete information for private events but only a list of titles for private events and that too only to the authenticated users.

Figure 22:
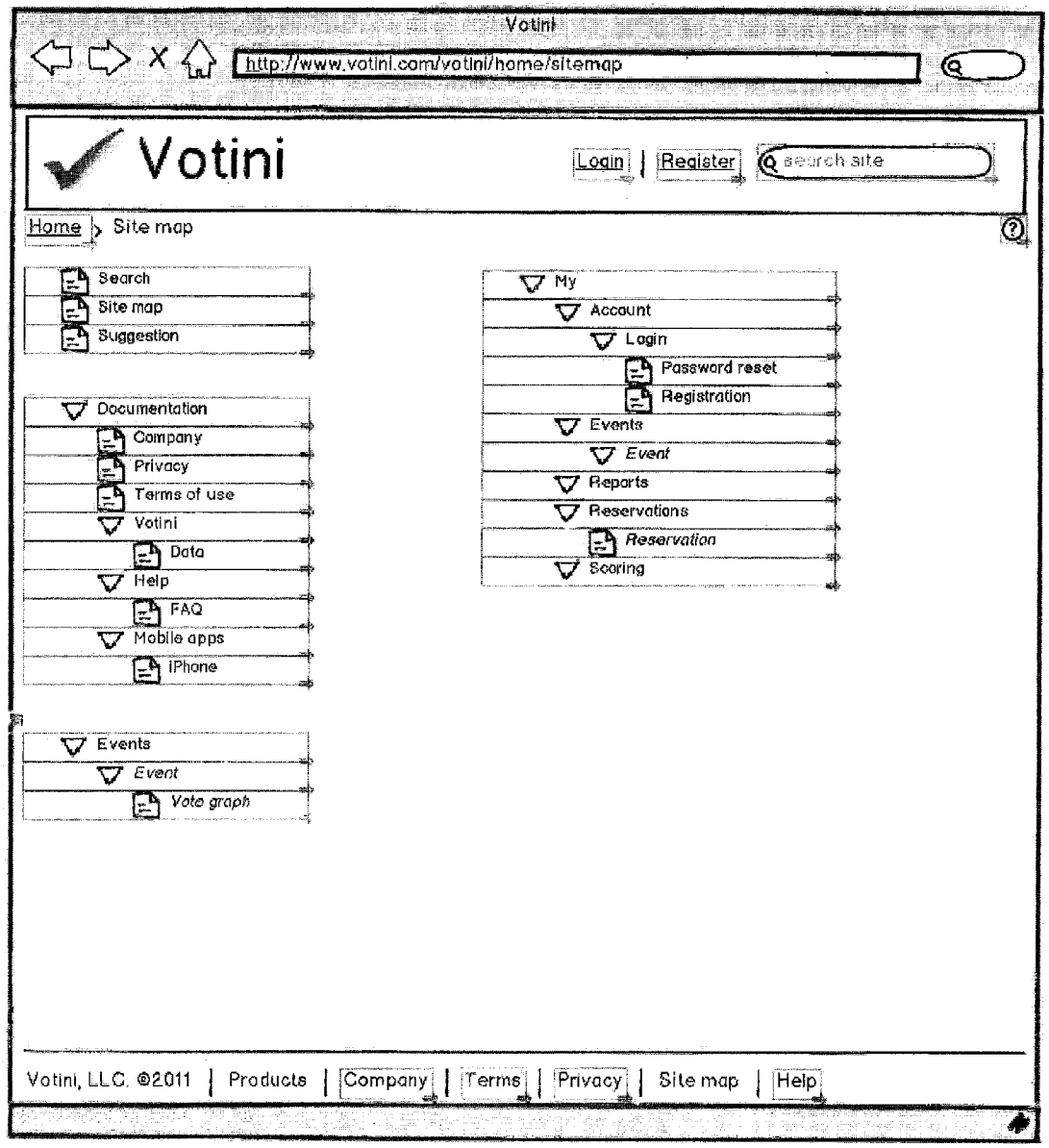

FIG. 22 shows a Votini site map made available to a user. The sitemap may include the following tabs: Search, Site map, Suggestion, Documentation, Events and My. The Documentation, Events and My tabs may be clicked for a list of more options. Documentation tab includes other options, such as Company, Privacy, Terms of use, Votini (linking to Data repository), Help (linking to FAQs), Mobile Apps (providing applications for various phones such as iPhones). The Events tab may link to a list of events and results (may be in the form of a Vote graph) for each event. The My tab may link to Account (further linking to a Login tab, Password reset tab and Registration tab), Events (linking to an event tab), Reports, Reservations (linking to a reservation tab) and Scoring.

Figure 23:
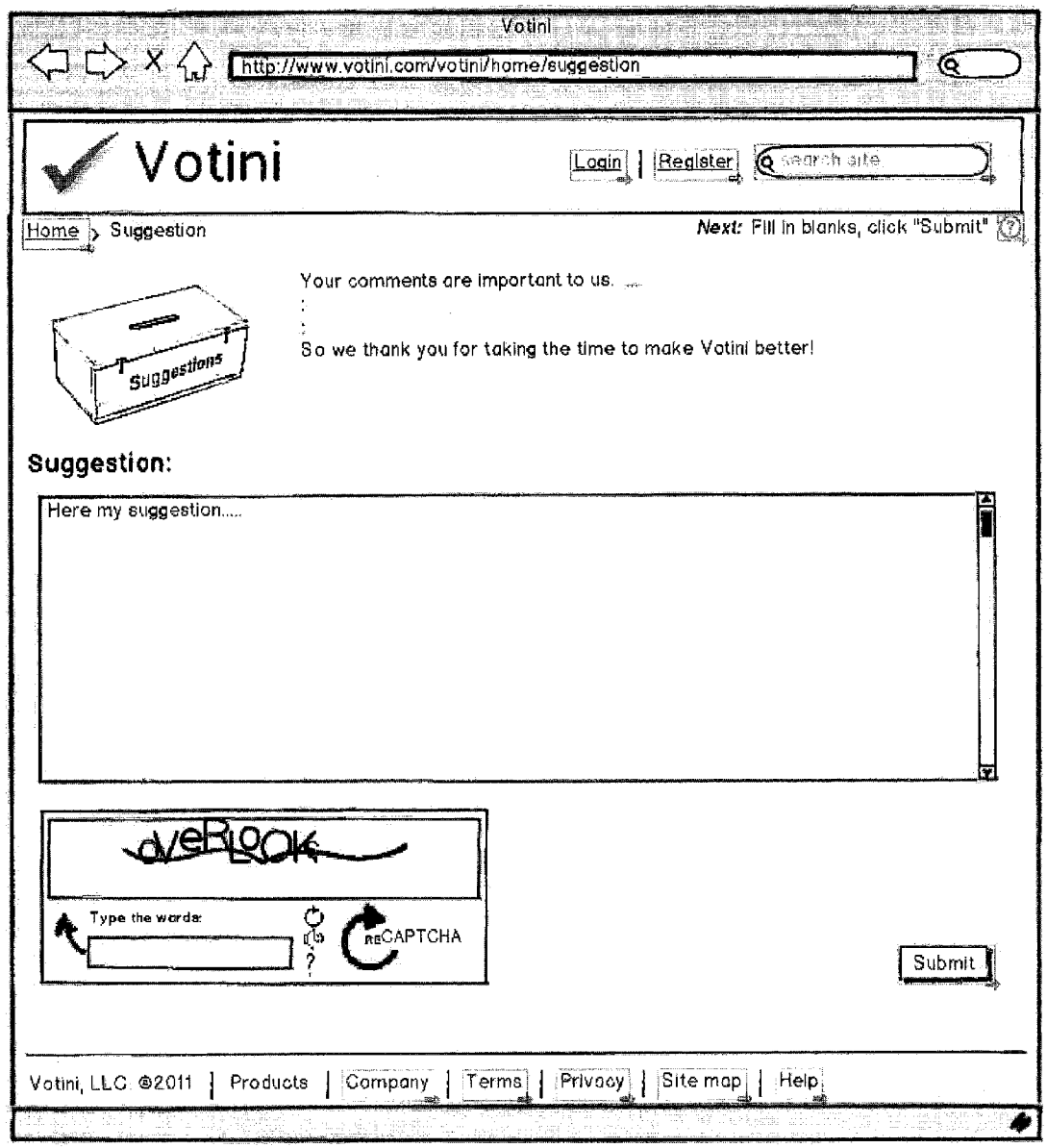
Figure 24:
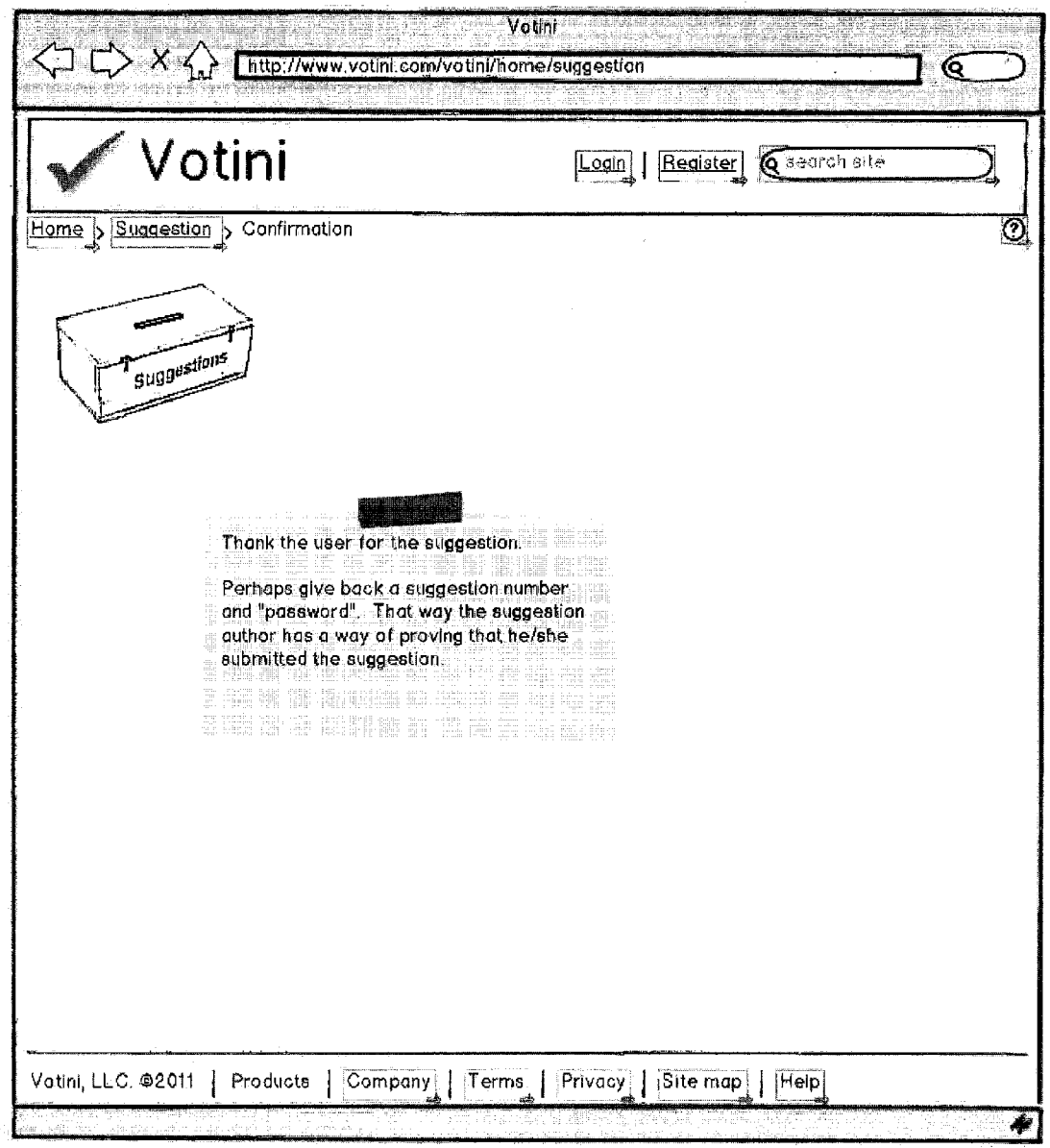

FIG. 23 shows the suggestion page where the user is informed that his/her comments are important to Votini, and is provided with a Suggestion box to fill out his suggestion. In order to tell a human from a machine entering a suggestion, the user may be prompted to type a string of letters (or a string of letters and numbers) in a field, such as in a CAPTCHA process. A CAPTCHA is a type of challenge-response test used in the field of computing as an attempt to ensure that the response is generated by a person. The suggestions can then be submitted using a 'Submit' button. FIG. 24 illustrates that a user may be provided with a suggestion number and 'password' confirming that the user has submitted a suggestion.

Figure 25:
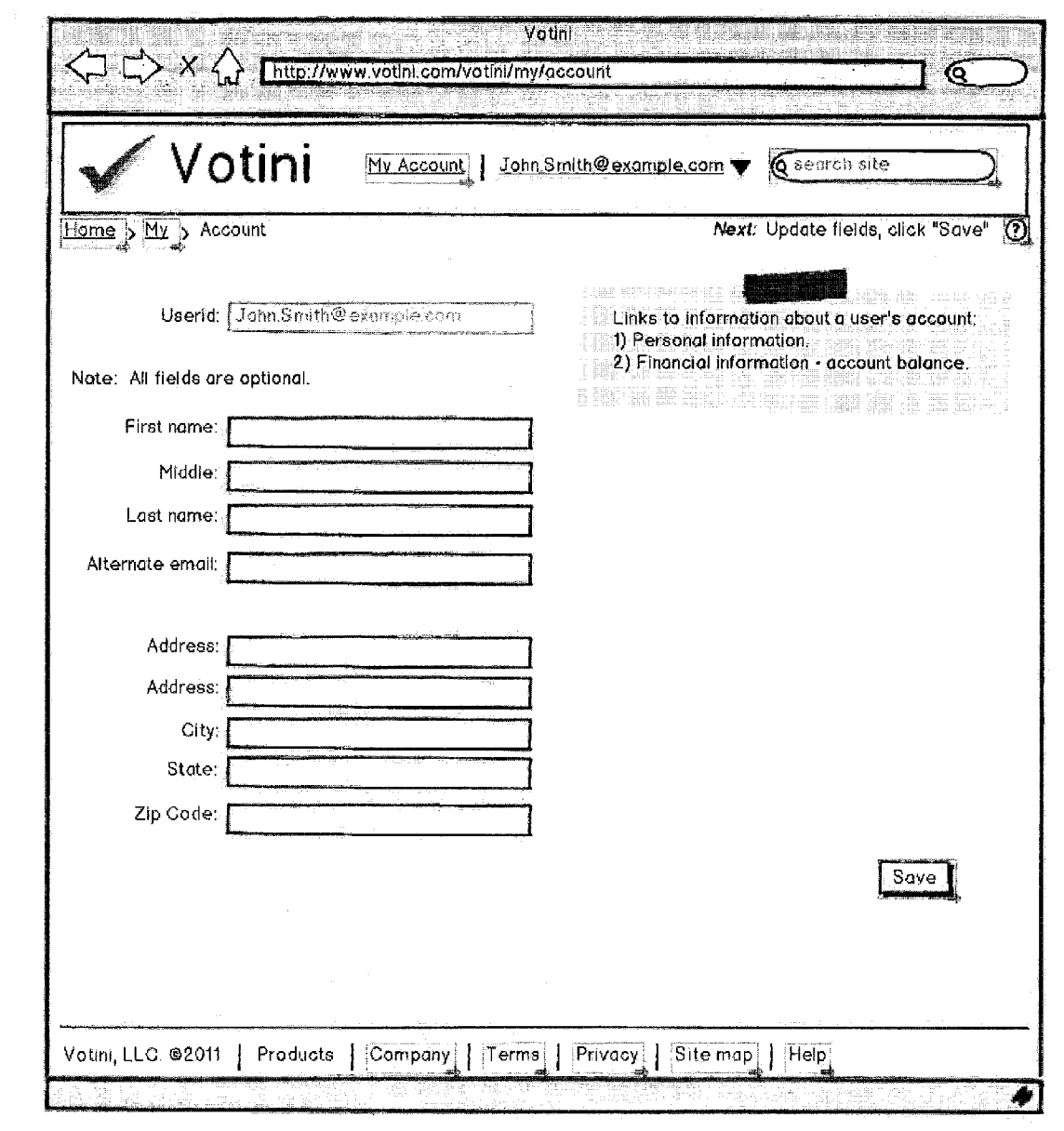
Figure 26:
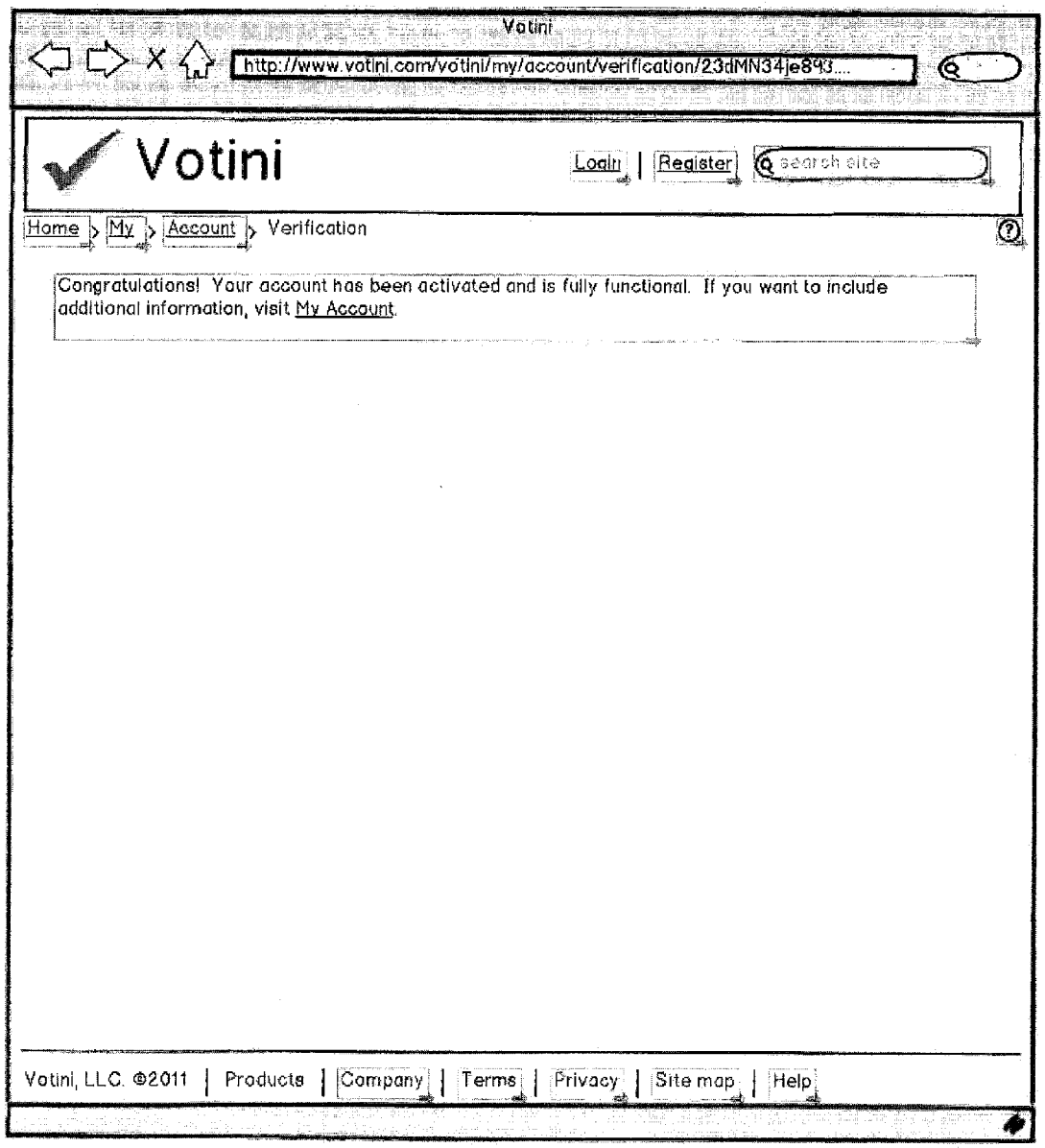
Figure 27:
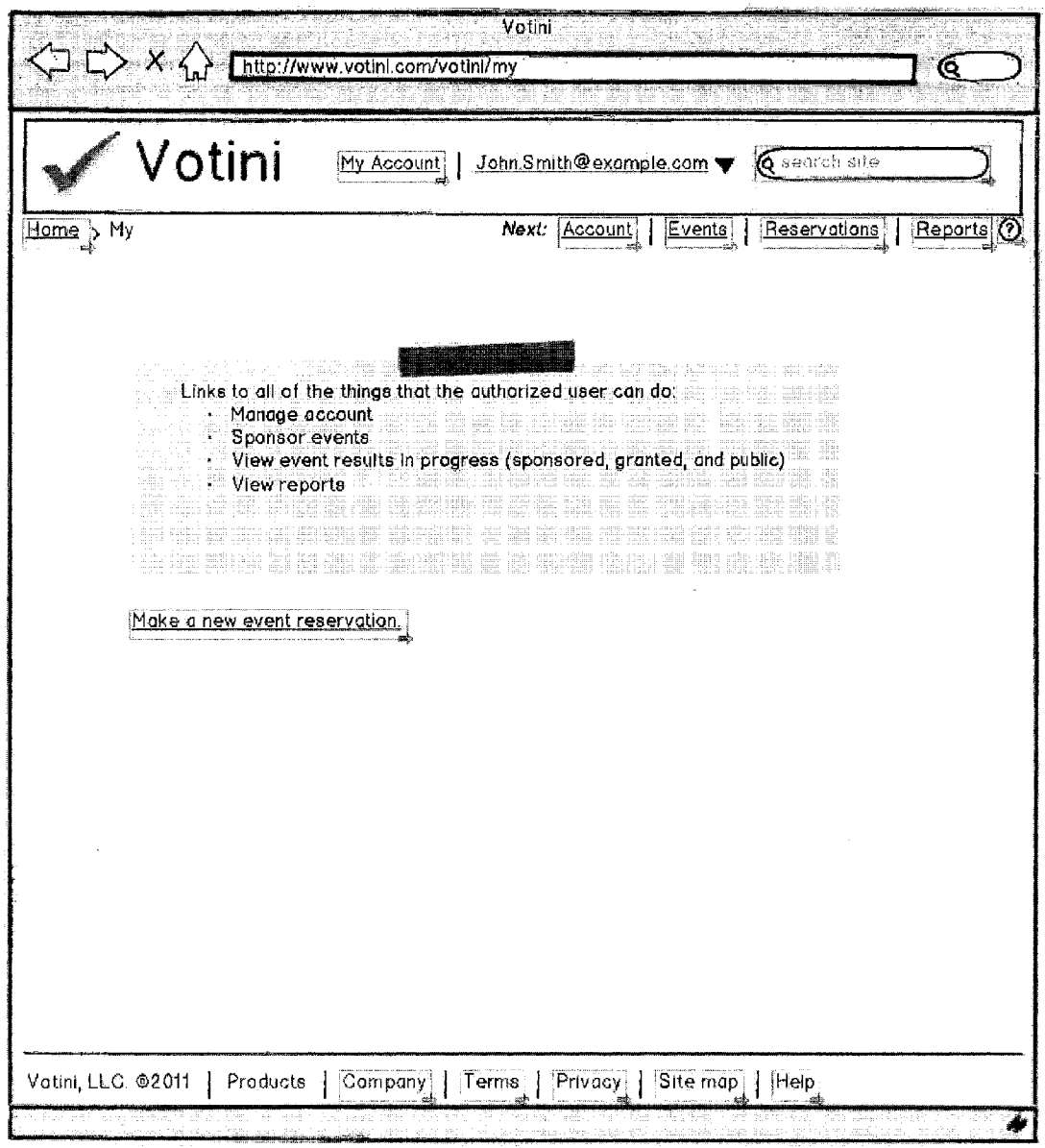
Figure 28:
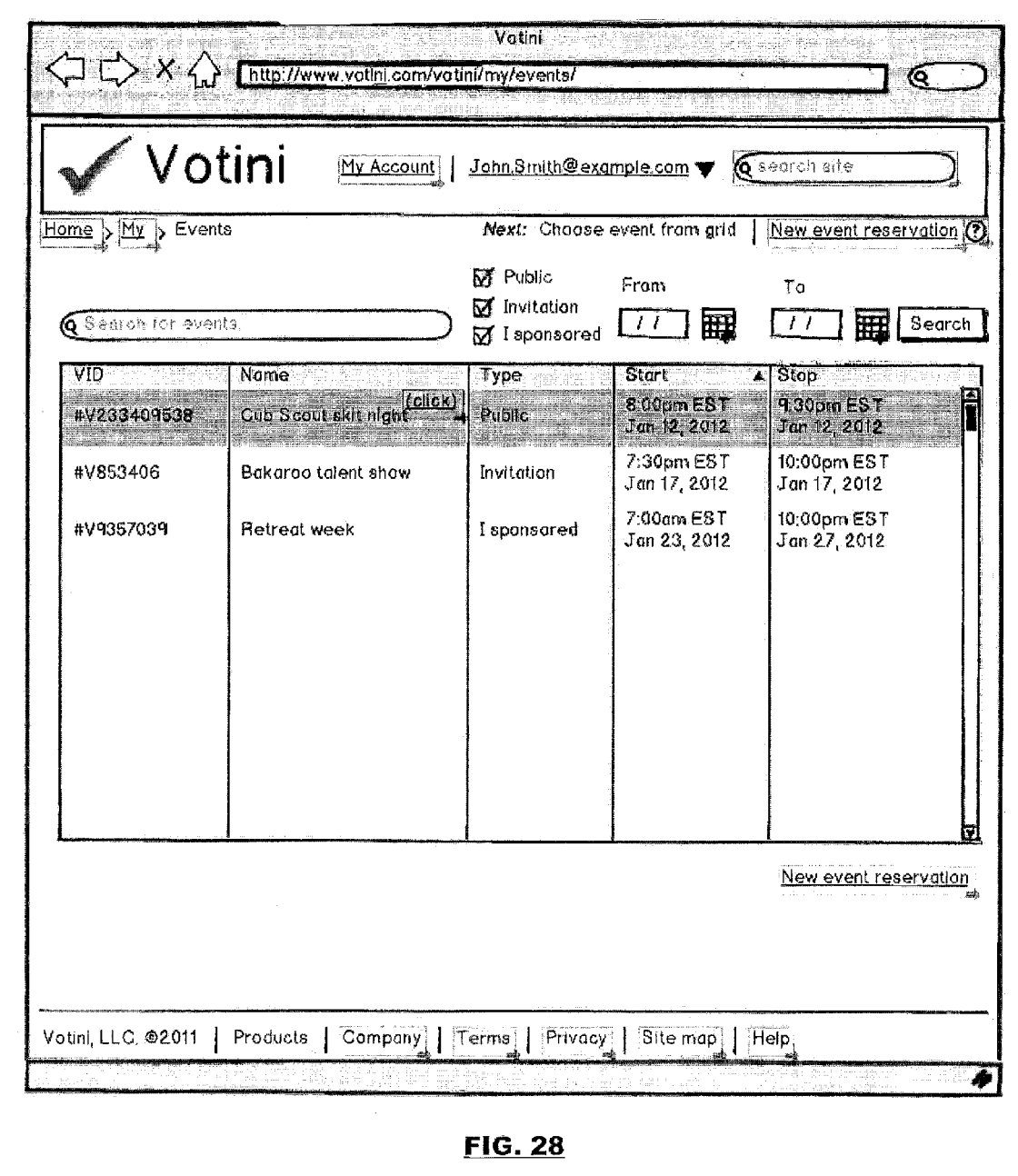

After a user has logged into the Votini website, FIG. 25 illustrates the various fields of personal and financial information that a user of the website may be prompted to provide. The system 10 may make all fields options. The fields may include: First name, Middle name, Last name, Alternate email, Address (lines 1 and 2), City, State, and Zip Code. The user may save this information for future. FIG. 26 shows a notification provided to the individual that his account is now activated and fully functions and that additional information can be added by visiting 'My Account' tab FIG. 27 illustrates various options provided to an individual using the Votini website. The various options include links to all the things that the individual is authorized to do, such as manage accounts, sponsor events, view event results in progress (sponsored, granted and public) and view reports. FIG. 28 illustrates how individuals, after logging in to the system 10, may be able to preview upcoming events 30 that they are entitled to score or provide feedback on. These events 30 may be sponsored by the logged-in user or by another user that has either made the event 30 public or has invited the logged-in user, for example. In other words, the listing of events 30 may include: a private event, an invitation only event, self-sponsored events, and so on. The observer may be able to modify the event list by controlling the 'From' and 'To' dates on this page, where the 'From' and 'To' dates are used to shortlist the events based on their availability. The chosen events may be displayed as a list, where each event contains an event identifier, an event name, an event type, and start and stop times for the event. The event may also contain an associated 'abstract.'

Figure 29:
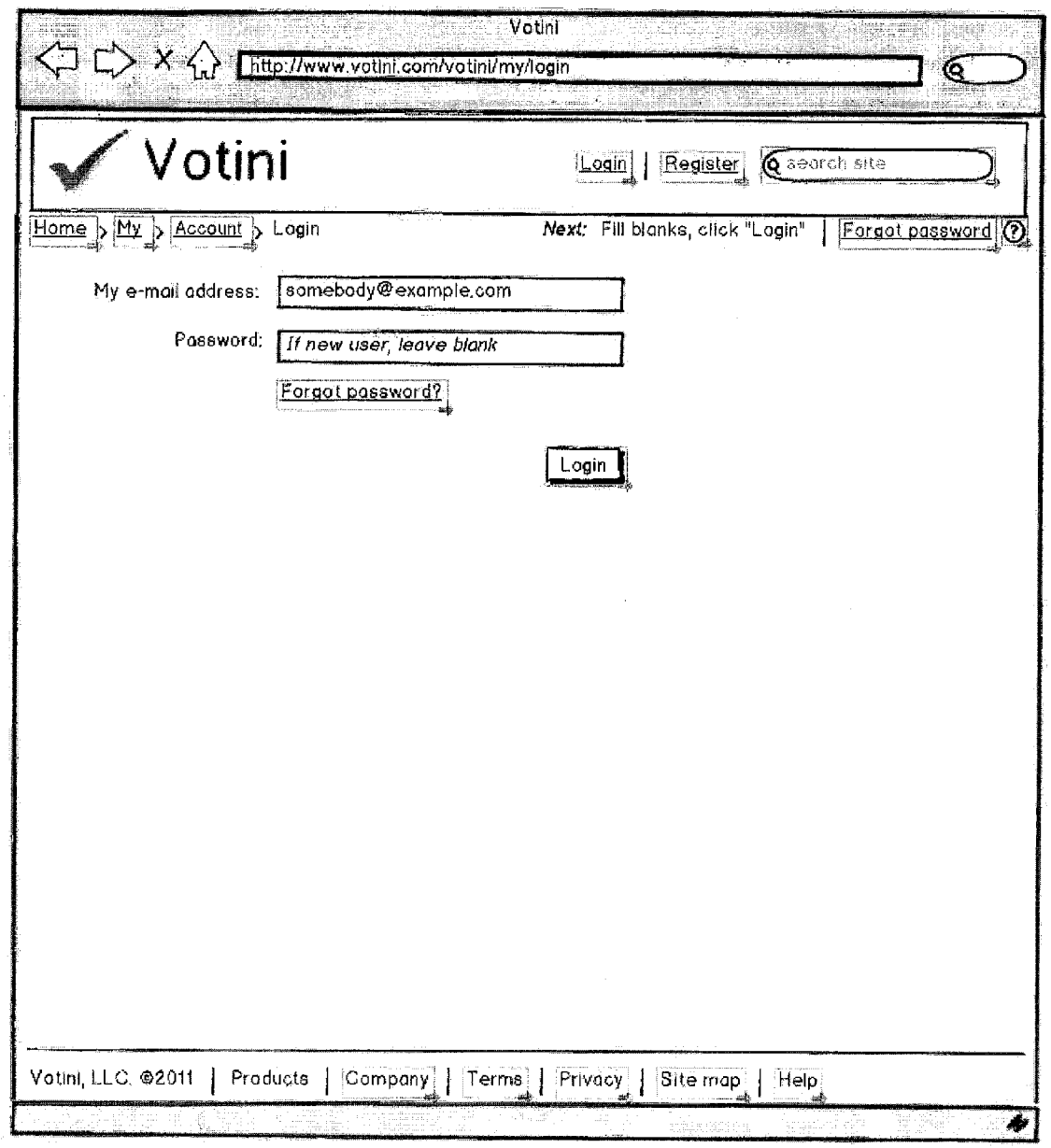
Figure 30:
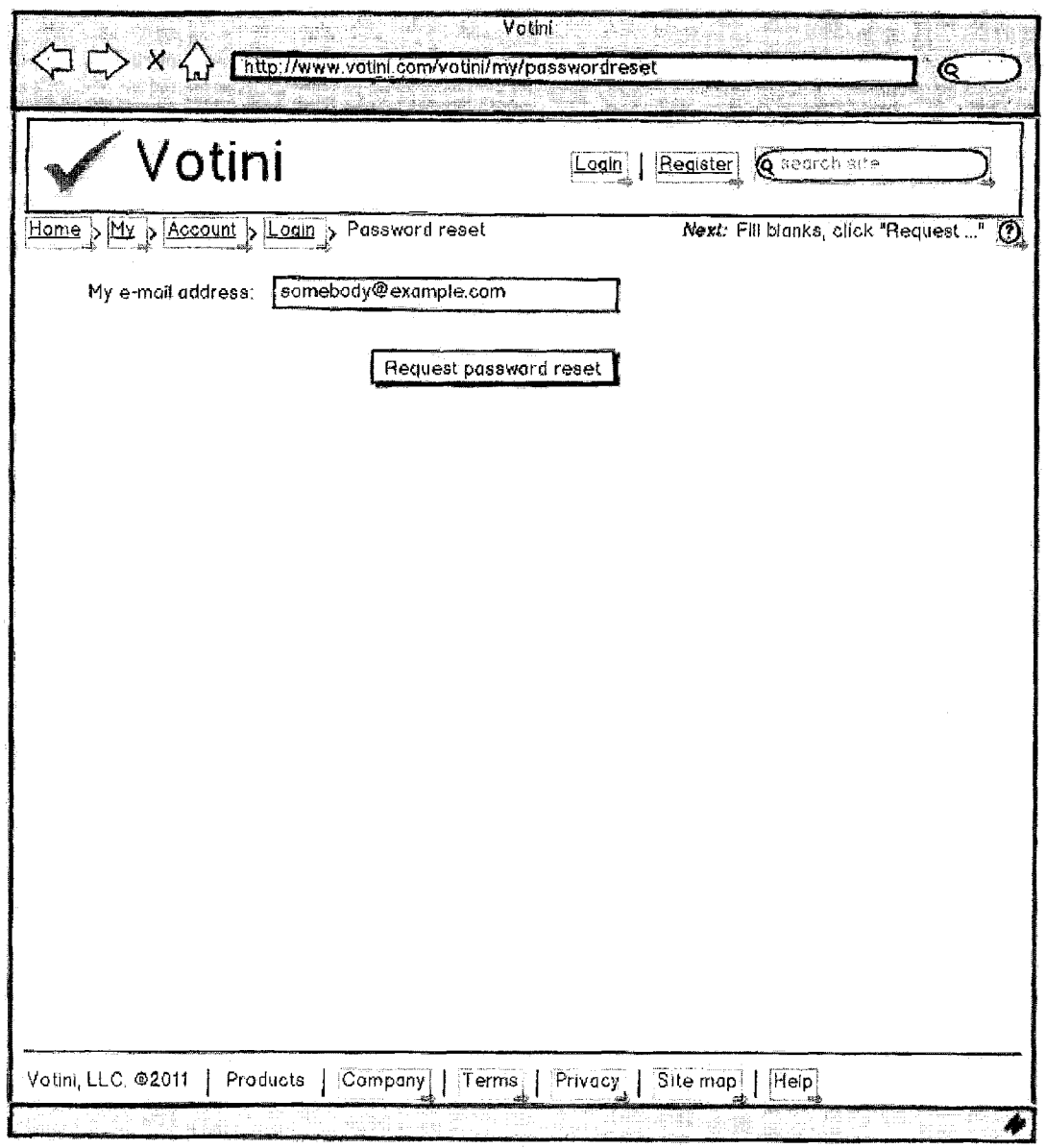
Figure 31:
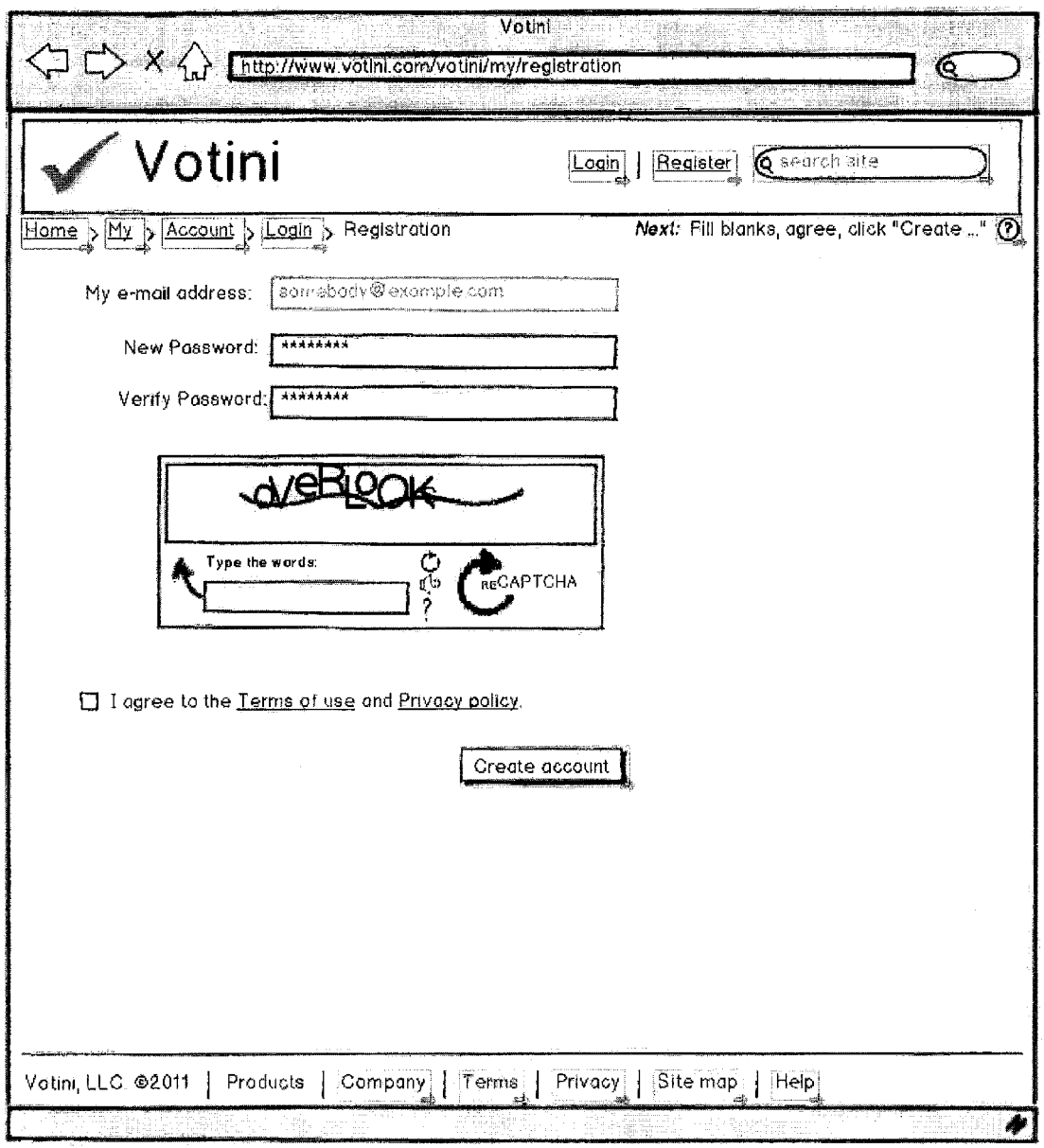

FIGS. 29 to 31 illustrate how an individual can login to the system 10. FIG. 29 illustrates how an individual may login to the Votini website at any time after the account has been created. The individual will need an e-mail address and password to do so. In some instances, when a user may forget his password, he may use the 'Forgot Password?' button to retrieve the same password, or a new password. Once the correct e-mail address and password are entered, the individual may login using the 'Login' button. In the event that an individual has forgotten his password, the system 10 may allow the individual to reset his password by requesting a password reset, as illustrated in FIG. 30.

FIG. 31 illustrates how an individual can register with the Votini website. By clicking on the 'Register' link, an individual may be prompted to sign up with Votini by providing an e-mail address, and setting and verifying a new password. The system 10 may prompt the individual to re-type a randomly generated string of letters, or string of letters and numbers, using, for example, the CAPTCHA technique, to tell a human from a machine; read the 'Terms of Use' and 'Privacy Policy;' and accept the 'Terms of Use' and 'Privacy Policy' in order to complete the registration account creation.

Figure 32:
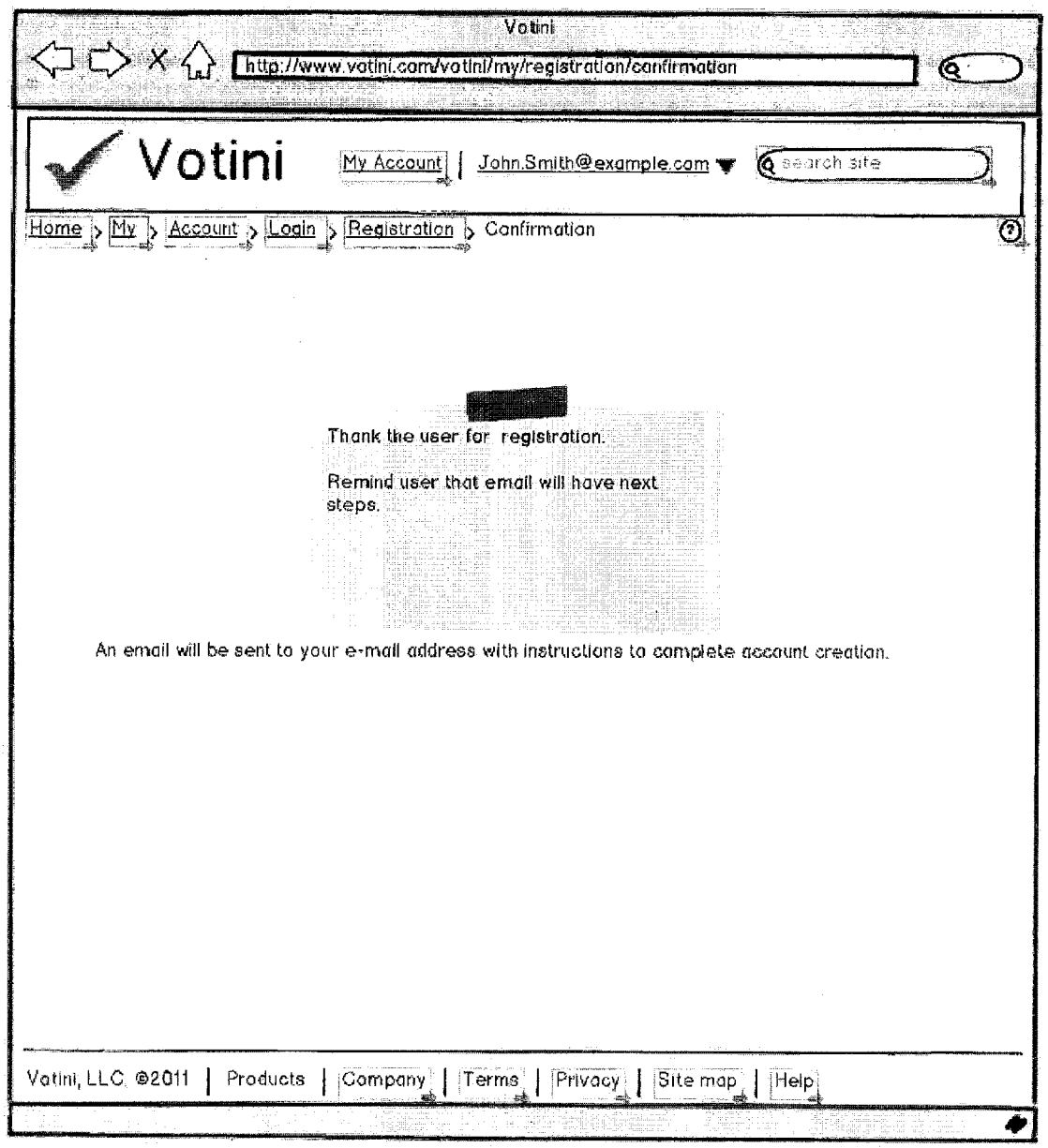

FIG. 32 illustrates a confirmation screen, where the registration account holder is thanked for registering with the system 10, and provided with a notification that an e-mail has been sent to the registration account holder's e-mail address. A reminder may be provided to the registration account holder reciting that the e-mail may have further instructions and steps to follow in order to complete the registration account creation.

Figure 33:
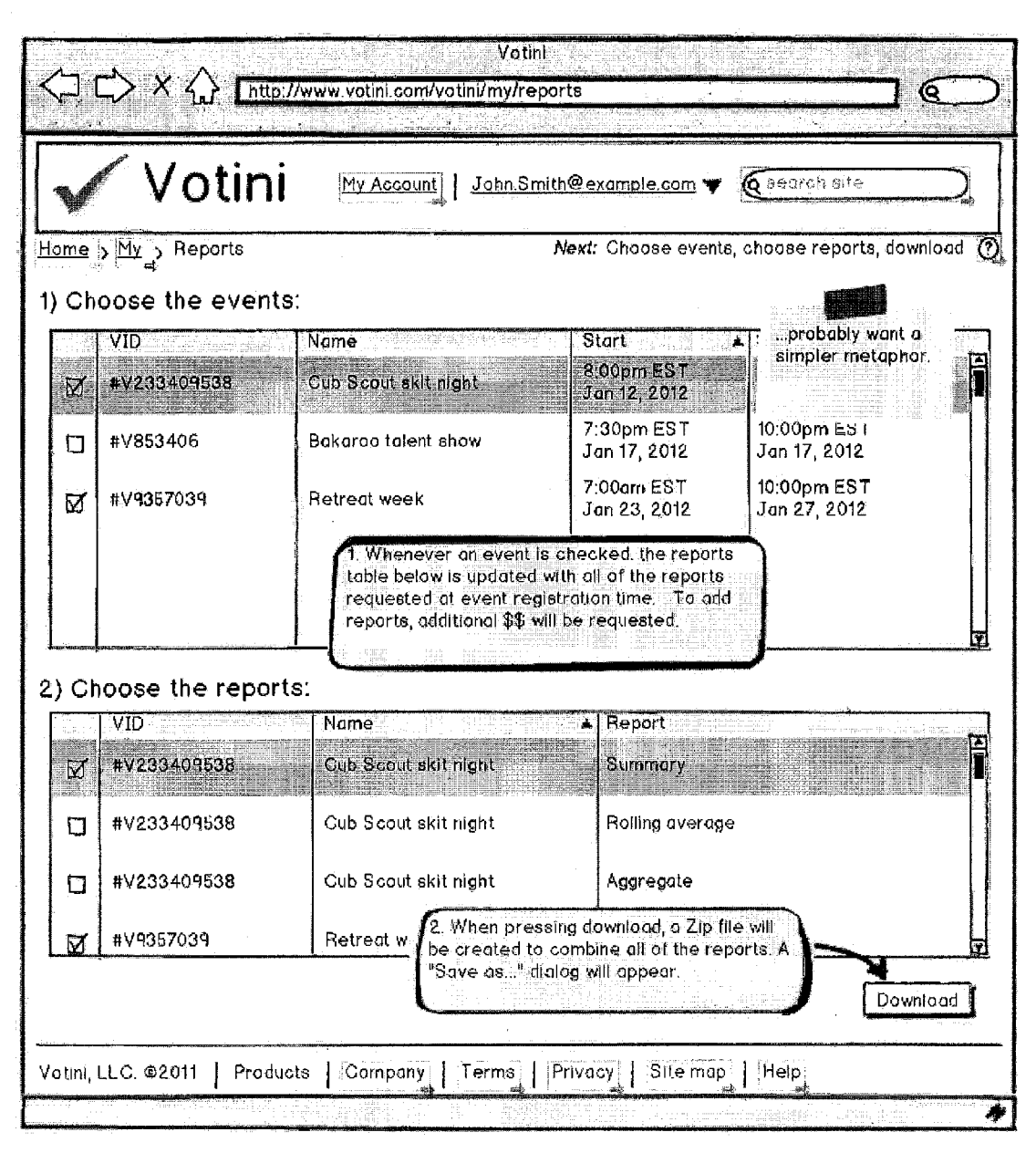

FIG. 33 illustrates a setup displaying an event identifier (in alpha-numeric or any other form), the event name, the start and end times of the event. This setup assists the Votini website account holder to first view the events 30 that the logged-in individual has either sponsored or has been given rights to in order to select the reports that the user wants generated from one or more of the listed events. The logged-in individual may check or uncheck events depending on which events he wants to have reports generated for. The figure also illustrates a report table which provides an event identifier, an event name and the associated reports for the events. This setup facilitates the selection of reports of interest that the user wants to generate and view for one or more events from the list.

As illustrated in FIG. 33, whenever an event is checked, the reports table is automatically updated with all reports requested at event registration time. Further reports may be selected by the account holder for more money. Once a list of events and corresponding reports are provided to the account holder, he way download all the reports requested previously. The reports may be downloaded as a .zip file and may be saved locally.

Figure 34:
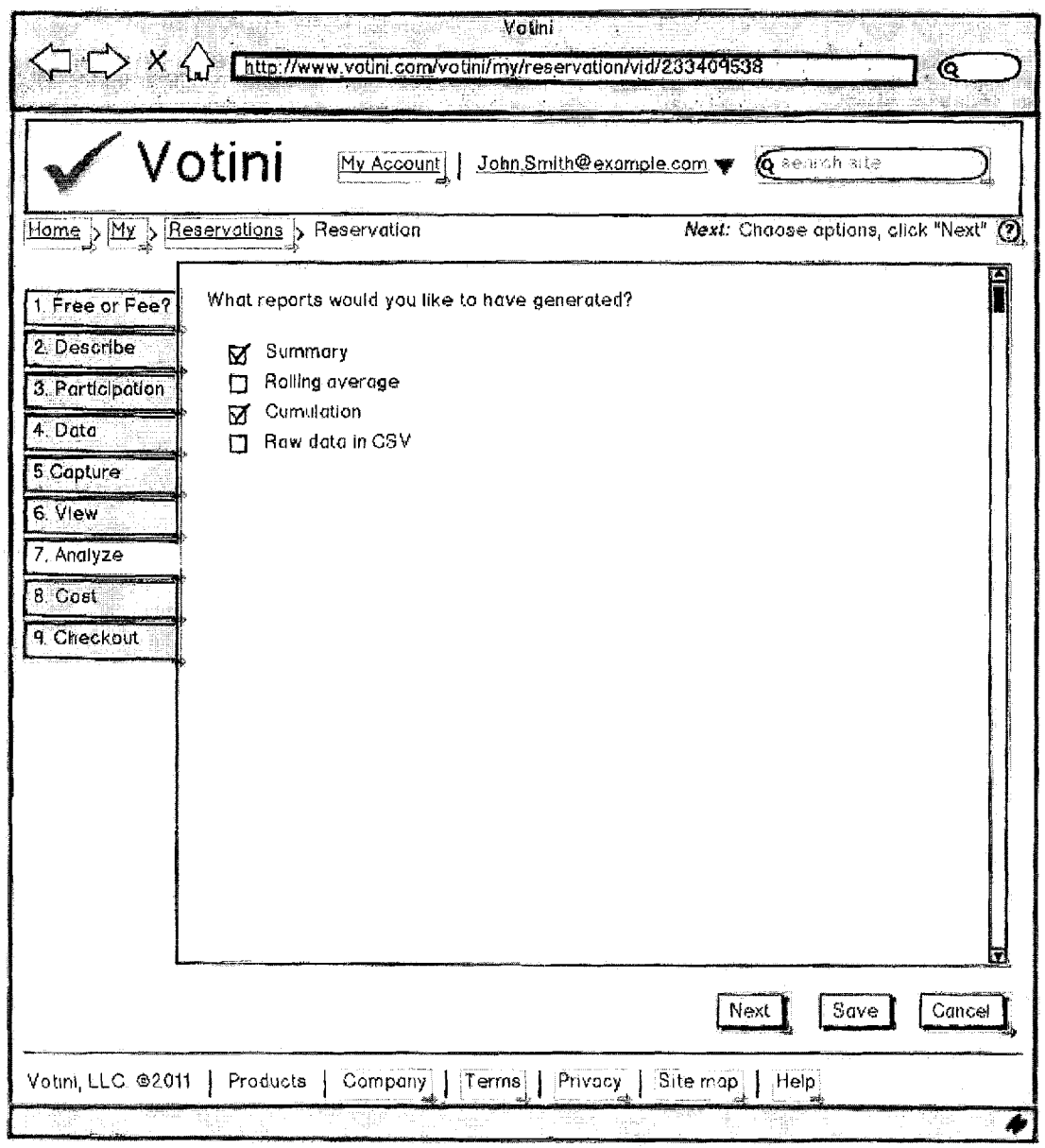

An online registration account in Votini may allow an individual to switch back and forth between different tabs titled:

Free or Fee?, Describe, Participation, Data, Capture, View, Analyze, Cost and Checkout. This may be one web page with multi-tabbed navigation. One purpose of the web page design may be to allow the logged-in user to create a new event reservation, review an existing reservation, or change an existing reservation. FIGS. 34-43 are supposed to illustrate the logical progression of setting up the options for event reservation by a user. FIG. 34 illustrates the provision of data analysis options to the account holder. An account holder registering an event may be able to select one or more types of analysis (using Analyze tab) that may be carried out on the received feedback data. Some examples of available analysis types include summary, rolling average, cumulation and raw data in .csv format. By selecting certain analysis types, the account holder registering events may become eligible for receiving corresponding reports.

Figure 35:
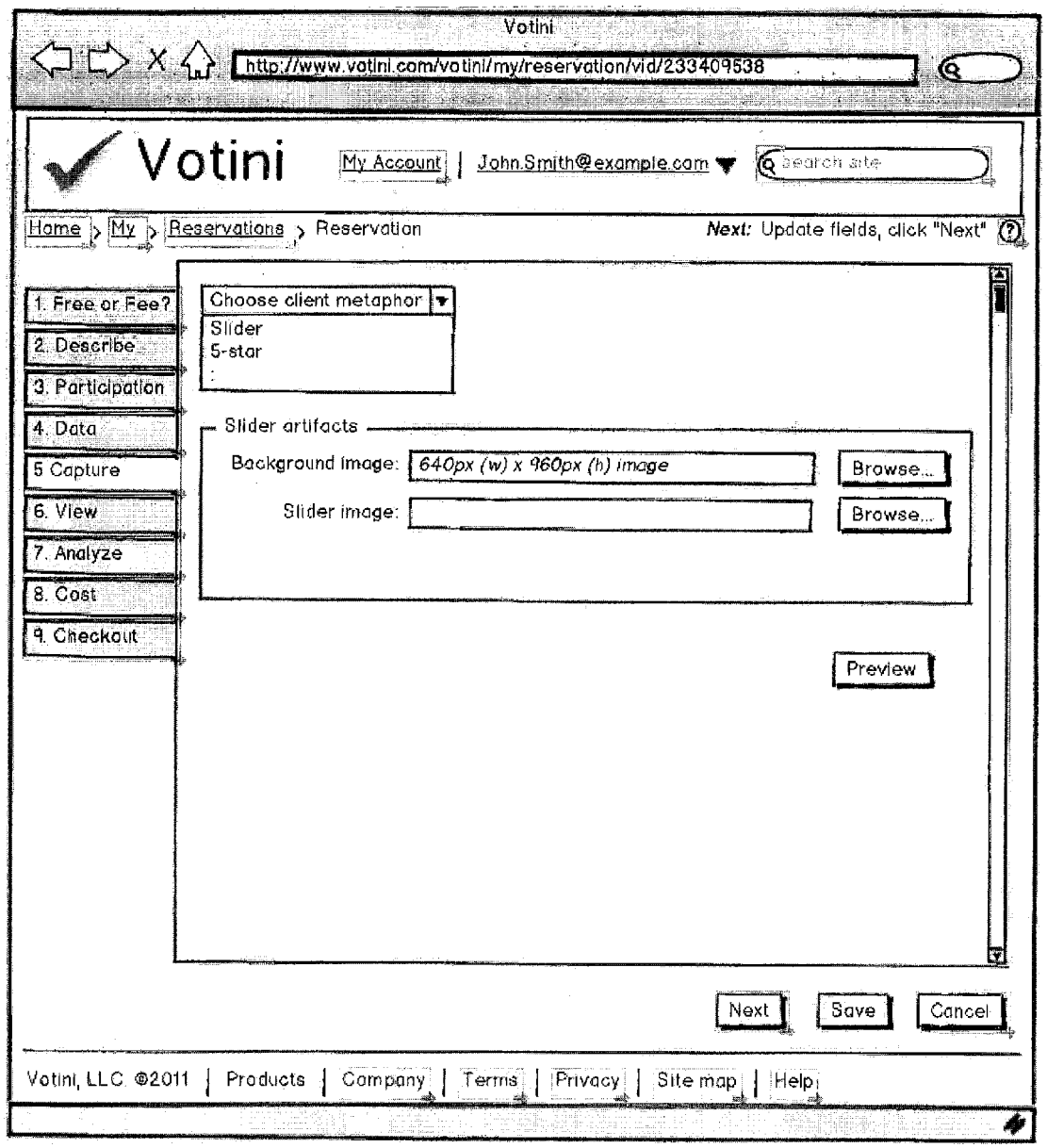

FIG. 35 illustrates the provision of metaphor options made available to an account holder registering an event (using capture tab). The metaphors, such as a slider, or a 5-star, may be accessed using a drop-down menu and for each metaphor artifact, such as a slider artifact, the account holder may be able to select its presentation by setting certain features, such as the background image and a slider image. The metaphors chosen on this page may then be the metaphors seen on the mobile devices 14 of the users for providing feedback.

Figure 36:
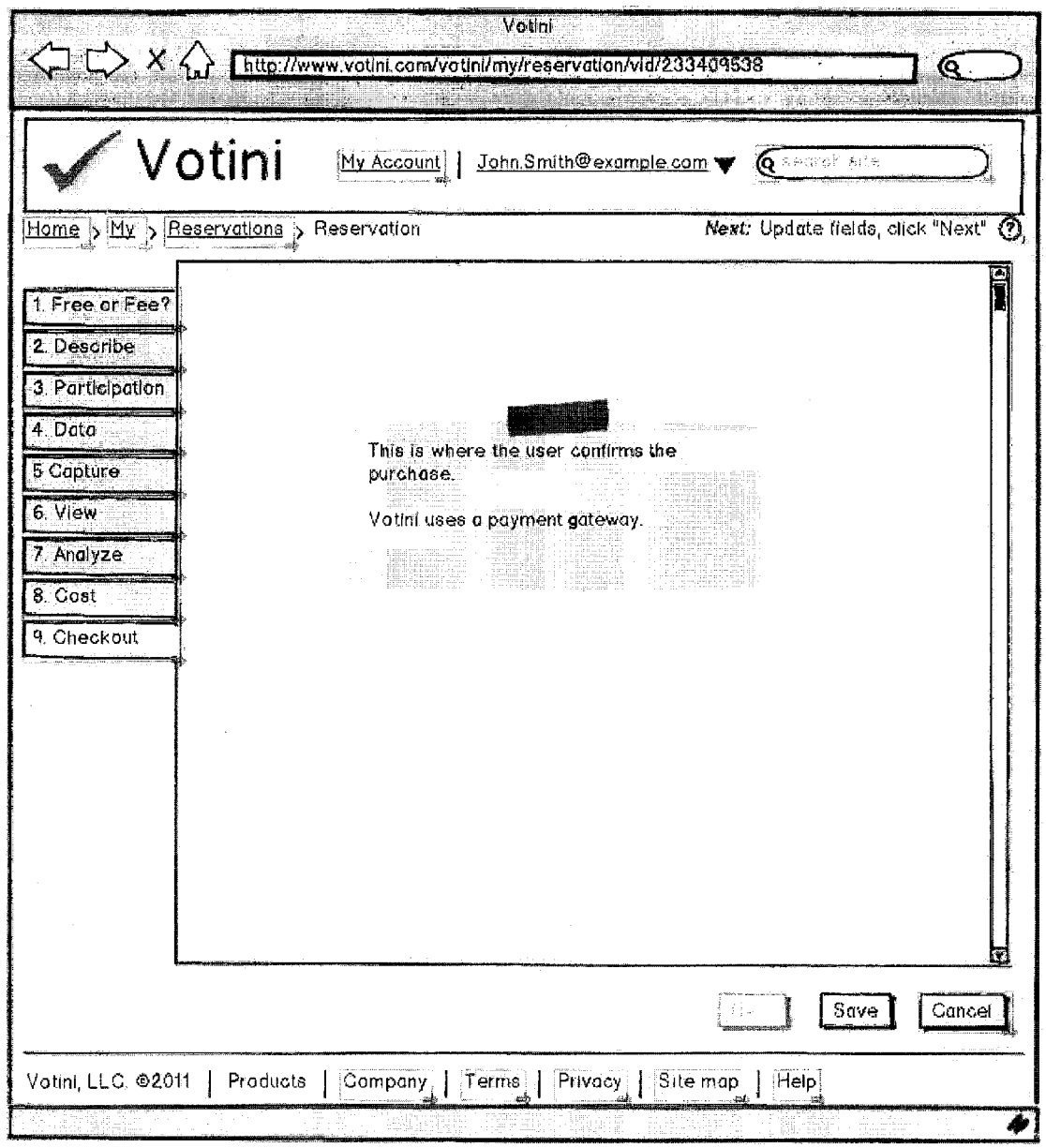
Figure 37:
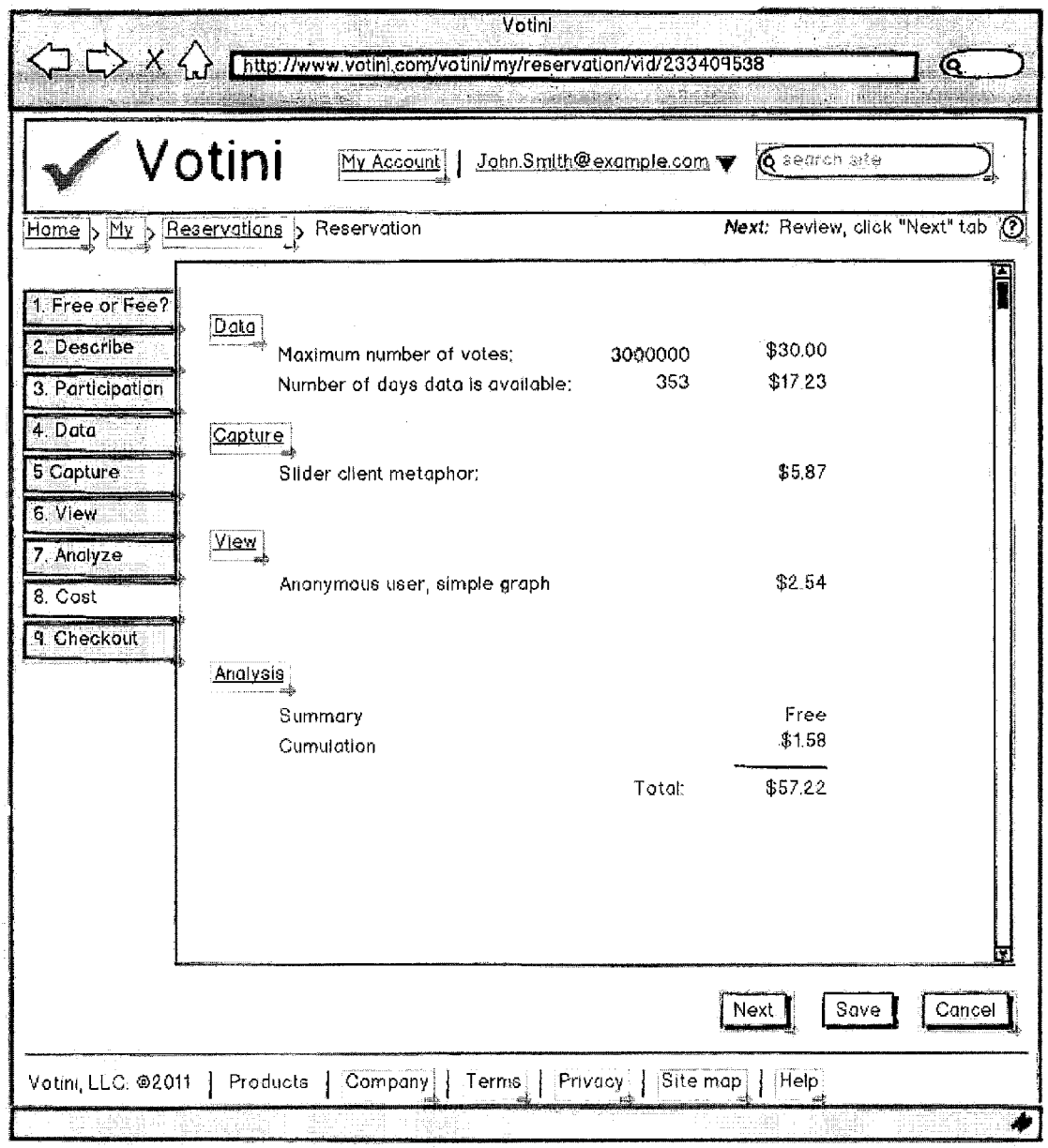

As illustrated in FIG. 36, the account holder may be able to checkout and confirm his purchase (using Checkout tab). The system 10 may use a payment gateway to receive and authorize payments. FIG. 37 illustrates the cost that may be incurred by an account holder who registers an event. The cost may depend on the maximum number of votes set by the account holder, the number of days for which the feedback data is made available, the metaphor selected to provide to the observer 12, the types and number of available views and the types of feedback data analysis selected.

Figure 38:
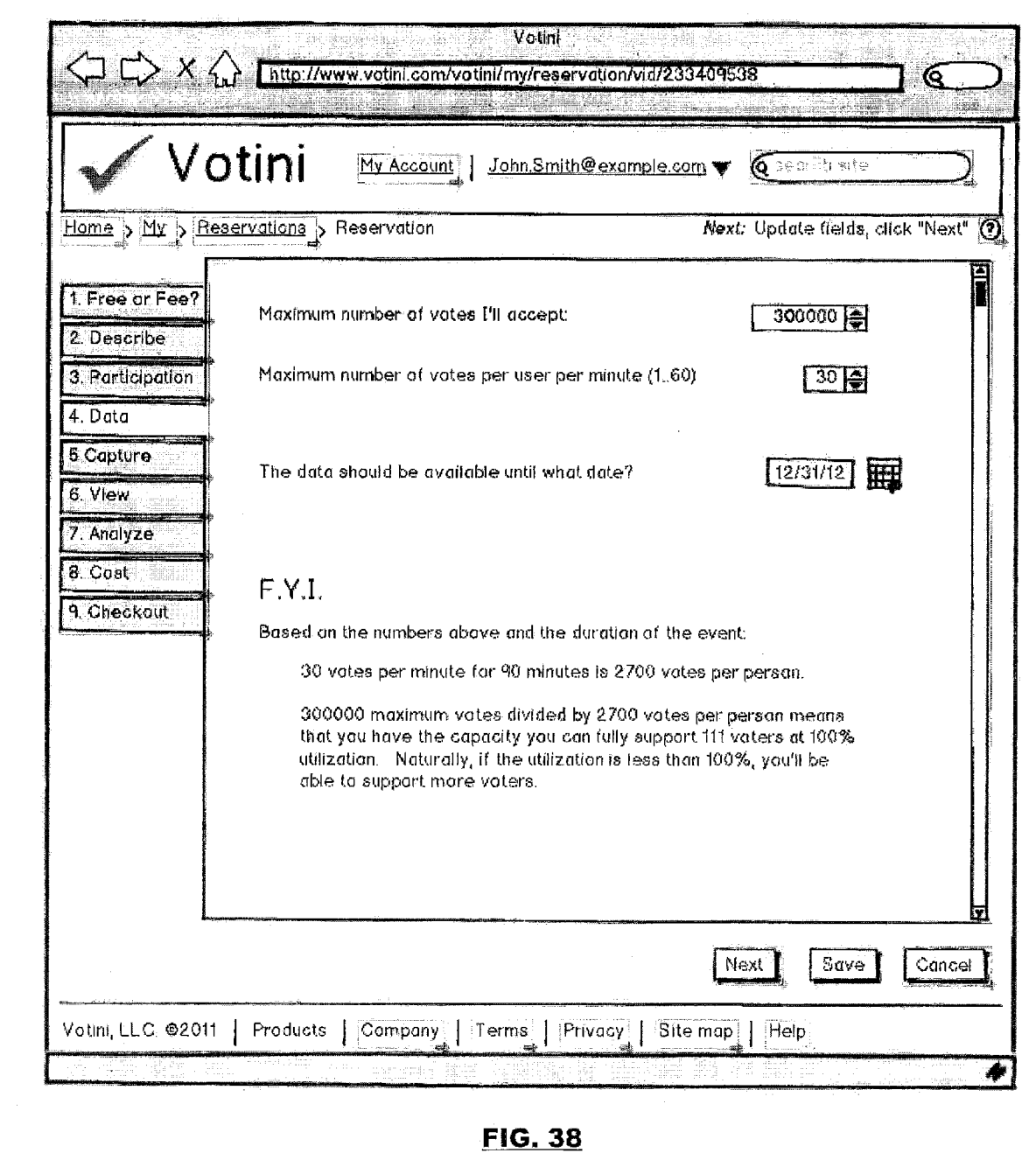

The webpage titled Data may be accessed by an account holder to input more details while reserving an event, as illustrated in FIG. 38. Reservation of an event may prompt the account holder to control the maximum number of votes that can be received from the observers 12 and the frequency of the votes from each observer 12 per minute. The account holder registering an event may also be able to decide for how long the feedback data will be made available. Once an account holder enters certain values for the maximum number of votes to accept and the frequency of votes from each observer per minute, the system 10 may be able to generate how many voters the system 10 can support at 100% utilization. For instance, if an account holder chooses to receive 30 votes per minute for an event with duration of 90 minutes, the system 10 calculates the total number of votes per person to be 2700. If the account holder sets the maximum number of votes to be 300000, the system 10 calculates the capacity of the system 10 to support 111 voters at 100% utilization. The number of voters supported by the system 10 is inversely proportional to the utilization of the system 10. If the utilization is less than 100%, more voters can be supported. The account holder may either reset or save the settings for future use. This tab, along with other tabs such as Capture, View and Analysis, may also be used to provide an educated guess on how much of the system utilization will be needed by the logged-in user ahead of actual use.

Figure 39:
Figure 40:
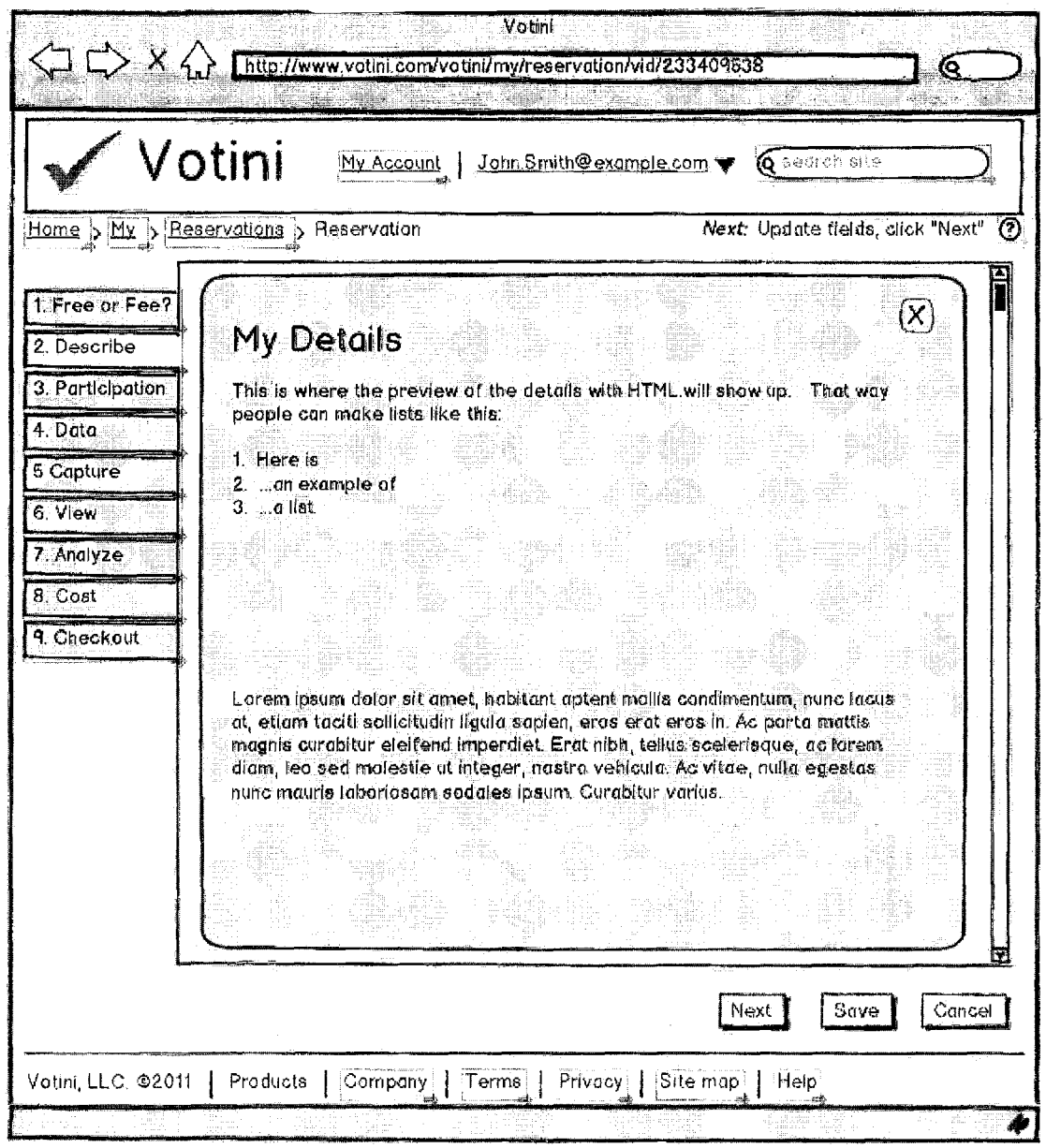

The describe tab, as illustrated in FIG. 39, may describe the event selected for registration. The description may include the event identifier, the event name, the start and end date and time of the event, a brief description of the event, and a tweet regarding the event. FIG. 40 illustrates the provision of allowing a registration account holder to preview the details with HTML.

Figure 41:
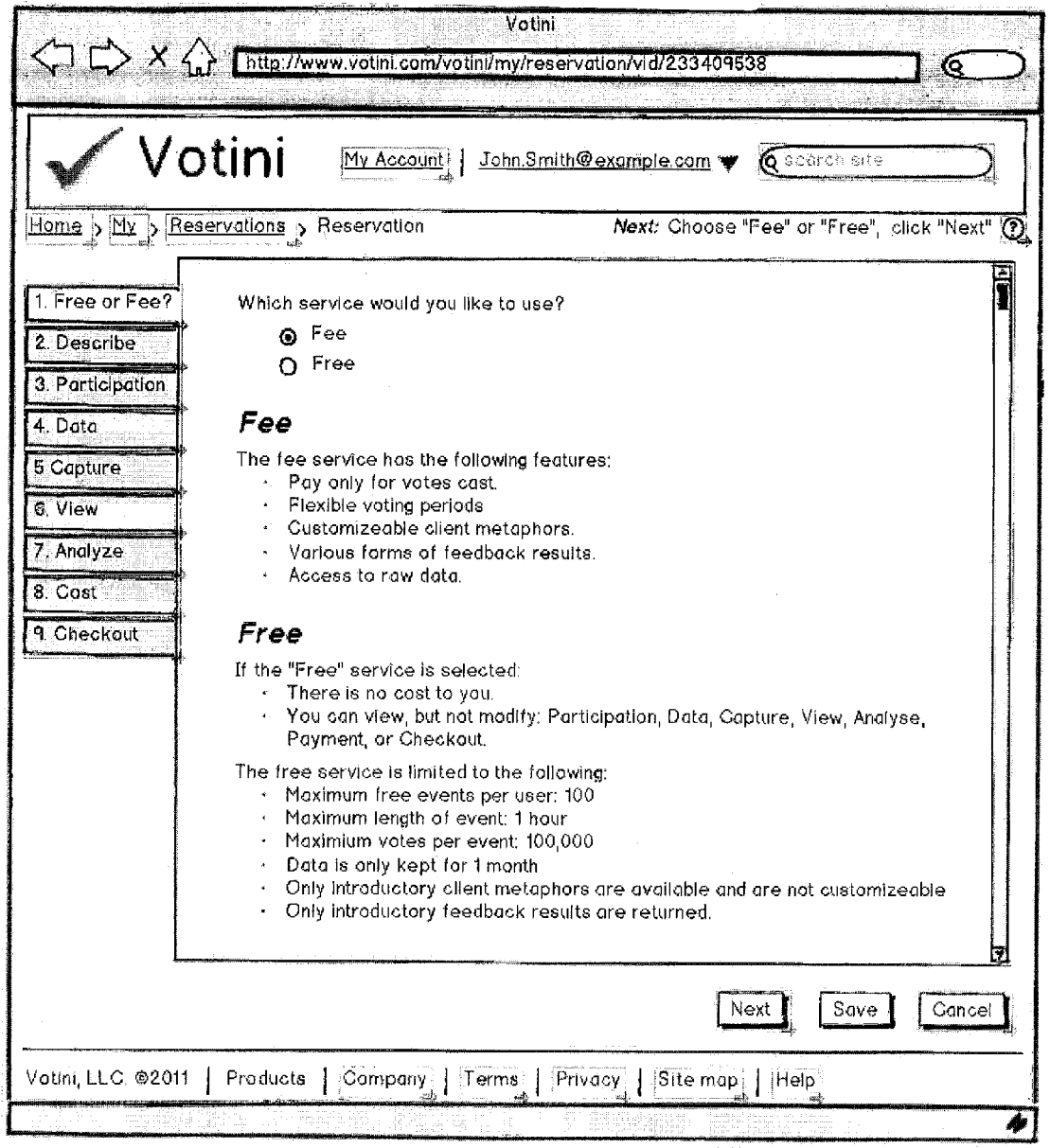

As illustrated in FIG. 41, the 'Free or Fee?' tab may be used to set the kind of service a user desires to provide. The fee service may include the following features: pay only for votes cost, flexible voting periods, customizable client metaphors, various forms of feedback results, and access to raw data. The free service may include the following: viewing, but not modifying, of Participation, Data, Capture, View, Analyze, Payment or Checkout options. The free service may have limitations as well, such as maximum free events per user may be 100, maximum length of allowed events under the free service may be 1 hour, maximum votes per event may only be 100,000, data may only be kept for 1 month, only introductory client metaphors may be available but not customizable, and only introductory feedback results may be returned.

Figure 42:
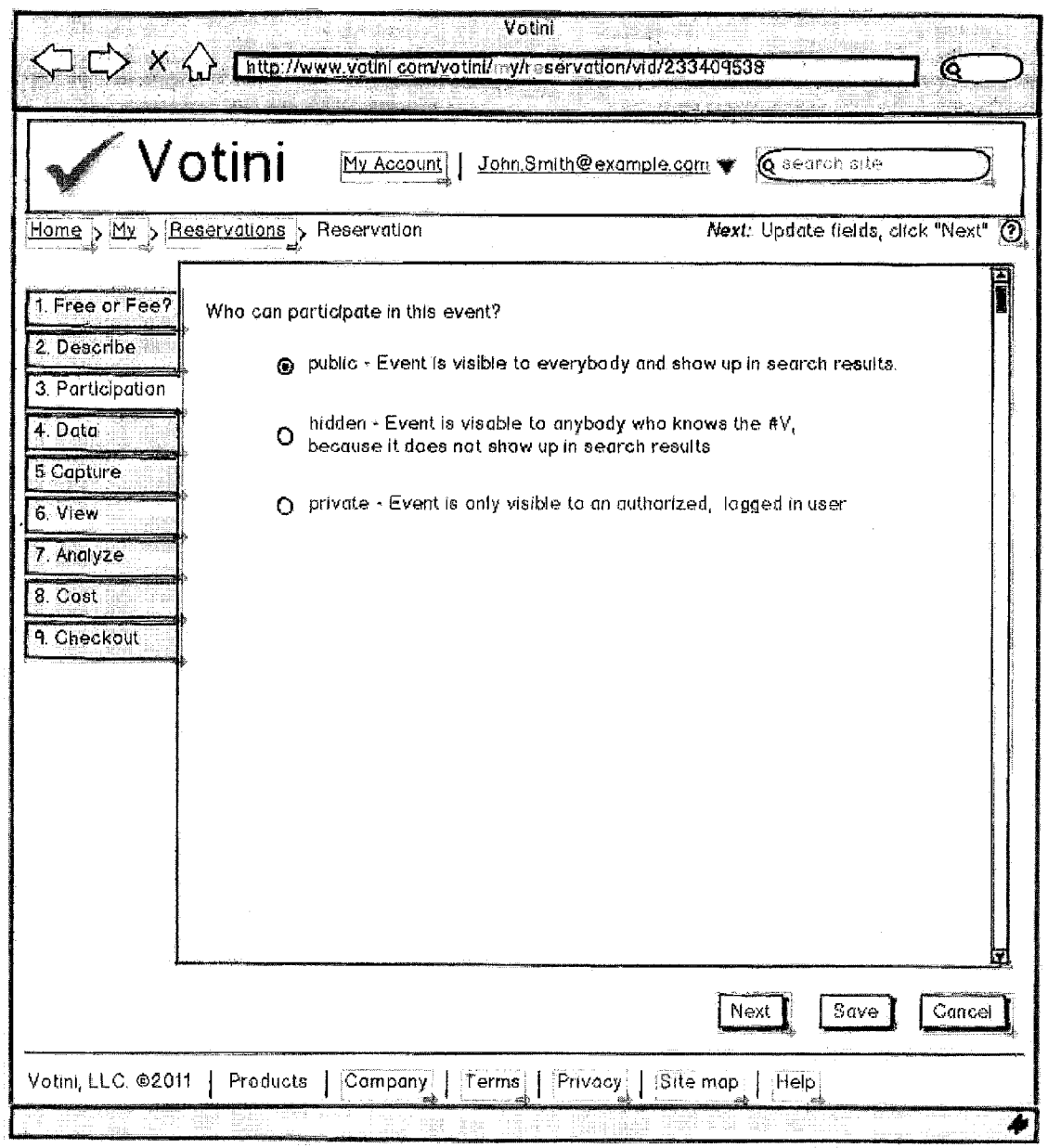

As illustrated in FIG. 42, the registration account creator may be able to select the availability of the event. For instance, the event may be marked as public which makes it available to everybody and available under all event search results; the event may be marked as hidden which makes the event only available to anybody who knows the event identifier as a hidden event does not show up in search results; and the event may be marked as private which makes is only visible to authorized, logged in users. The participation information as illustrated in FIG. 42 controls who is authorized to participate in providing feedback for the event. In some embodiments, the availability of events may be controlled by providing a list of authorized users specified by the user making the reservation. The user creating the reservation may specify the authorized users by providing their email addresses recognizable by the system 10, for example. The system 10 may also be operable to notify each member in the list of authorized users of the invitation to provide feedback. In this embodiment, only those users who are logged-in and on the authorized user list will be able to see the event in the list of available events.

Figure 43:
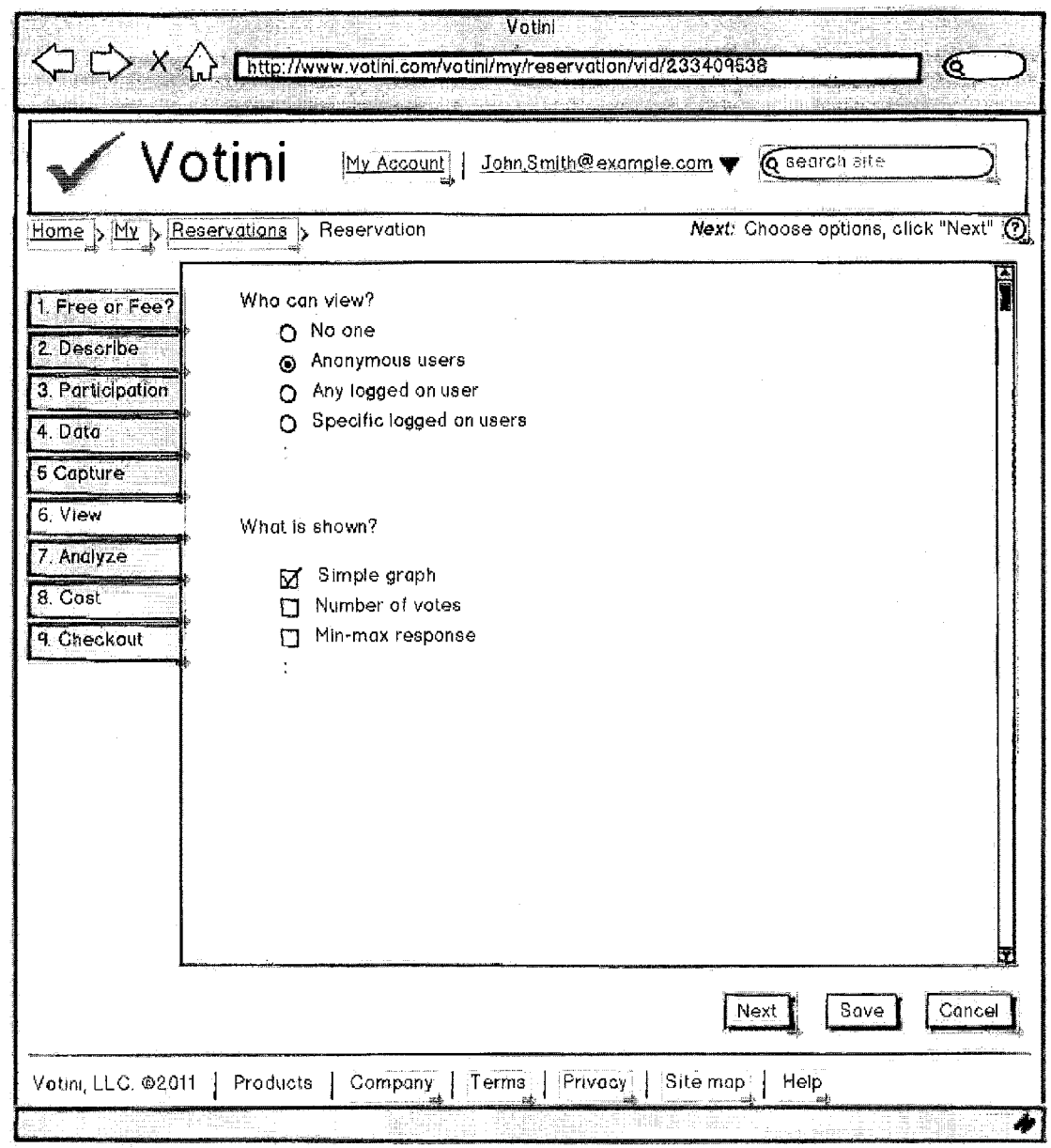

FIG. 43 illustrates who may be able to view the event results. The options on this page may include: no one, anonymous users, any logged-in users, specific logged-in users etc. The specific logged-in users authorized to view event results may be determined from a list of email addresses, recognizable by the system 10, provided by the user making the reservation for the event associated to the event result. The presentation of the feedback results and availability of other information may also be selected on this page. For instance, a user registering an event may be able to select options such as simple graph, number of votes, max-min response etc. to be available as the event results.

Figure 44:
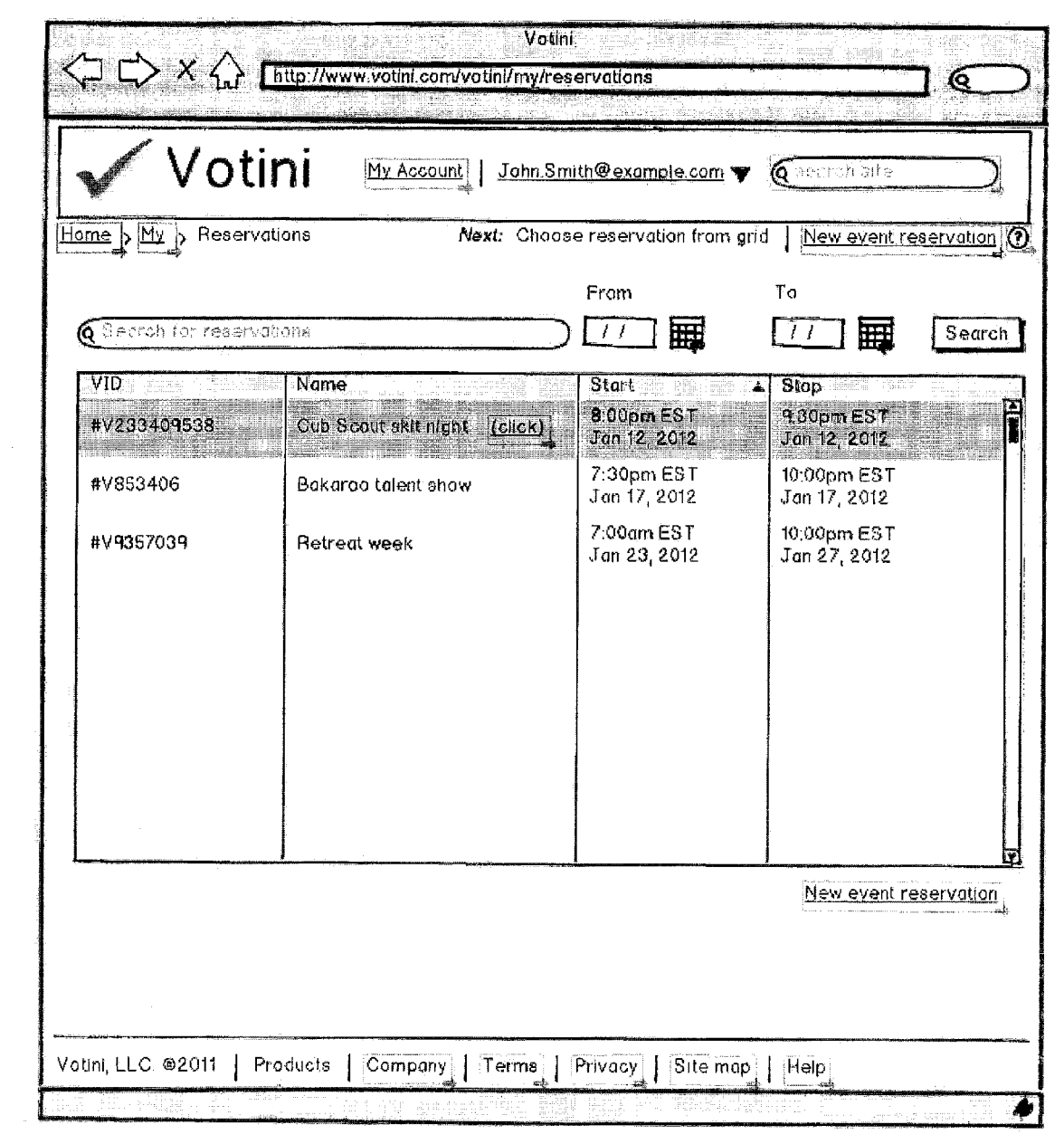
Figure 45:
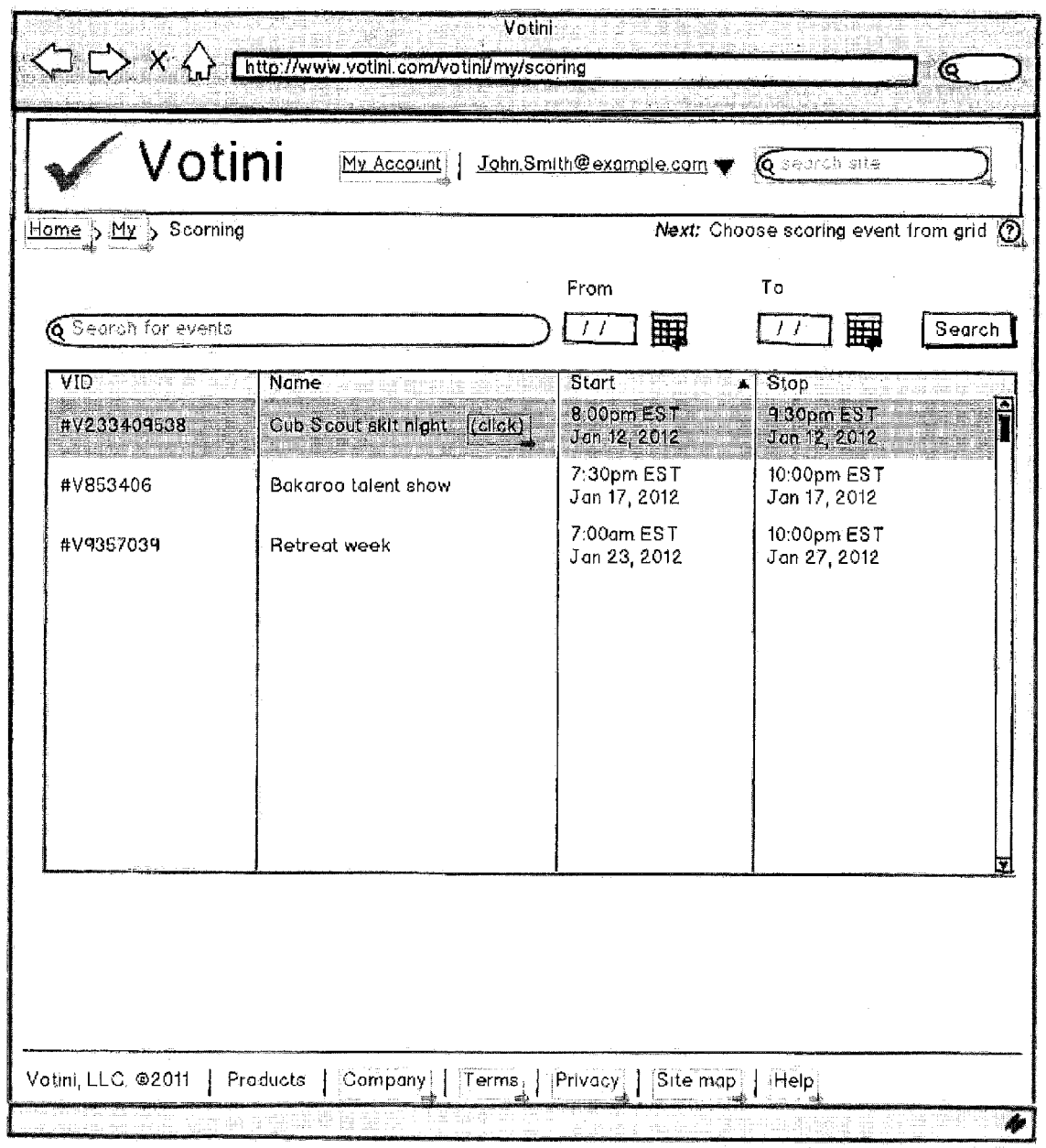
Figure 46:
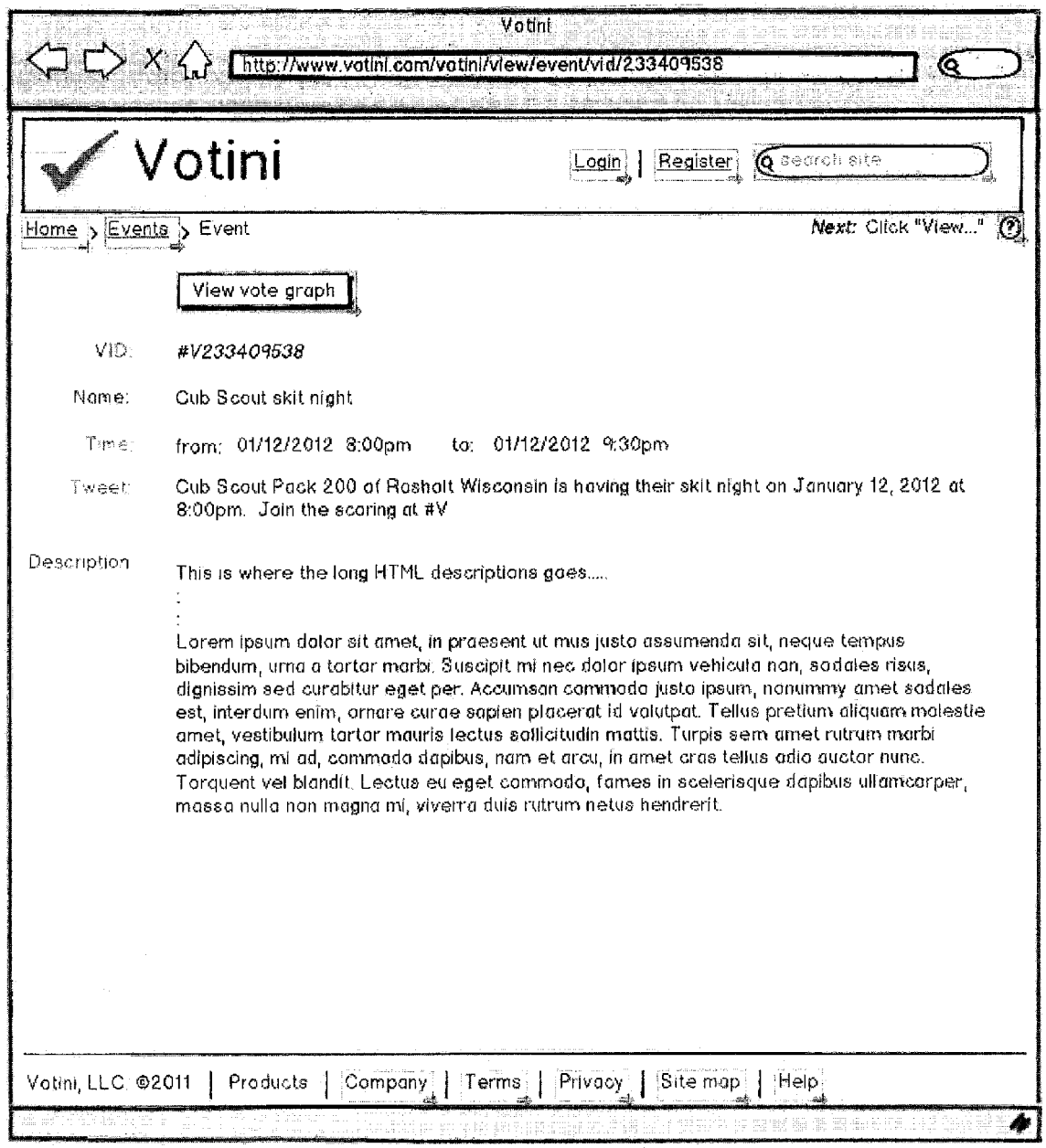

FIG. 44 illustrates a page visible to a reservation account holder to enable him to see a list of events registered by the logged-in user. For each event, he/she can see an event identifier, a corresponding event name, a start and stop time and date. This page may also allow the logged-in user to click on any one of the events in the list to review the options chosen when making the reservation. FIG. 45 illustrates a list of events made available to a logged-in user to represent all the events that the logged-in user has scored. The logged-in user may click on an event in the list to review his/her own scores for that event and juxtapose them against other users scoring that event. The clicking on the link may result in a page similar to the web page illustrated by FIG. 49. FIG. 46 illustrates a web page that is available to an authorized user enabling him/her to see a link enabling the viewing of a feedback graph for an event that has either already taken place or is currently taking place. The linked page may be similar to the web page illustrated by FIG. 10. The setup of this page includes the event identifier, the event name, start and stop time and date, a brief description of the event and a tweet about the event.

Figure 47:
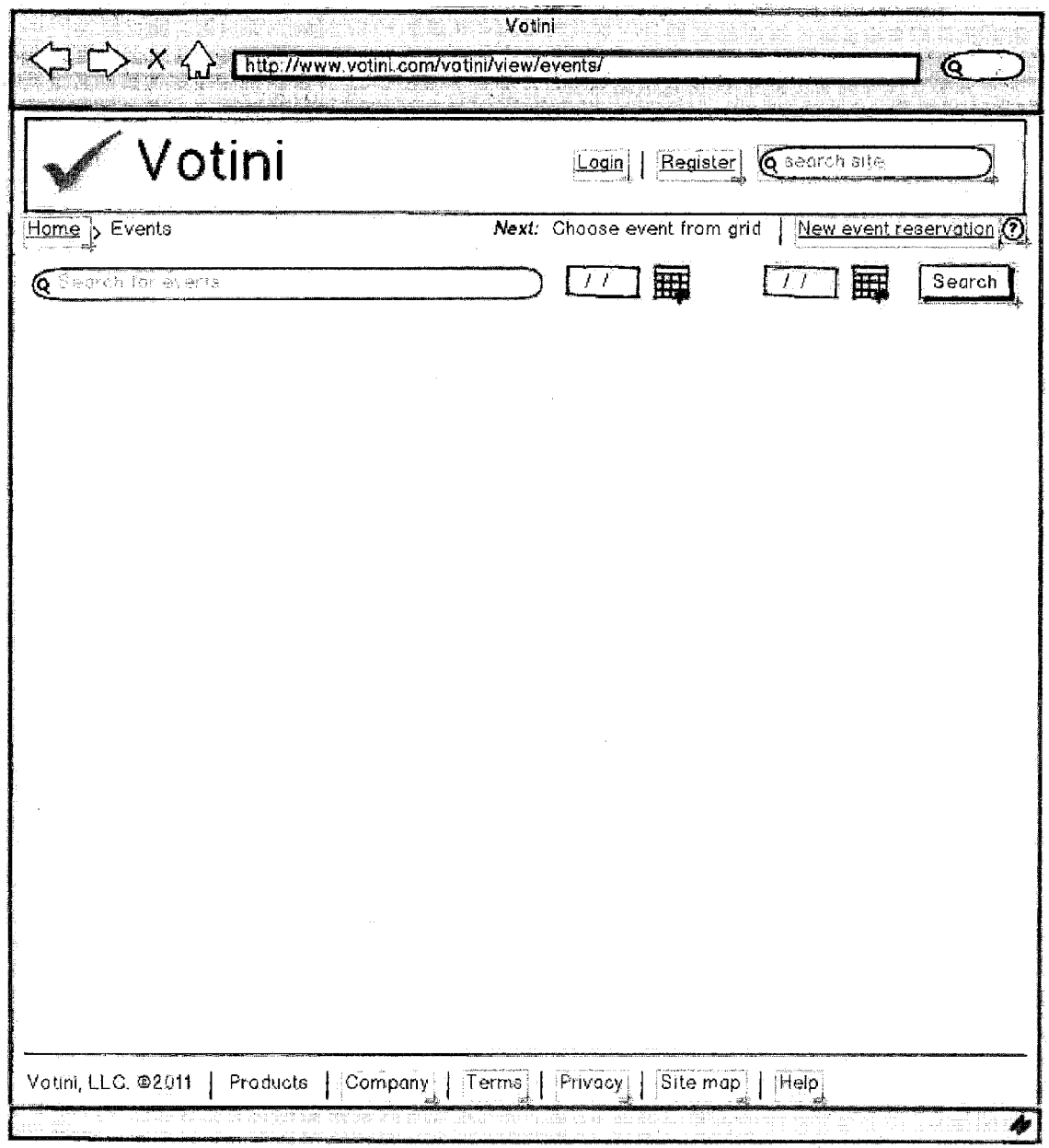
Figure 48:
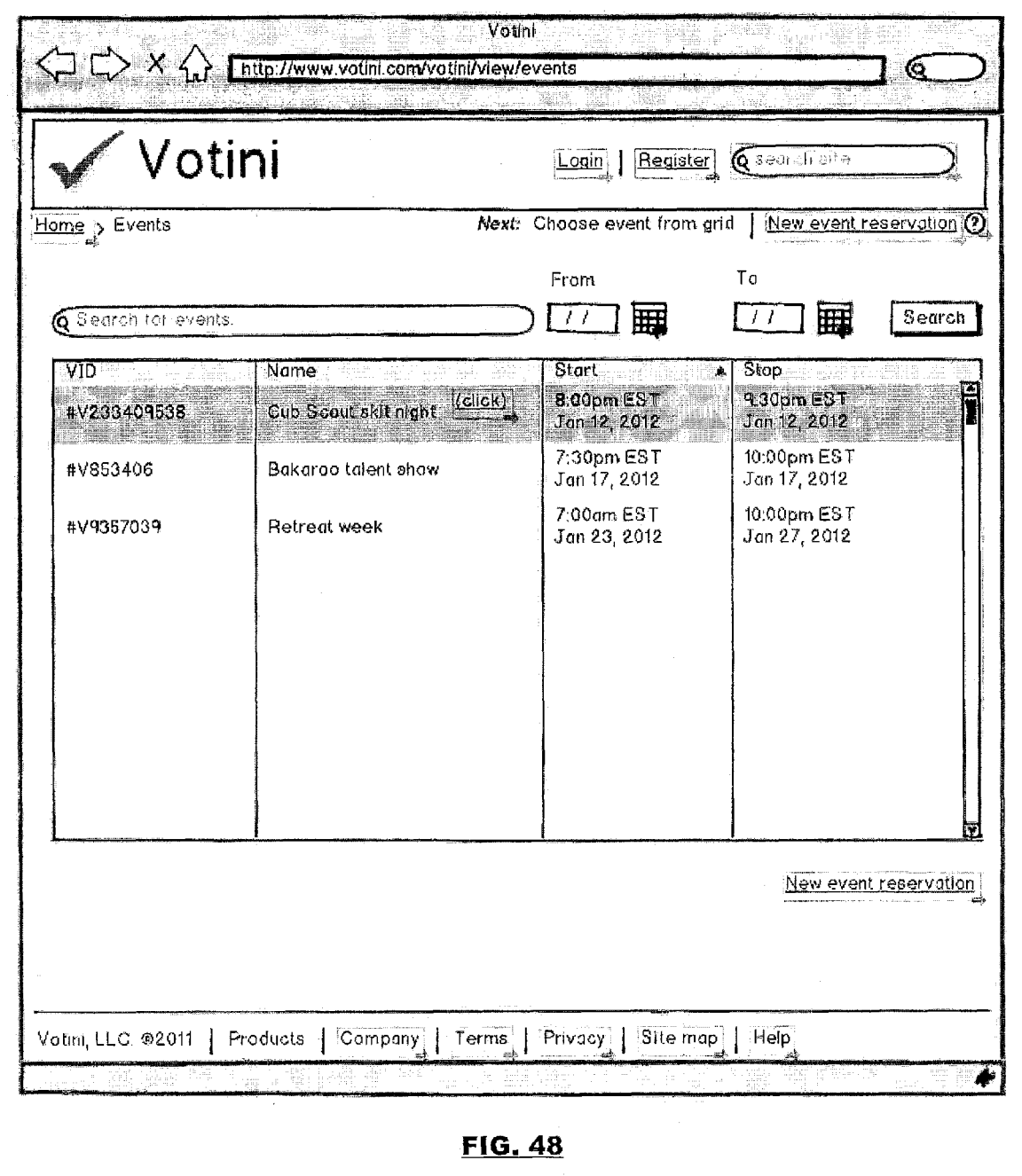

FIG. 47 illustrates an event search page that may be available to anyone without being logged in to Votini website. The search option can be used by someone to see if an event of interest is registered in Votini. FIG. 48 illustrates the search results that may be generated for someone without being logged in to the Votini website. This page represents what an anonymous user might see. All the information on this page may be considered public and logging in to the Votini website may not required to view the features of this page. Clicking one of the events in the list may prompt the party not yet logged in to view the feedback result, such as a feedback graph, for that event.

Figure 49:
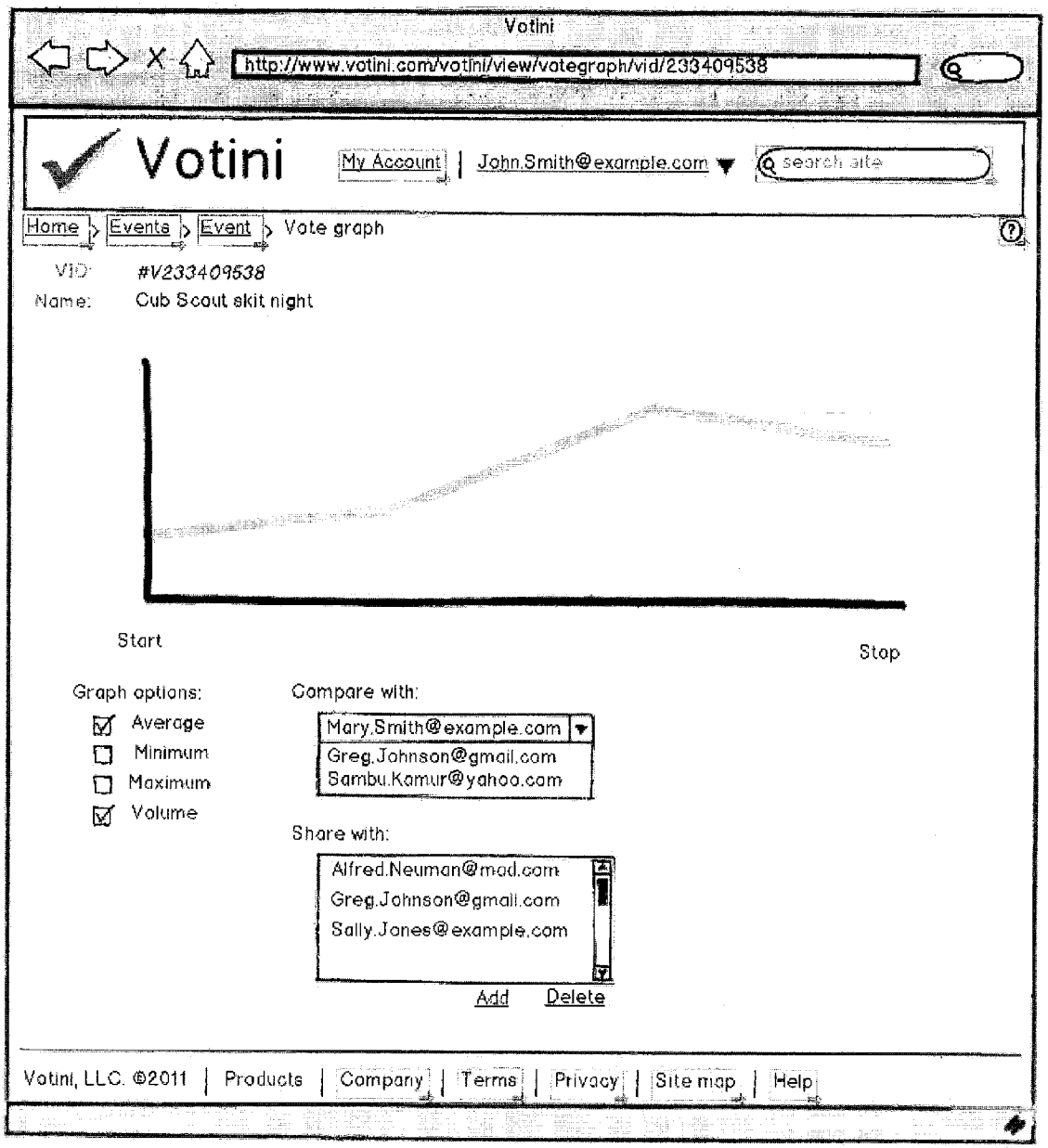

FIG. 49 illustrates a representation of feedback results for an event. The page may include an event identifier, a corresponding event name, a graph and a few graph options, such as average, maximum, minimum and volume. In addition, an option of sharing and comparing the feedback results with other parties may be provided.

Figure 7:
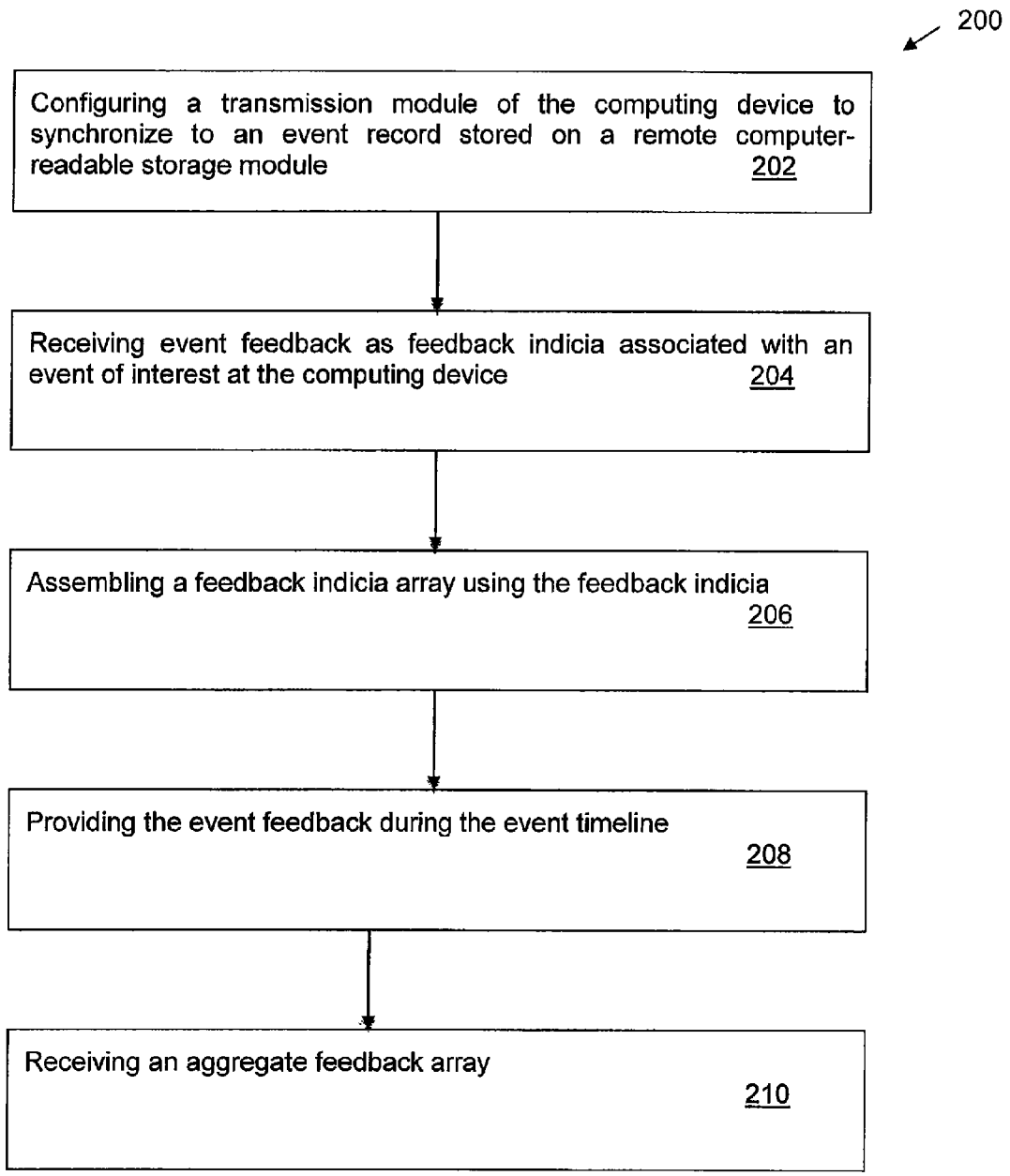
FIG. 7 is another flowchart diagram of another method for capturing event feedback in accordance with at least one embodiment.

Referring now to FIG. 7 there is shown a method 200 of capturing event feedback in accordance with example embodiments.

At step 202, method involves configuring a transmission module of the computing device 14 to synchronize to an event record stored on a remote computer-readable storage module 60. The event record represents an event of interest such that the transmission of the event feedback is configured to link the event feedback to the event record.

At different times during an event timeline, at step 204 method 200 involves receiving the event feedback as feedback indicia associated with an event of interest at the computing device 14. For example, device 14 may push the data to or poll the data from the server 18, and the server 18 may poll the data from or push the data to the client 16.

At step 206, method 200 involves operating a data processor 54 of the computing device 14 to assemble a feedback indicia array using the feedback indicia. The feedback indicia array may store the plurality of different times and an associated plurality of feedback indicia, such that for each time in the plurality of different times, the feedback indicia array comprises a time indicium pair comprising that time and an associated feedback indicium in the associated plurality of feedback indicia. The event timeline defines a period of time for the event for that computing device.

At step 208, method 200 involves providing the event feedback by, during the event timeline, by periodically operating a transmission module 50 of the computing device 14 to transmit each time indicium pair in the feedback indicia array to a remote data processing module 64 until all of the feedback indicia array is transmitted to the remote data processing module 64. The transmission of each time indicium pair in the feedback indicia array is configured to link the time indicium pair to the event record.

In some embodiments, method 200 may involve configuring the transmission module of the computing device to synchronize to the event record stored on the remote computer-readable storage module 60 to link the feedback indicia array to the event record by operating the transmission module to transmit an event identifier identifying the event record to the remote data processing module.

In some embodiments, method 200 may involve operating the transmission module to transmit an event identifier identifying the event record to the remote data processing module 64 by transmitting the event identifier with each time indicium pair in the feedback indicia array. For example this may involve establishing a session between the client 16 and server 18 and only passing the event identifier once and relying on the session state to maintain the relationship between the feedback sent and the event that it was sent for. In other words, the event identifier may be sent once for a session and as long as the session is active, the assumption is that the event is the same. This is merely an example and other variations may be implemented.

In some embodiments, method 200 may involve configuring the transmission module 50 of the computing device 14 to synchronize to the event record stored on the remote computer-readable storage module 60 to link the feedback indicia array to the event record comprises operating the transmission module 50 to transmit each time indicium pair in the feedback indicia array to a location, which may identify the event record.

In some embodiments, an event identifier may be provided as part of a URL used to POST the JSON. That is to say, the event identifier may not be in the feedback array or the location, but may be a parameter on the URL that goes to a location. For example, a URL may be of the form: protocol:// location:porUcontext/view/action/parameter-1/value-1/parameter-2/value2/ . . . , where the event identifier could be passed as a "parameter-N/value-N". The metadata placed on the URL (event_parameter/event_id) may provide the link between the event identifier and the feedback in the JSON.

In other embodiments, other ways of sending feedback directly on the URL may be used. For example, safe methods, such as HTTP GET method and HTTP POST may be used. In another embodiment, industry substandard URLs, such as http://example.com/view/action/event/12345/time/ 238904589/indicium_1/6/indicium_2/0. 35/ . . . , may be used. In other embodiments, idempotent methods may also be used for sending indicium to the server 18. In some embodiments, transmitting each time indicium pair in the feedback indicia array to a location based on the event identifier comprises transmitting each time indicium pair to a URL uniquely identifying that event. In some embodiments, the location does not mean a distinct server but rather a distinct URL.

In some embodiments, the feedback indicia for the event of interest received at the computing device 14 may include human feedback. The feedback indicia stored in the feedback indicia array may then include human feedback ratings, where each human feedback rating is provided by a user of the computing device 14, and a time human indicium pair of a time and the associated human feedback rating. In some embodiments, human feedback may not be received for each time in the event timeline.

In some embodiments at step 210, during a delayed time interval overlapping with the event timeline, the method 200 may involve receiving at the transmission module 60 an aggregate feedback array determined by the remote data processing module 64. The aggregate feedback array may be determined by aggregating the time indicium pairs transmitted to the remote data processing module 64 with other feedback indicia associated with the event received from other users. This may include feedback received at different time segments in the timeline, for example.

The aggregate feedback array may include a runtime value and an aggregate result pair, the runtime value may be associated with a point in time within the event timeline and the aggregate result being determined from the associated feedback indicium in the time indicium pair for that runtime value. This may not be for each time, but some times, for example.

In some embodiments, method 200 may involve receiving the aggregate feedback array at the transmission module 50 by periodically receiving for each time in of the different times, the runtime value and aggregate result pair.

In some embodiments, some of the runtime value and aggregate result pairs are received at the transmission module during the event timeline, and before some associated feedback indicia in the associated plurality of feedback indicia are transmitted by the transmission module to the remote data processing module.

In some embodiments, method 200 may involve operating a display of the computing device 14 to display progressively more of the time indicium pairs and the runtime value and aggregate result pairs during the event timeline.

The computing device 14 is coupled to at least one sensor device, such as a heart rate sensor, a pulse rate sensor, a temperature sensor, a sound level sensor, a light level sensor, a GPS location sensor, an image sensor and an olfactory sensor. The sensor device may measure a sensor feedback value, such as biometric feedback indicating a biometric characteristic of a user and environmental feedback indicating an environmental condition around the user. In some embodiments, method 200 may involve, at each time in a plurality of different sensor measurement times during the event timeline, measuring the one or more sensor devices for the sensor feedback value to provide sensor feedback values.

In some embodiments, method 200 may involve receiving at the computing device 14 the sensor feedback value measured at the sensor device and a corresponding sensor measurement time, and assembling a sensor feedback indicia array therefrom. The sensor feedback indicia array stores a plurality of different sensor measurement times and an associated plurality of sensor feedback values, such that for each time in the plurality of different sensor measurement times, the sensor feedback value comprises a sensor measurement time sensor feedback value pair comprising that time and an associated sensor feedback value in the associated plurality of sensor feedback values. In some embodiments, method 200 may involve, during the event timeline, periodically operating the transmission module 50 of the computing device 14 to transmit each sensor measurement time and sensor feedback value pair in the sensor feedback indicia array along with each time human indicium pair in the human feedback indicia array to a remote data processing module 64 until all of the sensor feedback indicia array and the human feedback indicia array is transmitted to the remote data processing module.

In some embodiments, method 200 may involve operating a metaphor generator at the computing device 14, the metaphor generator being operable to configure a plurality of metaphors such that each metaphor in the plurality of metaphors is providable at the computing device 14 and usable by the observer 12 to input a variable human feedback rating.

In some embodiments, method 200 may involve receiving from the user a request for a metaphor in the plurality of metaphors configured by the metaphor generator, and providing at the computing device the metaphor requested by the user. The device 14 may be configured to interpret and convert received feedback data prior to sending the data to the server, and may also be configured to send raw feedback data directly to the server.

At a plurality of different times during the event timeline, the method 200 may involve receiving human feedback using the metaphor provided at the computing device, converting the human feedback received using the metaphor into the human feedback indicia array. The plurality of different times may not necessarily mean all of the times in the event timeline. Put another way, even if feedback results are typically sampled at a certain frequency or period, there may be periods, much longer than the usual period, during which the feedback results are not sampled. Each human feedback indicia array in the associated plurality of human feedback indicia arrays may include a mapping of the human feedback received using the metaphor into a numerical value. Each time corresponding to the human feedback in the plurality of different times may include the time at which the human feedback was received. The mapping of the human feedback into a numerical value is based on mapping information provided by the event record representing the event of interest.

In some embodiments, method 200 may involve transmitting at the transmission module 50 an indication of the metaphor provided at the computing device 14 to receive human feedback from the user to the remote data processing module 64. The method may further involve receiving at the transmission module 50 the aggregate feedback array determined by the remote data processing module 54. The aggregate feedback array is determined based on the indication of the metaphor transmitted.

In some embodiments, method 200 may involve operating the data processor 54 at the computing device 14 to reconfigure the metaphor generator to restrict the plurality of metaphors to a subset of metaphors. The subset of metaphors may include at least one metaphor, wherein the subset of metaphors to be provided at the computing device for the observer 12 to input the human feedback rating is specified by the event record. Receiving from the user a request for a metaphor in the plurality of metaphors comprises receiving from the user a request for a metaphor in the subset of metaphors.

Figure 8:
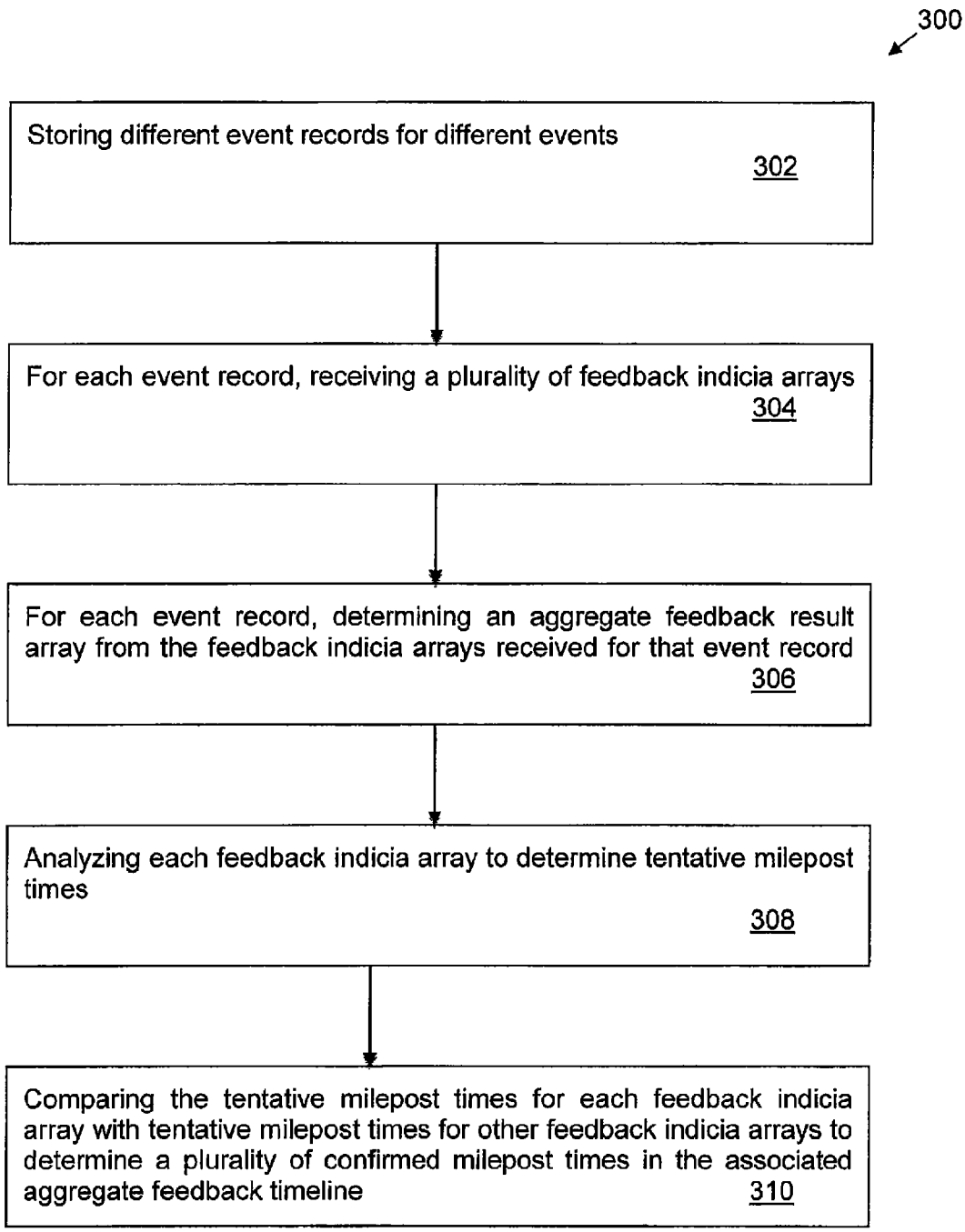
FIG. 8 is another flowchart diagram of another method for capturing event feedback in accordance with at least one embodiment.

Referring now to FIG. 8 there is shown a method 300 of capturing feedback in accordance with other example embodiments.

At step 302, the method 300 involves, on a computer-readable storage module 60, storing different event records for different events such that there may be an event record for each event.

At step 304, the method 300 involves, for each event record, receiving a plurality of feedback indicia arrays at a communication module 62, the communication module 62 being electronically linked to the computer-readable storage module for communication therewith. Each feedback indicia may store different times and feedback indicia, such that for each time, the feedback indicia includes an associated feedback indicium.

At step 306, the method 300 involves, for each event record, operating a data processing module 64, linked to the computer-readable storage module 60 for communication therewith, to determine an aggregate feedback result array from the feedback indicia arrays received for that event record. The aggregate feedback result array defines an associated aggregate feedback timeline. For different times in that timeline there may be aggregate feedback results, such that for each time in that timeline, there may be an associated aggregate feedback result. The aggregate feedback results may be determined by aggregating the plurality of feedback indicia for each feedback indicia array in the plurality of feedback indicia arrays based on the different times for each feedback indicia array in the feedback indicia arrays.

In some embodiments, the method 300 may involve, for at least one event record, receiving feedback indicia arrays at the communication module by receiving the feedback indicia arrays from multiple devices 4, such as mobile devices 4, for example.

In some embodiments, the method 300 may involve receiving the feedback indicia arrays from mobile devices 4 by receiving feedback indicia arrays from the devices in real time by, for each feedback indicia array transmitted from a mobile device, receiving the plurality of feedback indicia as an ordered sequence over time at the communication module based on the timeline for that feedback indicia array such that some feedback indicia in the plurality of feedback indicia are received by the communication module before other feedback indicia in the plurality of feedback indicia are transmitted to the communication module by the mobile device.

In some embodiments, the method 300 may involve receiving at the communication module 62 a request to register a new event by adding a new event record to the event records, and operating the data processing module 64 to add the new event record to the event records based on information in the request.

In some embodiments, the method 300 may involve receiving the request to register the new event from a requester at the communication module 62 by operating the data processing module 64 to further define the new event record by receiving from the requester at the communication module 62 and storing at the computer-readable storage module 62 at least one feedback source acceptance attribute. The feedback source acceptance attribute may identify a possible characteristic of the device 14 or a user of the device 14.

In some embodiments, the method 300 may involve receiving an unfiltered feedback indicia arrays at the communication module 62, and then operating the data processing module 64 to filter out from the unfiltered feedback indicia arrays any feedback indicia arrays in the unfiltered feedback indicia arrays that may not satisfy the feedback source acceptance attribute when determining the aggregate feedback result array. The aggregate feedback result array may be determined without considering any feedback indicia arrays filtered out from the unfiltered feedback indicia arrays.

In some embodiments, the feedback source acceptance attribute may be selectable by the requester from characteristics comprising location, age, gender, nationality, device 14 type and device 14 model.

In some embodiments, the feedback source acceptance attributes may include feedback indicia array sources, which may identify a user or a device 14. Each feedback indicia array received at the communication module 62 may be received from an associated feedback indicia array and the aggregated feedback result array may be determined without considering feedback from a source other than the feedback indicia array sources.

In some embodiments, the method 300 may involve, on receiving the request to register the new event from the requester at the communication module 62, operating the data processing module 64 to further define the new event record by receiving from the requester at the communication module 62 and storing at the computer-readable storage module 60 at least one authorized feedback indicium kind selected from a feedback indicia kinds. The authorized feedback indicium kind may include human feedback indicating a rating provided by a user, biometric feedback indicating a biometric characteristic of the user, and environmental feedback indicating an environmental condition around the user, for example.

In some embodiments, the method 300 may involve receiving an unfiltered feedback indicia arrays at the communication module 62, and then operating the data processing module 64 to filter out any feedback indicia arrays in the feedback indicia arrays defining feedback kinds other than the authorized feedback indicium kind in determining the aggregate feedback result array. The aggregate feedback result array may be determined without considering any feedback indicia arrays filtered out from the unfiltered feedback indicia arrays.

In some embodiments, the authorized feedback indicium kind may include the human feedback and environmental feedback and biometric feedback. The feedback indicia arrays received for the new event record, may involve the method 300 storing, for each time in the plurality of different times, an associated human feedback rating and one or more environmental feedback entry and biometric feedback entry. The human feedback may include electro-mechanical feedback.

In some embodiments, at step 308, the method 300 may involve operating the data processing module 64 to analyze each feedback indicia array received at the communication module 62 to determine tentative milepost times from the different times for that feedback indicia array such that the feedback indicium corresponding to each tentative milepost time correspond to a time immediately before this milepost time by more than a threshold amount.

In some embodiments, at step 310, the method 300 may involve operating the data processing module 64 to compare the plurality of tentative milepost times to determine confirmed milepost times in the associated aggregate feedback timeline. The aggregate feedback result corresponding to each confirmed milepost time in the plurality of confirmed milepost times may differ from the aggregate feedback result corresponding to a time for the associated aggregate feedback timeline immediately before this confirmed milepost time by more than an aggregate threshold amount.

In some embodiments, the method 300 may involve, for each event record in the plurality of different event records, operating the data processing module 64 to determine the aggregate feedback result array received for that event record by determining the associated aggregate feedback timeline by converting different times for each feedback indicia array to a common timescale along the associated aggregate feedback timeline based on the tentative milepost times determined for each feedback indicia array.

In some embodiments, the method 300 may involve operating the data processing module 64 to change the threshold amount when determining the aggregate feedback timeline.

In some embodiments, the method 300 may involve, for each feedback indicia array, receiving at least one input tag from a user at the communication module 62;

In some embodiments, the method 300 may involve, for each feedback indicia array, operating the data processing module 64 to determine a user selected timeline segment, a start time tag and an end time tag based on the at least one input tag. The user selected timeline segment may correspond to a duration of time of a segment within an event timeline, the start time tag may correspond to a start time of the user selected timeline segment and the end time tag may correspond to an end time of the user selected timeline segment. The feedback indicia arrays may be selected such that the user selected timeline segment of one feedback indicia array to differs in length from a different feedback indicia array. In some embodiments, the method 300 may involve operating the data processing module 64 to determine the aggregate feedback result array by defining an associated aggregate feedback timeline by comparing at least two user selected timeline segments for the at least two feedback indicia arrays to determine at least one time scale adjustment and adjusting the relative timing of at least some of the plurality of the feedback indicia arrays based on the at least one time scale adjustment before aggregating the plurality of feedback indicia arrays.

In some embodiments, the data processing module 64 may be operated in real time to determine an updateable version of the aggregate feedback result array based, in part, on a part of a feedback indicia array received from the device 14 before a remainder of that feedback indicia array is received at the communication module 62. The communication module 62 may progressively transmit updated versions of the updateable version of the aggregate feedback result array to the device 14 before all of that feedback indicia array from the device 14 is received at the communication module 62.

In some embodiments, the method 300 may involve storing the plurality of different event records for the plurality of different events comprises storing two or more event records for the same event.

In some embodiments, the method 300 may involve, for event records, operating the communication module 62 to receive and the computer-readable storage module 62 to store feedback indicia array sources. Each feedback indicia array may identify at least one device 14, a user of the device 14 and a location of the device 14.

In some embodiments, the method 300 may involve receiving identification information from a device 14 at the communication module 62, the identification information such as the device name, device model, device operating system, device identifier, device GPS location, user identifier and user password. For example, the identification information may include identifying one or more devices, a user of the device and a location of the device;

In some embodiments, the method 300 may involve, at the data processing module 64, comparing information identified by each of the feedback indicia array source corresponding to each event record in the plurality of event records stored at the computer-readable storage module 60 to corresponding information identified in the identification information received from the device 14. In some embodiments, the method 300 may involve generating a list of event records from the plurality of event records stored at the computer-readable storage medium 60 based on the comparison such that for each event record in the list of event records, at least one feedback indicia array source in the plurality of feedback indicia array sources identifies all that information also identified in the identification information received from the device.

Embodiments have been described herein by way of example only. Various modification and variations may be made to these exemplary embodiments without departing from the spirit and scope of the invention, which is limited only by the appended claims.

Attached hereto is Appendix I which provides example application programming interfaces in accordance with example embodiments described herein, and Appendix II which provides example JavaScript Object Notation protocols in accordance with example embodiments described herein.

We claim:

1. A method for capturing event feedback, the method comprising:
   a) on a computer-readable storage module, storing a plurality of different event records for a plurality of different event records such that the plurality of different event records comprises a corresponding event record for each event in the plurality of different events;
   b) for each event record in the plurality of different event records, receiving a plurality of feedback indicia arrays at a communication module, the communication module being electronically linked to the computer-readable storage module for communication therewith, wherein each feedback indicia array in the plurality of feedback indicia arrays stores a plurality of different times and a plurality of feedback indicia, such that for each time in the plurality of different times, the plurality of feedback indicia comprises an associated feedback indicium; and
   c) for each event record in the plurality of different event records, operating a data processing module, linked to the computer-readable storage module for communication therewith, to determine an aggregate feedback result array from the plurality of feedback indicia arrays received for that event record, wherein the aggregate feedback result array defines an associated aggregate feedback timeline, and for a plurality of different times in that timeline, a plurality of aggregate feedback results, such that for each time in the plurality of different times in that timeline, the plurality of aggregate feedback results comprises an associated aggregate feedback result, the plurality of aggregate feedback results being determined by aggregating the plurality of feedback indicia for each feedback indicia array in the plurality of feedback indicia arrays based on the plurality of different times for each feedback indicia array in the plurality of feedback indicia arrays;

wherein, for at least one event record in the plurality of event records, receiving the plurality of feedback indicia arrays at the communication module comprises receiving the plurality of feedback indicia arrays from a plurality of mobile devices in real time by, for each feedback indicia array transmitted from a mobile device, receiving the plurality of feedback indicia as an ordered sequence over time at the communication module based on the timeline for that feedback indicia array such that some feedback indicia in the plurality of feedback indicia are received by the communication module before other feedback indicia in the plurality of feedback indicia are transmitted to the communication module by the mobile device.

2. The method as defined in claim 1 further comprising receiving at the communication module a request to register a new event by adding a new event record to the plurality of event records, and operating the data processing module to add the new event record to the plurality of event records based on information in the request.

3. The method as defined in claim 2 wherein on receiving the request to register the new event from a requester at the communication module, the method further comprising
   operating the data processing module to further define the new event record by receiving from the requester at the communication module and storing at the computer-readable storage module at least one feedback source acceptance attribute, wherein the at least one feedback source acceptance attribute identifies a possible characteristic of a mobile device in the plurality of mobile devices, or a user of the mobile device; and
   receiving an unfiltered plurality of feedback indicia arrays at the communication module, and then operating the data processing module to filter out from the unfiltered plurality of feedback indicia arrays any feedback indicia arrays in the unfiltered plurality of feedback indicia arrays not satisfying the at least one feedback source acceptance attribute in determining the aggregate feedback result array, such that the aggregate feedback result array is determined without considering any feedback indicia arrays filtered out from the unfiltered plurality of feedback indicia arrays.

4. The method as defined in claim 3 wherein the at least one feedback source acceptance attribute is selectable by the requester from a plurality of characteristics comprising location, age, gender, nationality, mobile device type and mobile device model.

5. The method as defined in claim 3 wherein the feedback source acceptance attributes comprises a plurality of feedback indicia array sources, wherein each feedback indicia array source identifies a user or a mobile device in the plurality of mobile devices, and wherein each feedback indicia array in the plurality of feedback indicia arrays received at the communication module is received from an associated feedback indicia array source in the plurality of feedback indicia array sources and wherein the aggregated feedback result array is determined without considering feedback from a source other than the plurality of feedback indicia array sources.

6. The method as defined in claim 2 wherein on receiving the request to register the new event from the requester at the communication module, the method further comprising
operating the data processing module to further define the new event record by receiving from the requester at the communication module and storing at the computer-readable storage module at least one authorized feedback indicium kind selected from a plurality of feedback indicia kinds wherein the at least one authorized feedback indicium kind is selected from a group consisting of human feedback indicating a rating provided by a user, biometric feedback indicating a biometric characteristic of the user, and environmental feedback indicating an environmental condition around the user; and
receiving an unfiltered plurality of feedback indicia arrays at the communication module, and then operating the data processing module to filter out any feedback indicia arrays in the unfiltered plurality of feedback indicia arrays defining feedback kinds other than the at least one authorized feedback indicium kind in determining the aggregate feedback result array, such that the aggregate feedback result array is determined without considering any feedback indicia arrays filtered out from the unfiltered plurality of feedback indicia arrays.

7. The method as defined in claim 6 wherein
the at least one authorized feedback indicium kind comprises the human feedback and at least one of environmental feedback and biometric feedback; and,
the plurality of feedback indicia arrays received for the new event record, is configured to store, for each time in the plurality of different times, an associated human feedback rating and at least one of an environmental feedback entry and a biometric feedback entry.

8. The method as defined in claim 6 wherein the human feedback comprises electro-mechanical feedback.

9. The method as defined in claim 1 further comprising
operating the data processing module to analyze each feedback indicia array in the plurality of feedback indicia arrays received at the communication module to determine a plurality of tentative milepost times in the plurality of different times for that feedback indicia array such that the feedback indicium corresponding to each tentative milepost time in the plurality of milepost times differs from the feedback indicium corresponding to a time in the plurality of different times immediately before this milepost time by more than a threshold amount; and
operating the data processing module to compare the plurality of tentative milepost times for each feedback indicia array in the plurality of feedback indicia arrays with the plurality of tentative milepost times for other feedback indicia arrays in the plurality of feedback indicia arrays to determine a plurality of confirmed milepost times in the associated aggregate feedback timeline, wherein the aggregate feedback result corresponding to each confirmed milepost time in the plurality of confirmed milepost times differs from the aggregate feedback result corresponding to a time in the plurality of different times for the associated aggregate feedback timeline immediately before this confirmed milepost time by more than an aggregate threshold amount.

10. The method as defined in claim 9 wherein for each event record in the plurality of different event records, operating the data processing module to determine the aggregate feedback result array from the plurality of feedback indicia arrays received for that event record comprises determining the associated aggregate feedback timeline by converting the plurality of different times for each feedback indicia array in the plurality of feedback indicia arrays to a common timescale along the associated aggregate feedback timeline based on the plurality of tentative milepost times determined for each feedback indicia array.

11. The method as defined in claim 9 further comprising operating the data processing module to change the threshold amount when determining the aggregate feedback timeline.

12. The method as defined in claim 1 further comprising
for each feedback indicia array in at least two feedback indicia arrays in the plurality of feedback indicia arrays, receiving at least one input tag from a user at the communication module;
for each feedback indicia array in the at least two feedback indicia arrays, operating the data processing module, to determine a user selected timeline segment, a start time tag and an end time tag based on the at least one input tag, wherein the user selected timeline segment corresponds to a duration of time of a segment within an event timeline, the start time tag corresponds to a start time of the user selected timeline segment and the end time tag corresponds to an end time of the user selected timeline segment, and wherein the at least two feedback indicia arrays are selected such that the user selected timeline segment of one feedback indicia array in the at least two feedback indicia arrays differs in length from a different feedback indicia array in the at least two feedback indicia arrays; and
operating the data processing module to determine the aggregate feedback result array by defining an associated aggregate feedback timeline by comparing at least two user selected timeline segments for the at least two feedback indicia arrays to determine at least one time scale adjustment and adjusting the relative timing of at least some of the plurality of the feedback indicia arrays based on the at least one time scale adjustment before aggregating the plurality of feedback indicia arrays.

13. The method as defined in claim 1 wherein
the data processing module is operated in real time to determine an updateable version of the aggregate feedback result array based, in part, on a part of a feedback indicia array in the plurality of feedback indicia arrays received from one mobile device before a remainder of that feedback indicia array is received at the communication module; and
the communication module progressively transmits updated versions of the updateable version of the aggregate feedback result array to the one mobile device before all of that feedback indicia array from the one mobile device is received at the communication module.

14. The method as defined in claim 2 wherein storing the plurality of different event records for the plurality of different events comprises storing two or more event records for the same event.

15. The method as defined in claim 1 wherein for the at least one event record in the plurality of event records, the method further comprising
- operating the communication module to receive and the computer-readable storage module to store a plurality of feedback indicia array sources wherein each feedback indicia array source in the plurality of feedback indicia array sources identifies at least one of a mobile device in the plurality of mobile devices, a user of the mobile device and a location of the mobile device;
- receiving identification information from a mobile device in the plurality of mobile devices at the communication module, the identification information comprising mobile device name, mobile device model, mobile device operating system, mobile device identifier, mobile device GPS location, user identifier and user password, the identification information identifying at least one of a mobile device, a user of the mobile device and a location of the mobile device;
- at the data processing module, comparing information identified by each of the feedback indicia array source in the plurality of feedback indicia array sources corresponding to each event record in the plurality of event records stored at the computer-readable storage module to corresponding information identified in the identification information received from the mobile device; and
- generating a list of event records from the plurality of event records stored at the computer-readable storage medium based on the comparison such that for each event record in the list of event records, at least one feedback indicia array source in the plurality of feedback indicia array sources identifies all that information also identified in the identification information received from the mobile device.

16. A computer readable medium comprising computer program instructions which when executed implement the method of claim 1.

17. The method as defined in claim 7 wherein the environmental feedback comprises at least one of a date, time, longitude, latitude, altitude, sound level, light level, color, image, video, temperature, smell, air pressure, humidity, and acceleration.

18. The method as defined in claim 7 wherein the biometric feedback comprises at least one of a heart rate, pulse rate, fingerprint image, DNA, voice data, and iris recognition.

19. A method for capturing and communicating event feedback using a computing device, the method comprising:
a) configuring a transmission module of the computing device to synchronize to an event record stored on a remote computer-readable storage module, wherein the event record represents an event of interest such that the transmission of the event feedback is configured to link the event feedback to the event record;
b) at a plurality of different times during an event timeline, receiving the event feedback as feedback indicia associated with an event of interest at the computing device;
c) operating a data processor of the computing device to assemble a feedback indicia array using the feedback indicia, wherein the feedback indicia array stores the plurality of different times and an associated plurality of feedback indicia, such that for each time in the plurality of different times, the feedback indicia array comprises a time indicium pair comprising that time and an associated feedback indicium in the associated plurality of feedback indicia, wherein the event timeline defines a period of time for the event for that computing device; and
d) providing the event feedback by, during the event timeline, periodically operating a transmission module of the computing device to transmit each time indicium pair in the feedback indicia array to a remote data processing module until all of the feedback indicia array is transmitted to the remote data processing module, wherein the transmission of each time indicium pair in the feedback indicia array is configured to link the time indicium pair to the event record.

20. The method as defined in claim 19, wherein configuring the transmission module of the computing device to synchronize to the event record stored on the remote computer-readable storage module to link the feedback indicia array to the event record comprises operating the transmission module to transmit an event identifier identifying the event record to the remote data processing module.

21. The method as defined in claim 20, wherein operating the transmission module to transmit an event identifier identifying the event record to the remote data processing module comprises transmitting the event identifier with each time indicium pair in the feedback indicia array.

22. The method as defined in claim 19, wherein configuring the transmission module of the computing device to synchronize to the event record stored on the remote computer-readable storage module to link the feedback indicia array to the event record comprises operating the transmission module to transmit each time indicium pair in the feedback indicia array to a location, wherein the location identifies the event record.

23. The method as defined in claim 19 wherein the feedback indicia for the event of interest received at the computing device comprises human feedback, wherein the associated plurality of feedback indicia stored in the feedback indicia array comprises a plurality of human feedback ratings, each human feedback rating being provided by a user of the computing device, such that for each time in the plurality of different times, the feedback indicia array comprises a time human indicium pair comprising that time and an associated human feedback rating in the associated plurality of human feedback ratings.

24. The method as defined in claim 19 further comprising during a delayed time interval overlapping with the event timeline, receiving at the transmission module an aggregate feedback array determined by the remote data processing module, wherein the aggregate feedback array is determined by aggregating the time indicium pairs transmitted to the remote data processing module with other feedback indicia associated with the event received from other users.

25. The method as defined in claim 24 wherein
- for each time in the plurality of different times, the aggregate feedback array comprises a runtime value and an aggregate result pair, the runtime value being associated with a point in time within the event timeline and the aggregate result being determined from the associated feedback indicium in the time indicium pair for that runtime value; and
- receiving the aggregate feedback array at the transmission module comprises periodically receiving for each time in the plurality of different times, the runtime value and aggregate result pair.

26. The method as defined in claim 25 wherein some of the runtime value and aggregate result pairs are received at the transmission module during the event timeline, and before some associated feedback indicia in the associated plurality of feedback indicia are transmitted by the transmission module to the remote data processing module.

27. The method as defined in claim 26 wherein the computing device is configured for wireless communication with the remote data processing module and the remote computer-readable storage module, the feedback indicia array is wirelessly transmitted to the remote data processing module, and the aggregate feedback array is received by wireless transmission from the remote data processing module.

28. The method as defined in claim 27 further comprising operating a display of the computing device to display progressively more of the time indicium pairs and the runtime value and aggregate result pairs during the event timeline.

29. The method as defined in claim 24, wherein the computing device is coupled to at least one sensor device, the at least one sensor device being one of a heart rate sensor, a pulse rate sensor, a temperature sensor, a sound level sensor, a light level sensor, a GPS location sensor, an image sensor and an olfactory sensor, wherein the at least one sensor device measures a sensor feedback value, the sensor feedback value being one of biometric feedback indicating a biometric characteristic of a user and environmental feedback indicating an environmental condition around the user, the method further comprising
at each time in a plurality of different sensor measurement times during the event timeline, measuring at the at least one sensor device the sensor feedback value to provide a plurality of sensor feedback values;
receiving at the computing device the at least one sensor feedback value measured at the sensor device and a corresponding sensor measurement time in the plurality of sensor feedback values and assembling a sensor feedback indicia array therefrom, wherein the sensor feedback indicia array stores a plurality of different sensor measurement times and an associated plurality of sensor feedback values, such that for each time in the plurality of different sensor measurement times, the sensor feedback value comprises a sensor measurement time sensor feedback value pair comprising that time and an associated sensor feedback value in the associated plurality of sensor feedback values; and
during the event timeline, periodically operating the transmission module of the computing device to transmit each sensor measurement time sensor feedback value pair in the sensor feedback indicia array along with each time human indicium pair in the human feedback indicia array to a remote data processing module until all of the sensor feedback indicia array and the human feedback indicia array is transmitted to the remote data processing module.

30. The method as defined in claim 24 the method further comprising
operating a metaphor generator at the computing device, the metaphor generator being operable to configure a plurality of metaphors such that each metaphor in the plurality of metaphors is providable at the computing device and usable by the observer to input a variable human feedback rating;
receiving from the user a request for a metaphor in the plurality of metaphors configured by the metaphor generator;
providing at the computing device the metaphor requested by the user;
at a plurality of different times during the event timeline, receiving human feedback using the metaphor provided at the computing device; and
converting the human feedback received using the metaphor into the human feedback indicia array, wherein each human feedback indicia array in the associated plurality of human feedback indicia arrays comprises a mapping of the human feedback received using the metaphor into a numerical value and each time corresponding to the human feedback in the plurality of different times comprising the time at which the human feedback was received, wherein the mapping of the human feedback into a numerical value is based on mapping information provided by the event record representing the event of interest.

31. The method as defined in claim 30, the method further comprising transmitting at the transmission module an indication of the metaphor provided at the computing device to receive human feedback from the user to the remote data processing module; and receiving at the transmission module the aggregate feedback array determined by the remote data processing module, wherein the aggregate feedback array is determined based on the indication of the metaphor transmitted.

32. The method as defined in claim 30, the method further comprising operating the data processor at the computing device to reconfigure the metaphor generator to restrict the plurality of metaphors to a subset of metaphors, the subset of metaphors comprising at least one metaphor, wherein the subset of metaphors to be provided at the computing device for the observer to input the human feedback rating is specified by the event record; and wherein receiving from the user a request for a metaphor in the plurality of metaphors comprises receiving from the user a request for a metaphor in the subset of metaphors.

33. A computer readable medium comprising computer program instructions which when executed implement the method of claim 19.

34. A system for capturing event feedback, the system comprising:
a) a computer-readable storage module for storing a plurality of different event records for a plurality of different events such that the plurality of different event records comprise a corresponding event record for each event in the plurality of different events;
b) a communication module configured, for each event record in the plurality of different event records, to receive a plurality of feedback indicia arrays for that event record, the communication module being electronically linked to the computer-readable storage module for communication therewith, wherein each feedback indicia array in the plurality of feedback indicia arrays stores a plurality of different times and a plurality of feedback indicia, such that for each time in the plurality of different times, the plurality of feedback indicia comprises an associated feedback indicium; and
c) a data processing module linked to the computer-readable storage module for communication therewith, the data processing module being configured to determine, for each event record in the plurality of different event records, an aggregate feedback result array from the plurality of feedback indicia arrays received for that event record, wherein the aggregate feedback result array defines an associated aggregate feedback timeline, and for a plurality of different times in that timeline, a plurality of aggregate feedback results, such that for each time in the plurality of different times in that timeline, the plurality of aggregate feedback results comprises an associated aggregate feedback result, the plurality of aggregate feedback results being determined by aggregating the plurality of feedback indicia for each feedback indicia array in the plurality of feedback indicia arrays based on the plurality of different times for each feedback indicia array in the plurality of feedback indicia arrays;

wherein, for at least one event record in the plurality of event records, the communication module is configured to receive the plurality of feedback indicia arrays from a plurality of mobile devices in real time by, for each feedback array transmitted from each mobile device, receiving the plurality of feedback indicia as an ordered sequence over time at the communication module based on the timeline for that feedback indicia array such that some feedback indicia in the plurality of feedback indicia are receivable by the communication module before other feedback indicia in the plurality of feedback indicia are transmitted to the communication module by the mobile device.

35. The system as defined in claim 34 wherein the communication module is configured to receive a request to register a new event by adding a new event record to the plurality of event records, and the data processing module is configured to add the new event record to the plurality of event records based on information in the request.

36. The system as defined in claim 35 wherein
the data processing module is configured to further define the new event record by receiving from a requester at the communication module and storing in the computer-readable storage module at least one feedback source acceptance attribute, wherein the feedback source acceptance attribute identifies a possible characteristic of a mobile device in the plurality of mobile devices, or a user of the mobile device,
the communication module is configured to receive an unfiltered plurality of feedback indicia arrays; and
the data processing module is operable to filter out from the unfiltered plurality of feedback indicia arrays any feedback indicia arrays in the unfiltered plurality of feedback indicia arrays not satisfying the at least one feedback source acceptance attribute in determining the aggregate feedback result array, such that the aggregate feedback result array is determined without considering any feedback indicia arrays filtered out from the unfiltered plurality of feedback indicia arrays.

37. The system as defined in claim 36 wherein the communication module is configured to display a plurality of characteristics comprising location, age, gender, nationality, mobile device type and mobile device model to the requester, the communication module further comprising an input operable by the requester to select the at least one feedback source acceptance attribute from the plurality of characteristics comprising location, age, gender, nationality, mobile device type and mobile device model.

38. The system as defined in claim 36 wherein the feedback source acceptance attribute comprises a plurality of feedback indicia array sources, wherein each feedback indicia array source identifies a user or a mobile device in the plurality of mobile devices, and wherein each feedback indicia array in the plurality of feedback indicia arrays received at the communication module is received from an associated feedback indicia array source in the plurality of feedback indicia array sources and wherein the data processing module is configured to determine the aggregated feedback result array without considering feedback from a source other than the plurality of feedback indicia array sources.

39. The system as defined in claim 35 wherein on receiving the request to register the new event from the requester,
the data processing module is configured to further define the new event record by receiving from a requester at the communication module and storing in the computer-readable storage module at least one authorized feedback indicium kind selected from a plurality of feedback indicia kinds wherein the at least one authorized feedback indicium kind is selected from a group consisting of human feedback indicating a rating provided by a user, biometric feedback indicating a biometric characteristic of the user, and environmental feedback indicating an environmental condition around the user;
the communication module is configured to receive an unfiltered plurality of feedback indicia arrays; and
the data processing module is operable to filter out any feedback indicia arrays in the unfiltered plurality of feedback indicia arrays defining feedback kinds other than the at least one authorized feedback indicium kind, such that the aggregate feedback result array is determined without considering any feedback indicia arrays filtered out from the unfiltered plurality of feedback indicia arrays.

40. The system as defined in claim 39 wherein
the at least one authorized feedback indicium kind comprises the human feedback and at least one of environmental feedback and biometric feedback; and,
the plurality of feedback indicia arrays received for the new event record, is configured to store, for each time in the plurality of different times, an associated human feedback rating and at least one of an environmental feedback entry and a biometric feedback entry.

41. The system as defined in claim 39 wherein the human feedback comprises electro-mechanical feedback.

42. The system as defined in claim 34 wherein the data processing module is configured to
analyze each feedback indicia array in the plurality of feedback indicia arrays received at the communication module to determine a plurality of tentative milepost times in the plurality of different times for that feedback indicia array such that the feedback indicium corresponding to each tentative milepost time in the plurality of milepost times differs from the feedback indicium corresponding to a time in the plurality of different times immediately before this milepost time by more than a threshold amount; and
compare the plurality of tentative milepost times for each feedback indicia array in the plurality of feedback indicia arrays with the plurality of tentative milepost times for other feedback indicia arrays in the plurality of feedback indicia arrays to determine a plurality of confirmed milepost times in the associated aggregate feedback timeline, wherein the aggregate feedback result corresponding to each confirmed milepost time in the plurality of confirmed milepost times differs from the aggregate feedback result corresponding to a time in the plurality of different times for the associated aggregate feedback timeline immediately before this confirmed milepost time by more than an aggregate threshold amount.

43. The system as defined in claim 42 wherein for each event record in the plurality of different event records, the data processing module is configured to determine the aggregate feedback result array from the plurality of feedback indicia arrays received for that event record by determining the associated aggregate feedback timeline by converting the plurality of different times for each feedback indicia array in the plurality of feedback indicia arrays to a common timescale along the associated aggregate feedback timeline based on the plurality of tentative milepost times determined for each feedback indicia array.

44. The system as defined in claim 42 wherein the data processing module is further operable to change the threshold amount when determining the aggregate feedback timeline.

45. The system as defined in claim 34 wherein
the communication module is configured to receive at least one input tag from a user for each feedback indicia array in at least two feedback indicia arrays in the plurality of feedback indicia arrays; and
the data processing module is operable to
determine, for each feedback indicia array in the at least two feedback indicia arrays, a user selected timeline segment, a start time tag and an end time tag based on the at least one input tag, wherein the user selected timeline segment corresponds to a duration of time of a segment within an event timeline, the start time tag corresponds to a start time of the user selected timeline segment and the end time tag corresponds to an end time of the user selected timeline segment, and wherein the at least two feedback indicia arrays are selected such that the user selected timeline segment of one feedback indicia array in the at least two feedback indicia arrays differs in length from a different feedback indicia array in the at least two feedback indicia arrays; and
determine the aggregate feedback result array by defining an associated aggregate feedback timeline by comparing at least two user selected timeline segments for the at least two feedback indicia arrays to determine at least one time scale adjustment and adjusting the relative timing of at least some of the plurality of the feedback indicia arrays based on the at least one time scale adjustment before aggregating the plurality of feedback indicia arrays.

46. The system as defined in claim 34 wherein
the data processing module is configured to operate in real time to determine an updateable version of the aggregate feedback result array based, in part, on a part of a feedback indicia array in the plurality of feedback indicia arrays received from one mobile device before a remainder of that feedback indicia array is received at the communication module; and
the communication module is operable to progressively transmit updated versions of the updateable version of the aggregate feedback result array to the one mobile device before all of that feedback indicia array from the one mobile device is received at the communication module.

47. The system as defined in claim 35 wherein the computer-readable storage module is operable to store two or more event records for the same event.

48. The system as defined in claim 34 wherein
for the at least one event record in the plurality of event records, the computer-readable storage module is configured to store a plurality of feedback indicia array sources, wherein each feedback indicia array source in the plurality of feedback indicia array sources identifies at least one of a mobile device in the plurality of mobile devices, a user of the mobile device and a location of the mobile device;
the communication module is configured to receive identification information from a mobile device in the plurality of mobile devices, the identification information comprising mobile device name, mobile device model, mobile device operating system, mobile device identifier, mobile device GPS location, user identifier and user password, the identification information also identifying at least one of a mobile device, a user of the mobile device and a location of the mobile device;
the data processing module is configured to compare information identified by each of the feedback indicia array source in the plurality of feedback indicia array sources stored for each event records in the plurality of event records stored at the computer-readable storage module to corresponding information identified in the identification information received from the mobile device; and
the data processing module is further configured to generate a list of event records in the plurality of event records stored at the computer-readable storage medium based on the comparison such that for each event record in the list of event records, at least one feedback indicia array source in the plurality of feedback indicia array sources identifies all that information also identified in the identification information received from the mobile device.

49. The system as defined in claim 40 wherein the environmental feedback comprises at least one of a date, time, longitude, latitude, altitude, sound level, light level, color, image, video, temperature, smell, air pressure, humidity, and acceleration.

50. The system as defined in claim 40 wherein the biometric feedback comprises at least one of a heart rate, pulse rate, fingerprint image, DNA, voice data, and iris recognition.

51. A computing device for capturing and communicating event feedback, the computing device comprising:
a transmission module configured to synchronize to an event record stored on a remote computer-readable storage module, wherein the event record represents an event of interest such that transmission of event feedback at the transmission module is configured to link the event feedback to the event record;
a user interface module configured, at a plurality of different times during an event timeline, to receive the event feedback as feedback indicia associated with an event of interest; and
a data processor configured to assemble a feedback indicia array using the feedback indicia, wherein the feedback indicia array stores the plurality of different times and an associated plurality of feedback indicia, such that for each time in the plurality of different times, the feedback indicia array comprises a time indicium pair comprising that time and an associated feedback indicium in the associated plurality of feedback indicia, wherein the event timeline defines a period of time for the event for that computing device; and
wherein the transmission module is configured, during the event timeline, to provide the event feedback by periodically transmitting each time indicium pair in the feedback indicia array to a remote data processing module until all of the feedback indicia array is transmitted to the remote data processing module, wherein the transmission of each time indicium pair in the feedback indicia array is configured to link the time indicium pair to the event record.

52. The computing device as defined in claim 51, wherein the transmission module is configured to synchronize to the event record stored on the remote computer-readable storage module to link the feedback indicia array to the event record by transmitting an event identifier identifying the event record to the remote data processing module.

53. The computing device as defined in claim 52, wherein the transmission module is configured to transmit the event identifier with each time indicium pair in the feedback indicia array to the remote data processing module.

54. The computing device as defined in claim 51, wherein the transmission module is configured to synchronize to the event record stored on the remote computer-readable storage module to link the feedback indicia array to the event record by transmitting each time indicium pair in the feedback indicia array to a location, wherein the location identifies the event record.

55. The computing device as defined in claim 51 wherein the user interface module is configured, for the event of interest, to receive feedback indicia comprising human feedback, wherein the associated plurality of feedback indicia stored in the feedback indicia array comprises a plurality of human feedback ratings, each human feedback rating being provided by a user of the computing device, such that for each time in the plurality of different times, the feedback indicia array comprises a time human indicium pair comprising that time and an associated human feedback rating in the associated plurality of human feedback ratings.

56. The computing device as defined in claim 51 wherein the transmission module is, during a delayed time interval overlapping with the event timeline, configured to receive an aggregate feedback array determined at the remote data processing module, wherein the aggregate feedback array is determined by aggregating the time indicium pairs transmitted to the remote data processing module with other feedback indicia associated with the event received from other users.

57. The computing device as defined in claim 56 wherein for each time in the plurality of different times, the aggregate feedback array comprises a runtime value and an aggregate result pair, the runtime value being associated with a point in time within the event timeline and the aggregate result being determined at the remote data processing module from the associated feedback indicium in the time indicium pair for that runtime value; and the transmission module is configured, for each time in the plurality of different times, to periodically receive the runtime value and aggregate result pair.

58. The computing device as defined in claim 57 wherein the transmission module is configured to receive some of the runtime value and aggregate result pairs during the event timeline and before transmitting some associated feedback indicia in the associated plurality of feedback indicia to the remote data processing module.

59. The computing device as defined in claim 58 configured for wireless communication with the remote data processing module and the remote computer-readable storage module, wherein the transmission module is configured to wirelessly transmit the feedback indicia array to the remote data processing module and wirelessly receive the aggregate feedback array from the remote data processing module.

60. The computing device as defined in claim 59 comprising a display, wherein the display is, during the event timeline, configured to progressively display more of the time indicium pairs and the runtime value and aggregate result pairs.

61. The computing device as defined in claim 56 further comprising at least one sensor device, the at least one sensor device being one of a heart rate sensor, a pulse rate sensor, a temperature sensor, a sound level sensor, a light level sensor, a GPS location sensor, an image sensor and an olfactory sensor, wherein the at least one sensor device is configured, at each time in a plurality of different sensor measurement times during the event timeline, to measure a sensor feedback value to provide a plurality of sensor feedback values, each sensor feedback value being one of biometric feedback indicating a biometric characteristic of a user and environmental feedback indicating an environmental condition around the user;

the data processor being configured to receive the at least one sensor feedback value measured at the sensor device and a corresponding sensor measurement time in the plurality of sensor feedback values, and assemble a sensor feedback indicia array therefrom, wherein the sensor feedback indicia array stores a plurality of different sensor measurement times and an associated plurality of sensor feedback values, such that for each time in the plurality of different sensor measurement times, the sensor feedback value comprises a sensor measurement time sensor feedback value pair comprising that time and an associated sensor feedback value in the associated plurality of sensor feedback values; and the transmission module being configured, during the event timeline, to periodically transmit each sensor measurement time sensor feedback value pair in the sensor feedback indicia array along with each time human indicium pair in the human feedback indicia array to a remote data processing module until all of the sensor feedback indicia array and the human feedback indicia array is transmitted to the remote data processing module.

62. The computing device as defined in claim 56 further comprising a metaphor generator operable to configure a plurality of metaphors such that each metaphor in the plurality of metaphors is providable at the computing device and usable by the observer to input a variable human feedback rating;

wherein the user interface module is configured to receive from the user a request for a metaphor in the plurality of metaphors configured by the metaphor generator;

to provide the metaphor requested by the user; and to receive, at a plurality of different times during the event timeline, human feedback using the metaphor provided; and the data processor is configured to convert the human feedback received using the metaphor into the human feedback indicia array, wherein each human feedback indicia array in the associated plurality of human feedback indicia arrays comprises a mapping of the human feedback received using the metaphor into a numerical value and each time corresponding to the human feedback in the plurality of different times comprising the time at which the human feedback was received, wherein the mapping of the human feedback into a numerical value is based on mapping information provided by the event record representing the event of interest.

63. The computing device as defined in claim 62 wherein the transmission module is configured to transmit an indication of the metaphor provided at the computing device to receive human feedback from the user to the remote data processing module; and receive at the transmission module the aggregate feedback array determined by the remote data processing module, wherein the aggregate feedback array is determined based on the indication of the metaphor transmitted.

64. The computing device as defined in claim 62, wherein the data processor is operable to reconfigure the metaphor generator to restrict the plurality of metaphors to a subset of metaphors, the subset of metaphors comprising at least one metaphor, wherein the subset of metaphors to be provided at the user interface module for the observer to input the human feedback rating is specified by the event record; and wherein receiving from the user a request for a metaphor in the plurality of metaphors comprises receiving from the user a request for a metaphor in the subset of metaphors.

* * * * *